(12) United States Patent
Reagan et al.

(10) Patent No.: US 10,782,498 B2
(45) Date of Patent: *Sep. 22, 2020

(54) FIBER DISTRIBUTION DEVICE

(71) Applicant: CommScope Technologies LLC, Hickory, NC (US)

(72) Inventors: Randy Reagan, Morristown, NJ (US); Jeffrey Gniadek, Northbridge, MA (US); Thomas Parsons, Leominster, MA (US); Michael Noonan, Shrewsbury, MA (US)

(73) Assignee: CommScope Technologies LLC, Hickory, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/524,686

(22) Filed: Jul. 29, 2019

(65) Prior Publication Data

US 2020/0026014 A1 Jan. 23, 2020

Related U.S. Application Data

(63) Continuation of application No. 15/634,141, filed on Jun. 27, 2017, now Pat. No. 10,393,980, which is a
(Continued)

(51) Int. Cl.
*G02B 6/44* (2006.01)
*H04Q 1/02* (2006.01)
(Continued)

(52) U.S. Cl.
CPC ........... *G02B 6/445* (2013.01); *G02B 6/3849* (2013.01); *G02B 6/3897* (2013.01);
(Continued)

(58) Field of Classification Search
CPC ............................ G02B 6/4452; G02B 6/3897
See application file for complete search history.

(56) References Cited

U.S. PATENT DOCUMENTS 4,736,100 A 4/1988 Vastagh
4,747,020 A 5/1988 Brickley et al.
(Continued)

FOREIGN PATENT DOCUMENTS

CN 2426610 Y 4/2001
CN 2625920 Y 7/2004
(Continued)

OTHER PUBLICATIONS

Brochure from Amphenol Corp. entitled "Amphenol® 954 Series one piece SC Connector," 2 pgs. (1990).
(Continued)

*Primary Examiner* — Thomas A Hollweg
*Assistant Examiner* — Mary A El-Shammaa
(74) *Attorney, Agent, or Firm* — Merchant & Gould P.C.

(57) ABSTRACT

A fiber distribution device includes a swing frame chassis pivotally mounted to a support structure. At least a first optical splitter module is mounted to the swing frame chassis. Pigtails having connectorized ends are carried by the swing frame chassis and have portions that are routed generally vertically on the swing frame chassis. An optical termination field includes fiber optic adapters carried by the swing frame chassis. The fiber optic adapters are configured to receive the connectorized ends of the pigtails.

27 Claims, 42 Drawing Sheets

Related U.S. Application Data continuation of application No. 15/077,265, filed on Mar. 22, 2016, now Pat. No. 9,739,970, which is a continuation of application No. 14/814,146, filed on Jul. 30, 2015, now Pat. No. 9,335,505, which is a continuation of application No. 14/566,123, filed on Dec. 10, 2014, now Pat. No. 9,146,373, which is a continuation of application No. 13/765,199, filed on Feb. 12, 2013, now Pat. No. 9,146,372, which is a continuation of application No. 12/897,475, filed on Oct. 4, 2010, now Pat. No. 8,374,476, which is a continuation of application No. 12/435,181, filed on May 4, 2009, now Pat. No. 7,809,235, which is a continuation of application No. 12/426,723, filed on Apr. 20, 2009, now Pat. No. 7,844,161, which is a continuation of application No. 11/820,845, filed on Jun. 20, 2007, now Pat. No. 7,873,255, which is a continuation of application No. 11/203,157, filed on Aug. 15, 2005, now Pat. No. 7,369,741, which is a continuation-in-part of application No. 10/991,135, filed on Nov. 17, 2004, now Pat. No. 7,200,317, which is a continuation-in-part of application No. 10/714,814, filed on Nov. 17, 2003, now Pat. No. 6,983,095.

(60) Provisional application No. 60/672,502, filed on Apr. 19, 2005.

(51) Int. Cl.
*G02B 6/38* (2006.01)
*H04Q 1/14* (2006.01)
*H04B 10/25* (2013.01)
*H04J 14/02* (2006.01)

(52) U.S. Cl.
CPC ......... *G02B 6/4452* (2013.01); *G02B 6/4471* (2013.01); *H04B 10/25* (2013.01); *H04Q 1/021* (2013.01); *H04Q 1/114* (2013.01); *H04Q 1/14* (2013.01); *H04J 14/02* (2013.01); *H04Q 2201/10* (2013.01); *H04Q 2201/804* (2013.01)

(56) References Cited

U.S. PATENT DOCUMENTS

| | | |
|---|---|---|
| 4,792,203 A | 12/1988 | Nelson et al. |
| 4,824,196 A | 4/1989 | Bylander |
| 4,861,134 A | 8/1989 | Alameel et al. |
| 4,900,123 A | 2/1990 | Barlow et al. |
| 4,948,220 A | 8/1990 | Violo et al. |
| 4,977,483 A | 12/1990 | Perretta |
| 4,995,688 A | 2/1991 | Anton et al. |
| 4,999,652 A | 3/1991 | Chan |
| 5,023,646 A | 6/1991 | Ishida et al. |
| 5,058,983 A | 10/1991 | Corke et al. |
| 5,073,042 A | 12/1991 | Mulholland et al. |
| 5,076,688 A | 12/1991 | Bowen et al. |
| 5,142,598 A | 8/1992 | Tabone |
| 5,214,735 A | 5/1993 | Henneberger |
| 5,233,674 A | 8/1993 | Vladic |
| 5,274,729 A | 12/1993 | King et al. |
| 5,274,731 A | 12/1993 | White |
| 5,317,663 A | 5/1994 | Beard et al. |
| 5,333,221 A | 7/1994 | Briggs et al. |
| 5,333,222 A | 7/1994 | Belenkiy et al. |
| 5,359,688 A | 10/1994 | Underwood |
| 5,363,465 A | 11/1994 | Korkowski et al. |
| 5,367,598 A | 11/1994 | Devenish, III et al. |
| 5,402,515 A | 3/1995 | Vidacovich et al. |
| 5,408,557 A | 4/1995 | Hsu |
| RE34,955 E | 5/1995 | Anton et al. |
| 5,420,958 A | 5/1995 | Henson et al. |
| 5,442,726 A | 8/1995 | Howard et al. |
| 5,448,015 A | 9/1995 | Jamet et al. |
| 5,469,526 A | 11/1995 | Rawlings |
| 5,497,444 A | 3/1996 | Wheeler |
| 5,506,922 A | 4/1996 | Grois et al. |
| 5,511,144 A | 4/1996 | Hawkins et al. |
| 5,542,015 A | 7/1996 | Hultermans |
| 5,636,138 A | 6/1997 | Gilbert et al. |
| 5,647,043 A | 7/1997 | Anderson et al. |
| 5,701,380 A | 12/1997 | Larson et al. |
| 5,706,384 A | 1/1998 | Peacock et al. |
| 5,708,751 A | 1/1998 | Maffei |
| 5,734,776 A | 3/1998 | Puetz |
| 5,764,844 A | 6/1998 | Mendes |
| 5,774,612 A | 6/1998 | Belenkiy et al. |
| 5,778,130 A | 7/1998 | Walters et al. |
| 5,778,132 A | 7/1998 | Csipkes et al. |
| 5,784,515 A | 7/1998 | Tamaru et al. |
| 5,823,646 A | 10/1998 | Arizpe et al. |
| 5,825,955 A | 10/1998 | Ernst et al. |
| 5,883,995 A | 3/1999 | Lu |
| 5,909,526 A | 6/1999 | Roth et al. |
| 5,930,425 A | 7/1999 | Abel et al. |
| 5,945,633 A | 8/1999 | Ott et al. |
| 5,956,444 A | 9/1999 | Duda et al. |
| 5,969,294 A | 10/1999 | Eberle et al. |
| 5,975,769 A | 11/1999 | Larson et al. |
| 6,027,252 A | 2/2000 | Erdman et al. |
| 6,041,155 A | 3/2000 | Anderson et al. |
| 6,044,193 A | 3/2000 | Szentesi et al. |
| 6,061,492 A | 5/2000 | Strause et al. |
| 6,069,797 A | 5/2000 | Widmayer et al. |
| 6,076,975 A | 6/2000 | Roth |
| 6,079,881 A | 6/2000 | Roth |
| 6,096,797 A | 8/2000 | Prantl et al. |
| 6,149,315 A | 11/2000 | Stephenson |
| 6,160,946 A | 12/2000 | Thompson et al. |
| 6,188,687 B1 | 2/2001 | Mussman et al. |
| 6,188,825 B1 | 2/2001 | Bandy et al. |
| 6,208,796 B1 | 3/2001 | Williams Vigliaturo |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,247,849 B1 | 6/2001 | Liu |
| 6,256,443 B1 | 7/2001 | Uruno |
| 6,259,850 B1 | 7/2001 | Crosby, Jr. et al. |
| 6,271,484 B1 | 8/2001 | Tokutsu |
| 6,278,829 B1 | 8/2001 | BuAbbud et al. |
| 6,298,190 B2 | 10/2001 | Waldron et al. |
| 6,307,998 B2 | 10/2001 | Williams Vigliaturo |
| RE37,489 E | 1/2002 | Anton et al. |
| 6,347,888 B1 | 2/2002 | Puetz |
| 6,356,697 B1 | 3/2002 | Braga et al. |
| 6,363,200 B1 | 3/2002 | Thompson et al. |
| 6,385,381 B1 | 5/2002 | Janus et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,452,925 B1 | 9/2002 | Sistanizadeh et al. |
| 6,453,033 B1 | 9/2002 | Little et al. |
| 6,464,402 B1 | 10/2002 | Andrews et al. |
| D466,087 S | 11/2002 | Cuny et al. |
| 6,480,487 B1 | 11/2002 | Wegleitner et al. |
| 6,483,977 B2 | 11/2002 | Battey et al. |
| 6,496,640 B1 | 12/2002 | Harvey et al. |
| 6,535,682 B1 | 3/2003 | Puetz et al. |
| 6,539,147 B1 | 3/2003 | Mahony |
| 6,539,160 B2 | 3/2003 | Battey et al. |
| 6,542,688 B1 | 4/2003 | Battey et al. |
| 6,547,450 B2 | 4/2003 | Lampert |
| 6,554,485 B1 | 4/2003 | Beatty et al. |
| 6,556,763 B1 | 4/2003 | Puetz et al. |
| 6,577,595 B1 | 6/2003 | Counterman |

(56) References Cited

U.S. PATENT DOCUMENTS

| | | |
|---|---|---|
| 6,597,670 B1 | 7/2003 | Tweedy et al. |
| 6,614,980 B1 | 9/2003 | Mahony |
| 6,621,975 B2 | 9/2003 | Laporte et al. |
| 6,623,170 B2 | 9/2003 | Petrillo |
| 6,625,375 B1 | 9/2003 | Mahony |
| 6,631,237 B2 | 10/2003 | Knudsen et al. |
| 6,654,536 B2 | 11/2003 | Battey et al. |
| 6,661,961 B1 | 12/2003 | Allen et al. |
| 6,668,127 B1 | 12/2003 | Mahony |
| 6,678,457 B2 | 1/2004 | Kim et al. |
| 6,755,574 B2 | 6/2004 | Fujiwara et al. |
| 6,760,530 B1 | 7/2004 | Mandry |
| 6,760,531 B1 | 7/2004 | Solheid et al. |
| 6,768,860 B2 | 7/2004 | Liberty |
| 6,778,752 B2 | 8/2004 | LaPorte et al. |
| 6,788,786 B1 | 9/2004 | Kessler et al. |
| 6,792,190 B2 | 9/2004 | Xin et al. |
| 6,792,191 B1 | 9/2004 | Clapp, Jr. et al. |
| 6,815,612 B2 | 11/2004 | Bloodworth et al. |
| 6,845,207 B2 | 1/2005 | Schray |
| 6,850,685 B2 | 2/2005 | Tinucci et al. |
| 6,853,795 B2 | 2/2005 | Dagley et al. |
| 6,870,734 B2 | 3/2005 | Mertesdorf et al. |
| 6,901,200 B2 | 5/2005 | Schray |
| 6,909,833 B2 | 6/2005 | Henschel et al. |
| 6,917,731 B2 | 7/2005 | Bennett et al. |
| 6,920,274 B2 | 7/2005 | Rapp et al. |
| 6,925,241 B2 | 8/2005 | Bohle et al. |
| 6,950,593 B2 | 9/2005 | Hodge et al. |
| 6,980,725 B1 | 12/2005 | Swieconek |
| 6,983,095 B2 | 1/2006 | Reagan et al. |
| 7,029,322 B2 | 4/2006 | Ernst et al. |
| 7,086,539 B2 | 8/2006 | Knudsen et al. |
| 7,088,899 B2 | 8/2006 | Reagan et al. |
| 7,103,255 B2 | 9/2006 | Reagan et al. |
| 7,142,764 B2 | 11/2006 | Allen et al. |
| 7,146,089 B2 | 12/2006 | Reagan et al. |
| 7,171,102 B2 | 1/2007 | Reagan et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,277,620 B2 | 10/2007 | Vongseng et al. |
| 7,369,741 B2 | 5/2008 | Reagan et al. |
| 7,400,816 B2 | 7/2008 | Reagan et al. |
| 7,407,330 B2 | 8/2008 | Smith et al. |
| 7,457,503 B2 | 11/2008 | Solheid et al. |
| 7,471,869 B2 | 12/2008 | Reagan et al. |
| 7,515,805 B2 | 4/2009 | Vongseng et al. |
| 7,519,259 B2 | 4/2009 | Vongseng et al. |
| 7,646,958 B1 | 1/2010 | Reagan et al. |
| 7,809,233 B2 | 10/2010 | Smith et al. |
| 7,809,234 B2 | 10/2010 | Smith et al. |
| 7,809,235 B2 | 10/2010 | Reagan et al. |
| 7,826,706 B2 | 11/2010 | Vongseng et al. |
| 7,841,775 B2 | 11/2010 | Smith et al. |
| 7,844,159 B2 | 11/2010 | Solheid et al. |
| 7,844,161 B2 | 11/2010 | Reagan et al. |
| 7,873,255 B2 | 1/2011 | Reagan et al. |
| 7,980,768 B2 | 7/2011 | Smith et al. |
| 7,995,894 B2 | 8/2011 | Solheid et al. |
| 8,184,940 B2 | 5/2012 | Smith et al. |
| 8,210,756 B2 | 7/2012 | Smith et al. |
| 8,374,476 B2 | 2/2013 | Reagan et al. |
| 8,401,357 B2 | 3/2013 | Solheid et al. |
| 8,538,228 B2 | 9/2013 | Smith et al. |
| 8,636,421 B2 | 1/2014 | Smith et al. |
| 8,811,791 B2 | 8/2014 | Solheid et al. |
| 8,818,158 B2 | 8/2014 | Smith et al. |
| 9,122,019 B2 | 9/2015 | Smith et al. |
| 9,201,206 B2 | 12/2015 | Smith et al. |
| 9,250,408 B2 | 2/2016 | Solheid et al. |
| 9,304,276 B2 | 4/2016 | Solheid et al. |
| 9,341,798 B2 | 5/2016 | Smith et al. |
| 9,470,851 B2 | 10/2016 | Smith et al. |
| 9,541,724 B2 | 1/2017 | Solheid et al. |
| 9,784,828 B2 | 10/2017 | Smith et al. |
| 2001/0001270 A1 | 5/2001 | Williams Vigliaturo |
| 2002/0034290 A1 | 3/2002 | Pershan |
| 2002/0150372 A1 | 10/2002 | Schray |
| 2002/0176681 A1 | 11/2002 | Puetz et al. |
| 2002/0181893 A1 | 12/2002 | White et al. |
| 2003/0002812 A1 | 1/2003 | Lampert |
| 2003/0103750 A1 | 6/2003 | Laporte et al. |
| 2003/0113086 A1 | 6/2003 | Jun et al. |
| 2003/0165315 A1 | 9/2003 | Trebesch et al. |
| 2003/0174996 A1 | 9/2003 | Henschel et al. |
| 2003/0185486 A1 | 10/2003 | Bennett et al. |
| 2003/0185518 A1 | 10/2003 | Bennett et al. |
| 2003/0207601 A1 | 11/2003 | Adachi |
| 2004/0074852 A1 | 4/2004 | Knudsen et al. |
| 2004/0126069 A1 | 7/2004 | Jong et al. |
| 2004/0165852 A1 | 8/2004 | Erwin et al. |
| 2004/0228598 A1 | 11/2004 | Allen et al. |
| 2004/0264873 A1 | 12/2004 | Smith et al. |
| 2005/0002633 A1 | 1/2005 | Solheid et al. |
| 2005/0129379 A1 | 6/2005 | Reagan et al. |
| 2005/0163448 A1 | 7/2005 | Blackwell, Jr. et al. |
| 2005/0281526 A1 | 12/2005 | Vongseng et al. |
| 2006/0083475 A1 | 4/2006 | Grubish et al. |
| 2006/0115220 A1 | 6/2006 | Elkins, II et al. |
| 2006/0204200 A1 | 9/2006 | Lampert et al. |
| 2007/0165995 A1 | 7/2007 | Reagan et al. |
| 2008/0008436 A1 | 1/2008 | Reagan et al. |
| 2008/0008437 A1 | 1/2008 | Reagan et al. |
| 2008/0013910 A1 | 1/2008 | Reagan et al. |
| 2008/0019655 A1 | 1/2008 | Vongseng et al. |
| 2008/0025684 A1 | 1/2008 | Vongseng et al. |
| 2008/0317425 A1 | 12/2008 | Smith et al. |
| 2009/0074372 A1 | 3/2009 | Solheid et al. |
| 2009/0087157 A1 | 4/2009 | Smith et al. |
| 2009/0190896 A1 | 7/2009 | Smith et al. |
| 2009/0196565 A1 | 8/2009 | Vongseng et al. |
| 2009/0285540 A1 | 11/2009 | Reagan et al. |
| 2009/0290843 A1 | 11/2009 | Reagan et al. |
| 2009/0297111 A1 | 12/2009 | Reagan et al. |
| 2010/0124392 A1 | 5/2010 | Reagan et al. |
| 2010/0226615 A1 | 9/2010 | Reagan et al. |
| 2017/0052332 A1 | 2/2017 | Smith et al. |
| 2017/0146758 A1 | 5/2017 | Solheid et al. |

FOREIGN PATENT DOCUMENTS

| | | |
|---|---|---|
| EP | 0 743 701 A2 | 11/1996 |
| EP | 0 788 002 A1 | 8/1997 |
| EP | 0 871 047 A1 | 10/1998 |
| EP | 0 975 180 A1 | 1/2000 |
| EP | 1 045 267 A1 | 10/2000 |
| JP | 63-229409 | 9/1988 |
| JP | 2000-75180 A | 3/2000 |
| JP | 2000-193833 A | 7/2000 |
| JP | 2000-241629 A | 9/2000 |
| JP | 2001-27720 A | 1/2001 |
| JP | 2001-235633 A | 8/2001 |
| JP | 1144266 S | 6/2002 |
| JP | 3307618 B2 | 7/2002 |
| JP | 2005-91379 A | 4/2005 |
| JP | 3698579 B2 | 9/2005 |
| JP | 3761762 B2 | 3/2006 |
| WO | WO 95/20175 A1 | 7/1995 |
| WO | WO 98/53347 A2 | 11/1998 |
| WO | WO 99/27404 A1 | 6/1999 |
| WO | WO 00/52504 A2 | 9/2000 |
| WO | WO 00/75706 A2 | 12/2000 |
| WO | WO 02/21182 A1 | 3/2002 |
| WO | WO 02/103429 A2 | 12/2002 |
| WO | WO 2004/032532 A2 | 4/2004 |

OTHER PUBLICATIONS

AMP Inc. catalog entitled "Fiber Optic Products," front and back covers and p. 59, (4 pgs.) (© 1991).

HRS catalog entitled "Optical Fibre Connectors," front and back

(56) References Cited

OTHER PUBLICATIONS covers and pp. 16, 17 and 49 (5 pages) (Mar. 1991).
AT&T Network Systems catalog entitled "Fiber Optic Products Innovation for wide ranging applications," front and back covers and pp. 6-1 through 6-16 (18 pages) (© 1995).
NTT Int'l Fiber Termination Module (FTM) & Premises Optical Distribution Cabinets (PODC) product brochure, 3 pages, undated.
ADC Telecommunications, Inc.'s Outside Plant, Fiber Cross-Connect Solutions Products Brochure; front cover, Table of Contents, pp. 1-48, and back cover.; revised Jun. 2002, Item No. 1047.
ADC Telecommunications, Inc.'s 6th Edition of Next Generation Frame (NGF) Product Family Ordering Guide; front cover, Table of Contents, pp. 1-41, and back cover; revised Feb. 2003, Item No. 820.
ADC Telecommunications, Inc.'s Fiber Optic, Cable Assemblies and Accessories Brochure; front cover, Table of Contents, pp. 1-23, and back cover; revised Apr. 2003, Item No. 100300.
ADC Telecommunications, Inc.'s OMX™ 600, Optical Distribution Frame Brochure; front cover, Table of Contents, pp. 1-14, and back cover; revised Feb. 2000, Item No. 854.
Iwano, S. et al., "MU-type Optical Fiber Connector System," *NTT Review*, vol. 9, No. 2, pp. 63-71 (Mar. 1997).
Sugita, E. et al., "SC-Type Single-Mode Optical Fiber Connectors," *Journal of Lightwave Technology*, vol. 7, No. 11, pp. 1689-1696 (Nov. 1989).
FONS Corporation's MDC Series Rack or Wall Mount Enclosures product sheet, 3 pages, (2002).
FONS Corporation's Modular Distribution Cabinets Rack Mount Enclosures, Model MDC-7, product sheet, 2 pages (2005) (shows the same device as shown in Exhibit L).
FONS Corporation's Technical Drawing No. 11669, Rev. D, of Distribution Cabinet Assembly MFDC-7, 1 page (technical drawing depicting the device shown in Exhibit M).
ADC Telecommunications, Inc.'s Secure Fiber Entrance Terminal (SFET) Brochure; front cover, pp. 2-7, and back cover; revised May 1998, Item No. 1005.
ADC Telecommunications, Inc.'s 2nd Edition of Fiber Panel Products; front cover, Table of Contents, pp. 1111, and back cover; revised Jul. 1996, Item No. 846.
ADC Telecommunications, Inc., brochure titled *Value Added module System*, © 2000 (29 pages).
ADC Telecommunications, Inc., brochure titled *Value-Added module System: Optical Distribution Frame (OMX™ 600)*, © 2001 (11 pages).
European Search Report dated Apr. 2, 2008 for a European application having Publication No. EP 1914578, which claims priority to the same U.S. application, now U.S. Pat. No. 6,983,095, as the present application.
European Search Report dated Nov. 19, 2009 for European Application No. 09011819, which claims priority to previously cited U.S. Pat. No. 7,198,409 (7 pages).
European Search Report for Application No. 10158615.4 dated Jun. 9, 2010.
European Search Report for Application No. 10181631.2 dated Sep. 5, 2011.
European Search Report and written opinion cited in Application No. 10158615.4 dated Oct. 4, 2010.
Assembly reference drawings having drawing No. 1067101, dated Aug. 17, 1999 (2 pages).
Connectorized splitter drawings having drawing No. 1067961, dated Aug. 18, 1999 (8 pages).
Fiber distribution drawings having drawing No. 1069967, dated Aug. 17, 1999 (2 pages).
Installation drawings having drawing No. 1069965, dated Aug. 14, 1999 (3 pages).
Nexans, Cross-Connect Cabinet III: Plastic Watertight Cabinet for FTTH Applications, dated 2002 (2 pages).
Nexans, Cross-Connect Cabinet V: Metallic Watertight Cabinet for FTTH Applications, dated 2002 (2 pages).

Optical fiber coupler review, Technical Report 2001, showing Sumitomo Osaka Cement Co. Ltd's Optical Coupler (pp. 41-42).
"Retainer Staright [sic] Removable SC," which shows a latch design, 2 pages (Jan. 17, 2006).
Fifth Preliminary Amendment filed Jun. 19, 2008 and Notice of Allowance dated Jul. 17, 2017 for U.S. Appl. No. 11/729,310.
Hasegawa et al., *100GHz-48CH Athermal AWG with a Novel Temperature Insensitive Principle*, National Fiber Optics Engineers Conference, 2003 Technical Proceedings, pp. 801-808.
ATI Optique Catalog, ATI Optique Division of TI electronique, Version 2.6, released Mar. 27, 2002 (50 pages).
Tachikura et al., *Newly Developed Optical Fiber Distribution System and Cable Management in Central Office*, International Wire & Cable Symposium, Proceedings of the 50th IWCS (which took place in 2001), pp. 98-105.
*Couplers: Couplers WDMS Packaging*, Alcoa Fujikura Ltd., Telecommunications Division, © 2000 (5 pages) showing AFL splitters.
21 photographs showing what AFL Telecommunications LLC purports to be the ECOE cabinet referenced in the Prior art statement and the Supplemental prior art statement listed above. AFL Telecommunications LLC asserts the cabinet was on sale as early as 2001.
24 photos of LambdaUnite® Blank Card; "LambdaUnite® MultiService Switch (MSS)" brochure (2003); and "Lucent's LambdaUnite® Busts Out" official release (Jan. 29, 2002) (33 pages total).
Technical Specifications, Seiko Instruments Inc., SSC-PE Series Single-Mode SC Connector Plug: (published in 2000).
Drawings showing an ADC fiber storage trough concept including presentation entitled "Fujitsu Fiber Management Project Fiber Trough Concept", 11 pages (Jun. 2002).
Drawings showing another ADC fiber storage trough concept including presentation entitled "Fujitsu Fiber Management Project Fiber Trough Concept" by Kathy Barnes (7 pages), photos of trough disclosed in presentation by Kathy Barnes installed in a rack (3 pages) and presentation entitled "Fujitsu Fiber Management Project Fiber Trough Concept" by Dan Mertesdorf (9 pages), 19 total pages (Apr. 2002).
"Senko Advanced Components: SC Connector Kits," printout from website of Senko Advanced Components at www.senko.com/fiberoptic/detail_product.php?product=80 available at least as early as Mar. 26, 2003 (obtained Nov. 7, 2017 via Internet Archive Wayback Machine).
Portions of the prosecution history of the copending and commonly assigned patent application having U.S. Publication No. 2007/0165995 including Restriction Requirement dated Nov. 1, 2007, a Response to Restriction Requirement dated Dec. 3, 2007, a Non-final Office Action dated Jan. 2, 2008, a Response to Non-final Office Action dated May 2, 2008, a Notice of Allowance dated Jun. 26, 2008, an Amendment After Allowance and Issue fee payment dated Sep. 25, 2008, a Response to Amendment After Allowance dated Oct. 10, 2008, an Issue Notification dated Oct. 29, 2008, a Petition to Withdraw from Issue, RCE, and Amendment dated Nov. 14, 2008, a Patent Withdrawal Notice dated Nov. 17, 2008, a Non-final Office Action dated Dec. 11, 2008, and a Response to Non-final Office Action dated Mar. 27, 2009 (88 pages total).
Notice of Allowance dated May 3, 2010 for U.S. Appl. No. 12/276,886.
Notice of Allowance dated Apr. 2, 2010 in copending U.S. Appl. No. 12/435,170 (now published as U.S. Publication No. 2009-0290843).
Notice of Allowance dated Apr. 2, 2010 in copending U.S. Appl. No. 12/435,181 (now published as U.S. Publication No. 2009-0285540).
Notice of Allowance dated Mar. 5, 2010 in copending U.S. Appl. No. 11/820,845 (now published as U.S. Publication No. 2008-0008436).
Certified English translation of PCT publication No. WO 99/27404, which was published Jun. 3, 1999.
Certified English Translation of JP2000-193833 by Frank McGee of Morningside IP (24 pages).
Certified English Translation of JP2000-241629 by Frank McGee of Morningside IP (33 pages).
Non-final Office Action dated Dec. 11, 2009 in copending U.S. Appl. No. 12/435,170, published as US 2009/0290843 (which was previously cited).

(56) References Cited

OTHER PUBLICATIONS

Commonly assigned and copending U.S. Appl. No. 12/685,478, filed Jan. 12, 2010, to Reagan et al., which lists the same inventors as the present application and claims a priority date of Nov. 17, 2003.
Commonly assigned and copending U.S. Appl. No. 11/699,716, filed Jan. 29, 2007, which claims a priority date of Nov. 17, 2003.
Commonly assigned and copending U.S. Appl. No. 12/426,723, filed Apr. 20, 2009, to Reagan et al., which claims priority to the present application.
Commonly assigned and copending U.S. Appl. No. 12/435,170, filed May 4, 2009, to Reagan et al., which claims priority to the present application.
Commonly assigned and copending U.S. Appl. No. 12/435,181, filed May 4, 2009, to Reagan et al., which claims priority to the present application.
Commonly assigned and copending U.S. Appl. No. 12/603,412, filed Oct. 21, 2009, to Reagan et al., which claims priority to the present Application.
Complaint relating to Civil Action No. 08-CV-02234-DWF-JSM, filed Jun. 13, 2008.
First Amended Complaint, *ADC Telecommunication, Inc. and Fiber Optic Network Solutions Corp. v. AFL Telecommunications LLC*, Civil Action No. 0:08-cv-02234-DWF-JSM, 8 pages (Aug. 14, 2008).
Defendant's Answer and Defenses in Response to the First Amended Complaint, *ADC Telecommunication, Inc. and Fiber Optic Network Solutions Corp. v. AFL Telecommunications LLC*, Civil Action No. 0:08-cv-02234-DWF-JSM, 14 pages (Dec. 8, 2008).
Amended Order for Pretrial Conference, *ADC Telecommunication, Inc. and Fiber Optic Network Solutions Corp. v. AFL Telecommunications LLC*, Civil Action No. 0:08-cv-02234-DWF-JSM, 5 pages (Dec. 11, 2008).
Prior art statement submitted by AFL Telecommunications LLC in Civil Action No. 08-CV-02234-DWF-JSM on May 11, 2009 (145 pages).
Supplemental prior art statement submitted by AFL Telecommunications LLC in Civil Action No. 08-CV-02234-DWF-JSM on May 19, 2009 (155 pages).
Response to prior art statement submitted by ADC Telecommunications, Inc. in Civil Action No. 08-CV-02234-DWF-JSM on Aug. 18, 2009 (131 pages).
Second supplemental prior art statement filed Nov. 10, 2009 by AFL Telecommunications LLC in Civil Action No. 08-CV-02234-DWF-JSM, filed Jun. 13, 2008.
Joint Claim Construction Statement, relating to *ADC Telecommunications, Inc. v, AFL Telecommunications LLC*, Civil Action No. 08-CV-02234, filed Nov. 17, 2009 (40 pages).
Plaintiff ADC's Markman Brief (Redacted Version), filed Feb. 9, 2010, relating to *ADC Telecommunications, Inc. v, AFL Telecommunications LLC*, Civil Action No. 08-CV-02234-DWF-JSM (99 pages).
Defendant AFL Telecommunications LLC's Memorandum in Support of Proposed Claim Construction, (AFL's Markman Brief), filed Feb. 9, 2010, relating to *ADC Telecommunications, Inc. v, AFL Telecommunications LLC*, Civil Action No. 08-CV-02234 (42 pages).
Plaintiff ADC's Responsive Markman Brief, filed Mar. 9, 2010, relating to *ADC Telecommunications, Inc. v, AFL Telecommunications LLC*, Civil Action No. 08-CV-02234 (21 pages).
Defendant AFL Telecommunications LLC's Answering Claim Construction Brief, filed Mar. 9, 2010, relating to *ADC Telecommunications, Inc. v, AFL Telecommunications LLC*, Civil Action No. 08-CV-02234 (60).
Stipulated Dismissal of All Claims and Counterclaims, *ADC Telecommunication, Inc. and Fiber Optic Network Solutions Corp. v. AFL Telecommunications LLC*, Civil Action No. 0:08-cv-02234-DWF-JSM, 2 pages (Jul. 27, 2010).
Order for Dismissal with Prejudice, *ADC Telecommunication, Inc. and Fiber Optic Network Solutions Corp. v. AFL Telecommunications LLC*, Civil Action No. 0:08-cv-02234-DWF-JSM, 1 page (Jul. 28, 2010).
Order for Dismissal with Prejudice, *ADC Telecommunication, Inc. and Fiber Optic Network Solutions Corp. v. AFL Telecommunications LLC*, Civil Action No. 0:08-cv-02234-DWF-JSM, 1 page (Aug. 6, 2010).
Complaint relating to Civil Action No. 08-CV-05222-RHK-JJK, filed Sep. 19, 2008.
First Amended Complaint relating to *ADC Telecommunications, Inc. v. Tyco Electronics Corp.*, Civil Action No. 08-CV-05222, filed Dec. 8, 2008.
Answer, Affirmative Defenses, and Counter Claims to the First Amended Complaint relating to *ADC Telecommunications, Inc. v. Tyco Electronics Corp.*, Civil Action No. 08-CV-05222, filed Mar. 13, 2009.
ADC's Reply to Counterclaims and Counterclaims relating to *ADC Telecommunications, Inc. v. Tyco Electronics Corp.*, Civil Action No. 08-CV-05222, filed Apr. 2, 2009.
Stipulated Dismissal of all Claims and Counterclaims relating to *ADC Telecommunications, Inc. v. Tyco Electronics Corp.*, Civil Action No. 08-CV-05222, filed Oct. 30, 2009.
Complaint, *CommScope Technologies LLC v. Clearfield, Inc.*, Civil Action No. 17-cv-00307-PJS-BRT, 77 pages (Jan. 31, 2017).
Exhibit A to Complaint, *CommScope Technologies LLC v. Clearfield, Inc.*, Civil Action No. 17-cv-00307-PJS-BRT, 60 pages (Jan. 31, 2017).
Exhibit B to Complaint, *CommScope Technologies LLC v. Clearfield, Inc.*, Civil Action No. 17-cv-00307-PJS-BRT, 6 pages (Jan. 31, 2017).
Exhibit C to Complaint, *CommScope Technologies LLC v. Clearfield, Inc.*, Civil Action No. 17-cv-00307-PJS-BRT, 4 pages (Jan. 31, 2017).
Exhibit D to Complaint, *CommScope Technologies LLC v. Clearfield, Inc.*, Civil Action No. 17-cv-00307-PJS-BRT, 4 pages (Jan. 31, 2017).
Exhibit E to Complaint, *CommScope Technologies LLC v. Clearfield, Inc.*, Civil Action No. 17-cv-00307-PJS-BRT, 3 pages (Jan. 31, 2017).
Answer to Complaint, *CommScope Technologies LLC v. Clearfield, Inc.*, Civil Action No. 17-cv-00307-PJS-BRT, 27 pages (Apr. 24, 2017).
CommScope's Initial Claim Charts, *CommScope Technologies LLC v. Clearfield, Inc.*, Civil Action No. 17-cv-00307-PJS-BRT, 66 pages (Jul. 31, 2017).
Plaintiffs Response to First Set of Interrogatories (Nos. 1-15), *CommScope Technologies LLC v. Clearfield, Inc.*, Civil Action No. cv-00307-PJS-BRT, 26 pages (Sep. 14, 2017).
Plaintiffs Supplemental Response to Interrogatory No. 2; *CommScope Technologies LLC v. Clearfield, Inc.*, Civil Action No. cv-00307-PJS-BRT, 5 pages (Sep. 22, 2017).
Defendant Clearfield Inc.'s Preliminary Invalidity Claim Charts and Disclosures, *CommScope Technologies LLC v. Clearfield, Inc.*, Civil Action No. 17-cv-00307-PJS-BRT, 62 pages (Oct. 6, 2017).
Exhibit 1 to Preliminary Invalidity Claim Charts and Disclosures, *CommScope Technologies LLC v. Clearfield, Inc.*, Civil Action No. 17-cv-00307-PJS-BRT, 50 pages (Oct. 6, 2017).
Exhibit 2 to Preliminary Invalidity Claim Charts and Disclosures, *CommScope Technologies LLC v. Clearfield, Inc.*, Civil Action No. 17-cv-00307-PJS-BRT, 82 pages (Oct. 6, 2017).
Exhibit 3 to Preliminary Invalidity Claim Charts and Disclosures, *CommScope Technologies LLC v. Clearfield Inc.*, Civil Action No. 17-cv-00307-PJS-BRT, 33 pages (Oct. 6, 2017).
Exhibit 4 to Preliminary Invalidity Claim Charts and Disclosures, *CommScope Technologies LLC v. Clearfield Inc.*, Civil Action No. 17-cv-00307-PJS-BRT, 46 pages (Oct. 6, 2017).
Exhibit 5 to Preliminary Invalidity Claim Charts and Disclosures, *CommScope Technologies LLC v. Clearfield Inc.*, Civil Action No. 17-cv-00307-PJS-BRT, 85 pages (Oct. 6, 2017).
Exhibit 6 to Preliminary Invalidity Claim Charts and Disclosures, *CommScope Technologies LLC v. Clearfield Inc.*, Civil Action No. 17-cv-00307-PJS-BRT, 118 pages (Oct. 6, 2017).

(56) References Cited

OTHER PUBLICATIONS

Plaintiff's Memorandum in Support of Motion to Compel; *CommScope Technologies LLC v. Clearfield, Inc.*, Civil Action No. 17-cv-00307-PJS-BRT, 21 pages (Oct. 9, 2017).
Defendant Clearfield Inc.'s Revised Preliminary Invalidity Claim Charts and Disclosures, Civil Action No. 17-cv-00307-PJS-BRT, 51 pages (Dec. 11, 2017).
Exhibit 1 to Revised Preliminary Invalidity Claim Charts and Disclosures, Civil Action No. 17-cv-00307-PJS-BRT, 42 pages (Dec. 11, 2017).
Exhibit 2 to Revised Preliminary Invalidity Claim Charts and Disclosures, Civil Action No. 17-cv-00307-PJS-BRT, 50 pages (Dec. 11, 2017).
Exhibit 3 to Revised Preliminary Invalidity Claim Charts and Disclosures, Civil Action No. 17-cv-00307-PJS-BRT, 32 pages (Dec. 11, 2017).
Exhibit 4 to Revised Preliminary Invalidity Claim Charts and Disclosures, Civil Action No. 17-cv-00307-PJS-BRT, 42 pages (Dec. 11, 2017).
Exhibit 5 to Revised Preliminary Invalidity Claim Charts and Disclosures, Civil Action No. 17-cv-00307-PJS-BRT, 69 pages (Dec. 11, 2017).
Exhibit 6 to Revised Preliminary Invalidity Claim Charts and Disclosures, Civil Action No. 17-cv-00307-PJS-BRT, 59 pages (Dec. 11, 2017).
Table A to Revised Preliminary Invalidity Claim Charts and Disclosures, Civil Action No. 17-cv-00307-PJS-BRT, 59 pages (Dec. 11, 2017).
Defendant Clearfield Inc's Second Revised Preliminary Invalidity Claim Charts and Disclosures, Civil Action No. 17-cv-00307-PJS-BRT, 65 pages (Jan. 12, 2018).
Exhibit 1 to Second Revised Preliminary Invalidity Claim Charts and Disclosures, Civil Action No. 17-cv-00307-PJS-BRT, 61 pages (Jan. 12, 2018).
Exhibit 2 to Second Revised Preliminary Invalidity Claim Charts and Disclosures, Civil Action No. 17-cv-00307-PJS-BRT, 65 pages (Jan. 12, 2018).
Exhibit 3 to Second Revised Preliminary Invalidity Claim Charts and Disclosures, Civil Action No. 17-cv-00307-PJS-BRT, 50 pages (Jan. 12, 2018).
Exhibit 4 to Second Revised Preliminary Invalidity Claim Charts and Disclosures, Civil Action No. 17-cv-00307-PJS-BRT, 60 pages (Jan. 12, 2018).
Exhibit 5 to Second Revised Preliminary Invalidity Claim Charts and Disclosures, Civil Action No. 17-cv-00307-PJS-BRT, 86 pages (Jan. 12, 2018).
Exhibit 6 to Second Revised Preliminary Invalidity Claim Charts and Disclosures, Civil Action No. 17-cv-00307-PJS-BRT, 79 pages (Jan. 12, 2018).
Commscope's Response to Clearfield's Second Revised Invalidity Claim Charts and Disclosure, Civil Action No. 17-cv-00307-PJS-BRT, 105 pages (Jan. 19, 2018).
Exhibit A to Response to Second Revised Preliminary Invalidity Claim Charts and Disclosures, Civil Action No. 17-cv-00307-PJS-BRT, 37 pages (Jan. 19, 2018).
Exhibit B to Response to Second Revised Preliminary Invalidity Claim Charts and Disclosures, Civil Action No. 17-cv-00307-PJS-BRT, 31 pages (Jan. 19, 2018).
Exhibit C to Response to Second Revised Preliminary Invalidity Claim Charts and Disclosures, Civil Action No. 17-cv-00307-PJS-BRT, 37 pages (Jan. 19, 2018).
Exhibit D to Response to Second Revised Preliminary Invalidity Claim Charts and Disclosures, Civil Action No. 17-cv-00307-PJS-BRT, 36 pages (Jan. 19, 2018).
Exhibit E to Response to Second Revised Preliminary Invalidity Claim Charts and Disclosures, Civil Action No. 17-cv-00307-PJS-BRT, 38 pages (Jan. 19, 2018).
Exhibit F to Response to Second Revised Preliminary Invalidity Claim Charts and Disclosures, Civil Action No. 17-cv-00307-PJS-BRT, 46 pages (Jan. 19, 2018).
Joint Status Report, *CommScope Technologies LLC v. Clearfield, Inc.*, Civil Action No. 0:17-cv-00307-PJS-BRT, 11 pages (Feb. 9, 2018).
Joint Status Report Exhibit A, *CommScope Technologies LLC v. Clearfield, Inc.*, Civil Action No. 0:17-cv-00307-PJS-BRT, 33 pages (Feb. 9, 2018).
Joint Status Report Exhibit B, *CommScope Technologies LLC v. Clearfield, Inc.*, Civil Action No. 0:17-cv-00307-PJS-BRT, 21 pages (Feb. 9, 2018).
Stipulation of Dismissal, *CommScope Technologies LLC v. Clearfield, Inc.*, Civil Action No. 0:17-cv-00307-PJS-BRT, 2 pages (Feb. 19, 2018).
Order of Dismissal, *CommScope Technologies LLC v. Clearfield, Inc.*, Civil Action No. 0:17-cv-00307-PJS-BRT, 1 page (Feb. 20, 2018).
Petition for Inter Partes Review of U.S. Pat. No. 7,809,233, Case No. IPR2018-00154, 81 pages (Nov. 7, 2017).
Exhibit 1001 to IPR IPR2018-00154—U.S. Pat. No. 7,809,233 ("the '233 Patent").
Exhibit 1002 to IPR IPR2018-00154—Prosecution History of the '233 Patent ("the Prosecution History").
Exhibit 1003 to IPR IPR2018-00154—Declaration of Dr. Michael Lebby.
Exhibit 1004 to IPR IPR2018-00154—JP 2000-193833A to Oda et al. ("Oda") with certified translation.
Exhibit 1005 to IPR IPR2018-00154—JP 2000-241629A to Hirao et al. ("Hirao") with certified translation.
Exhibit 1006 to IPR IPR2018-00154—U.S. Pat. No. 6,983,095 to Reagan et al. ("Reagan").
Exhibit 1007 to IPR IPR2018-00154—U.S. Pat. No. 6,256,443 to Uruno et al. ("Uruno").
Exhibit 1008 to IPR IPR2018-00154—Excerpt from CommScope's Initial Claim Charts (Exhibit C) served Jul. 31, 2017, in *CommScope Technologies LLC v. Clearfield, Inc.*,Case No. 0:12-cv-00307-PJS-BRT (D. Minn.).
Exhibit 1009 to IPR IPR2018-00154—"SSC-PE Series Single-Mode SC Connector Plugs: Technical Specifications," Seiko Instruments, Inc., copyright 2002 ("Seiko Specification").
Exhibit 1010 to 1PR IPR2018-00154—"JIS C 5973: F04 Type connectors for optical fiber cables," Japanese Standards Association, 1998 ("KS C 5973 Standard").
Exhibit 1011 to IPR IPR2018-00154—"Senko Advanced Components: SC Connector Kits," printout from website of Senko Advanced Components at www.senko.com/fiberoptic/detail_product.php?product=80 available at least as early as Mar. 26, 2003 (obtained Oct. 5, 2017 via Internet Archive Wayback Machine) ("Senko Data Sheet").
Exhibit 1012 to IPR IPR2018-00154—"Corning Cable Systems UniCam™ SC/ST-Compatible/FC Connector Assembly Instructions Using FBC-006 Cleaver," Corning Cable Systems, Inc., May 2001 ("Corning Data Sheet").
Preliminary Response by Patent Owner Under 37 C.F.R. § 42.107, Case No. IPR2018-00154, 60 pages (Feb. 16, 2018).
Exhibit 2001—Declaration of Casimer DeCusatis in Support of Patent Owner's Preliminary Response, Case No. PR2018-00154, 39 pages (Feb. 13, 2018).
Exhibit 2002—Declaration of Michael Lebby, Ph.D., in Support of Petition for Inter Partes Review of U.S. Pat. No. 8,705,929 (Ex. 1003 in *Clearfield, Inc. v. CommScope Technologies LLC*, IPR2017-02122), Case No. PR2018-00154, 141 pages (Feb. 16, 2018).
Exhibit 2003—Exhibit 10 to Clearfield Inc.'s Second Revised Preliminary Invalidity Claim Charts and Disclosures, served on Jan. 12, 2018, Case No. PR2018-00154. 43 pages (Feb. 16, 2018).
Petition for Inter Partes Review of U.S. Pat. No. 7,198,409, Case No. IPR2018-00003, 61 pages (Oct. 6, 2017).
Exhibit 1003—Declaration of Dr. Michael Lebby.
Exhibit 1004—JP 2000-241629A to Hirao et al. ("*Hirao*") with certified translation.
Exhibit 1005—U.S. Pat. No. 6,554,485 ("*Beatty*").
Exhibit 1006—"SSC-PE Series Single-Mode SC Connector Plugs: Technical Specifications," Seiko Instruments, Inc., copyright 2002 ("*Seiko Specification*").

(56) References Cited

OTHER PUBLICATIONS

Exhibit 1008—"JIS C 5973: F04 Type connectors for optical fiber cables," Japanese Standards Association, 1998 ("*JIS C 5973 Standard*")

Exhibit 1009—"Senko Advanced Components: SC Connector Kits," printout from website of Senko Advanced Components at www.senko.com/fiberoptic/detail_product.php?product=80 available at least as early as Mar. 26, 2003 (obtained Oct. 5, 2017 via Internet Archive Wayback Machine) ("*Senko Data Sheet*".

Exhibit 1010—"Corning Cable Systems UniCam™ SC/ST-Compatible/FC Connector Assembly Instructions Using FBC-006 Cleaver," Corning Cable Systems, Inc., May 2001 ("*Corning Data Sheet*").

Preliminary Response by Patent Owner Under 37 C.F.R. § 42.107, Paper No. 5, Case No. IPR2018-00003, 77 pages (Jan. 12, 2018).

Exhibit 2001 to Paper No. 5—Declaration of Casimer Decusatis in Support of Patent Owner's Preliminary Response, Case No. IPR2018-00003, 50 pages (Jan. 11, 2018).

Exhibit 2002 to Paper No. 5—True and correct information downloaded from the website https://www.commscope.com/catalog/solution_wn_centralofc_hdfullfrontodf/2147496441/pdf/part/63205/CS6174-000_FIST-GR3-R-300_300-22-2.pdf on Jan. 5, 2018.

Exhibit 2003 to Paper No. 5—True and correct information downloaded from the website http://wbtnetworks.com.au/product/high-density-optical-distribution-frame-00-series/ on Jan. 5, 2018.

Exhibit 2004 to Paper No. 5—True and correct information downloaded from the website https://www.seeclearfield.com/products/category/frames/fxhd-frames.html on Jan. 5, 2018.

Exhibit 2005 to Paper No. 5—True and correct information downloaded from the website http://www.lxtelecom.com/fiber-optics/optical-fiber-distribution-frames/hd-odf-gpx82-5.html on Jan. 5, 2018.

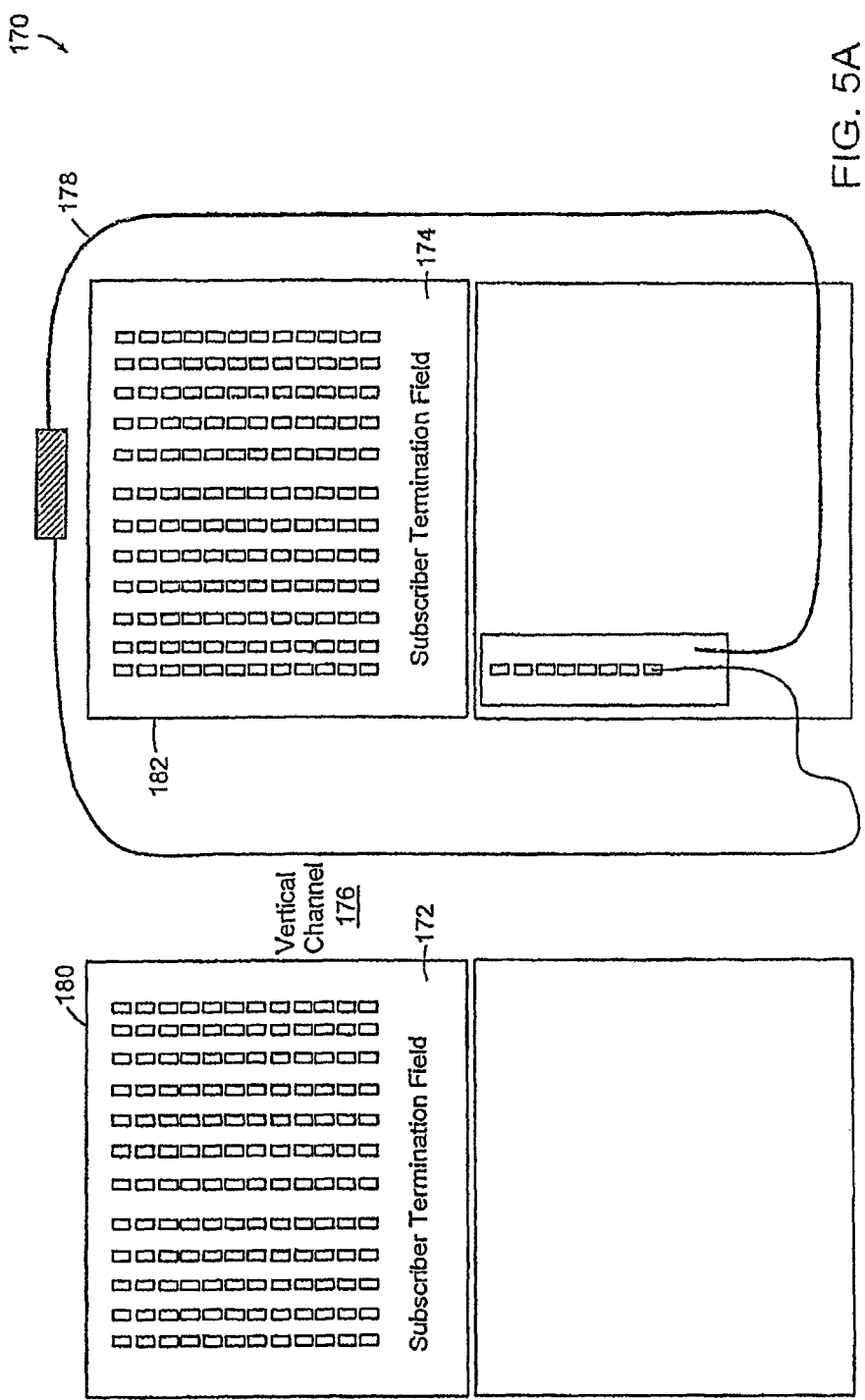

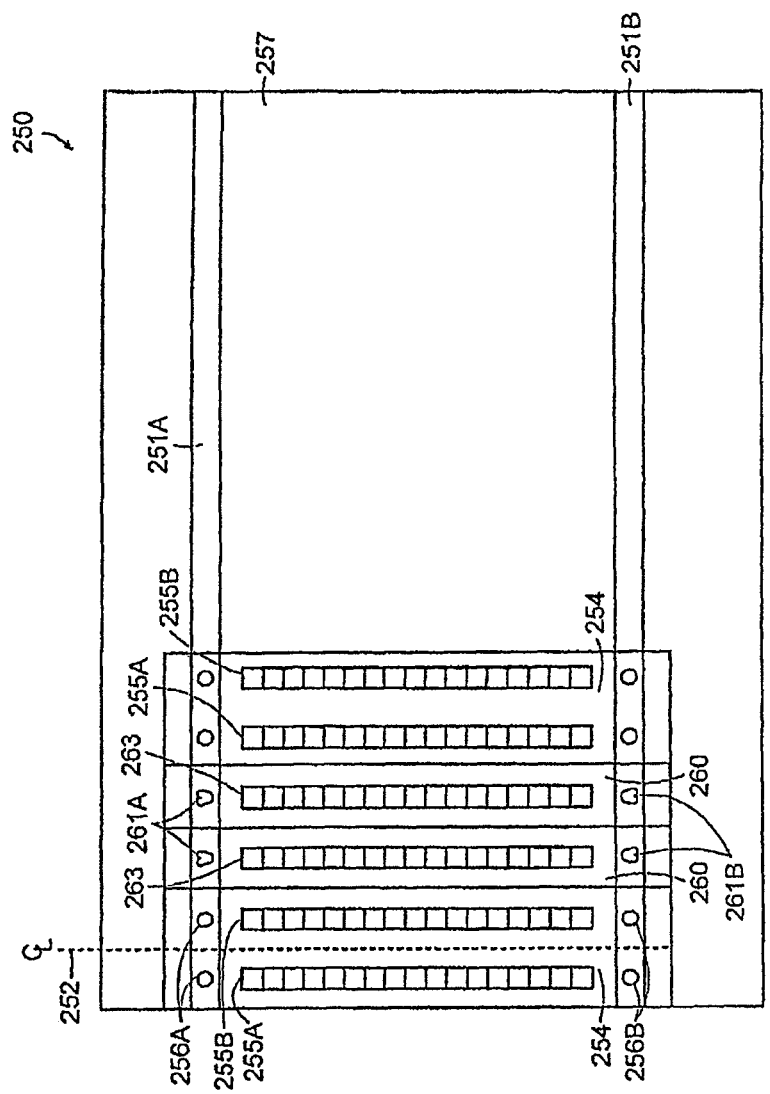

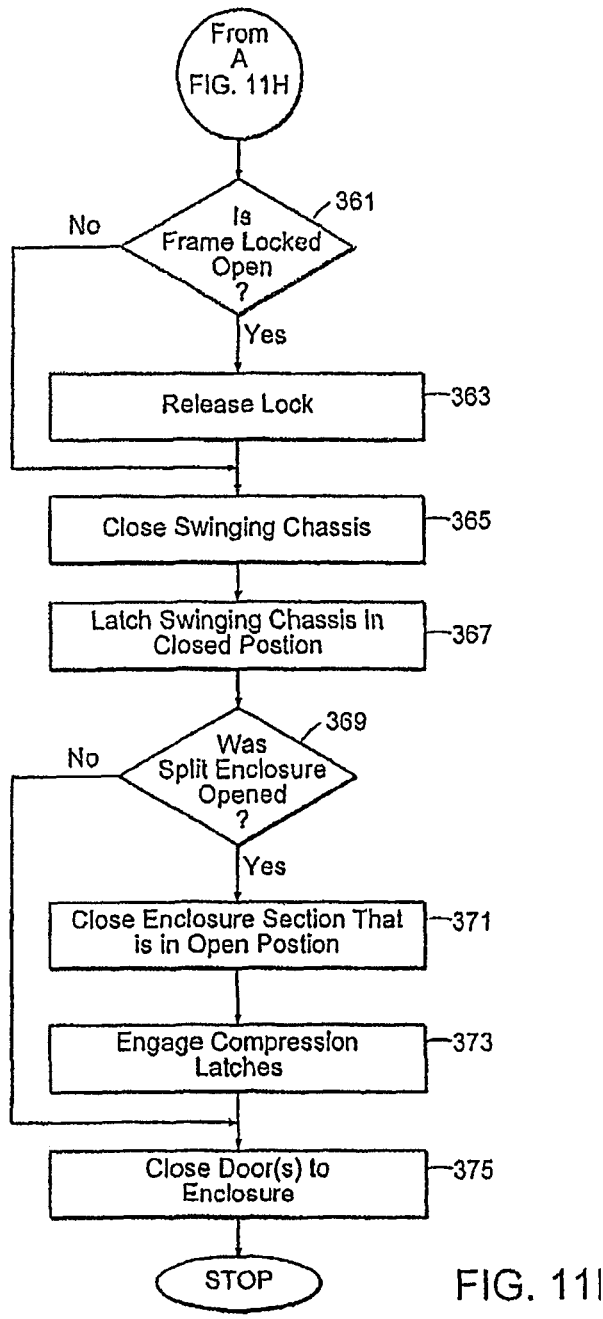

FIBER DISTRIBUTION DEVICE

CROSS REFERENCE TO RELATED APPLICATIONS

This application is a continuation of application Ser. No. 15/634,141 filed Jun. 27, 2017, now U.S. Pat. No. 10,393,980, which is a continuation of application Ser. No. 15/077,265 filed Mar. 22, 2016, now U.S. Pat. No. 9,739,970, which is a continuation of application Ser. No. 14/814,146 filed Jul. 30, 2015, now U.S. Pat. No. 9,335,505, which is a continuation of application Ser. No. 14/566,123, filed Dec. 10, 2014, now U.S. Pat. No. 9,146,373, which is a continuation of application Ser. No. 13/765,199, filed Feb. 12, 2013, now U.S. Pat. No. 9,146,372, which is a continuation of application Ser. No. 12/897,475, filed Oct. 4, 2010, now U.S. Pat. No. 8,374,476, which is a continuation of application Ser. No. 12/435,181, filed May 4, 2009, now U.S. Pat. No. 7,809,235, which is a continuation of application Ser. No. 12/426,723, filed Apr. 20, 2009, now U.S. Pat. No. 7,844,161, which is a continuation of application Ser. No. 11/820,845, filed Jun. 20, 2007, now U.S. Pat. No. 7,873,255, which is a continuation of application Ser. No. 11/203,157, filed Aug. 15, 2005, now U.S. Pat. No. 7,369,741, which claims the benefit of provisional application Ser. No. 60/672,502, filed Apr. 19, 2005, and which is a continuation-in part of application Ser. No. 10/991,135, filed Nov. 17, 2004, now U.S. Pat. No. 7,200,317, which is a continuation-in-part of application Ser. No. 10/714,814, filed Nov. 17, 2003, now U.S. Pat. No. 6,983,095, which applications are incorporated herein by reference in their entirety.

TECHNICAL FIELD

The present invention relates generally to optical communication networks, and more particularly to devices and techniques for managing a passive optical communications network.

BACKGROUND

In Fiber-to-the-Premises broadband network applications optical splitters are used to split the optical signals at various points in the network. Recent network specifications call for optical splitters to be incorporated in fiber distribution hubs (FDHs) which are re-enterable outdoor enclosures. These enclosures allow easy re-entry for access to optical splitters allowing splitter ports to be utilized effectively and for additional splitter ports to be added on an incremental basis.

In typical applications to date, optical splitters are provided prepackaged in optical splitter module housings and provided with splitter outputs in pigtails that extend from the module. The splitter output pigtails are typically connectorized with high performance low loss simple connector (SC) and/or LC connectors. This optical splitter module, or cassette, provides protective packaging for the optical splitter components in the housing and thus provides for easy handling for otherwise fragile splitter components. This approach allows the optical splitter modules to be added incrementally to the FDH, for example, as required.

A problem may arise due to the lack of protection and organization of the connectorized ends of the splitter output pigtails. For example, these pigtails can sometimes be left dangling in a cable trough or raceway within the enclosure. Leaving an optical component, such as a high performance connector, exposed in an open area leaves it susceptible to damage. These high performance connectors if damaged can cause delays in service connection while connectors are repaired. Leaving connectorized splitter output pigtails dangling in a cabling trough also exposes them to dirt and debris in the cabling trough. In current network deployments it may be important to maintain clean optical connectors to maximize the performance of the network.

In addition, fiber pigtails in the current art may be organized in a manner that is not conducive to rapid service delivery. In many cases splitters may have sixteen or thirty-two output pigtails bundled together making it difficult to find a particular pigtail. Also the bundle of loose hanging pigtails can easily become entangled and/or damaged causing further delays in service delivery. These tangles can cause congestion and, in some cases, result in bend induced loss on the pigtails, causing lower system performance.

To solve some of these issues a separate storage tray or enclosure has been utilized to take up slack and/or store and protect splitter output pigtail connectorized ends. However, these auxiliary devices tend to take up additional space and often obscure pigtails in an enclosure making it difficult for a linesman to locate a particular pigtail and/or connector. As a result, delays may occur in deployment of new subscriber connections depending on how much time is required to access the fiber pigtails in the enclosure. Thus, there is a need for a solution that provides convenient storage for fiber pigtails and/or connectors and does not take up additional space in the enclosure. The solution should provide direct access to and identification of fiber pigtails and/or connectors.

Finally current methods tend to result in a disassociation of the splitter module from the splitter output pigtail end. This usually results because the pigtail, once deployed, gets lost in the midst of other pigtails in the fiber jumper trough. When subscribers are taken out of service it is desirable to disconnect the splitter output and redeploy or store it for ready redeployment. It is further desirable for administrative purposes to maintain association of splitter module to splitter output pigtails so that resources are used effectively over time.

FDHs may benefit from devices and techniques that can be adapted to facilitate the organization of fiber pigtails and fiber pigtail terminations as well as protecting sensitive optical components when not in use. The devices and techniques should also facilitate easy access to pigtails and connectors so that subscribers may be efficiently connected and disconnected from the network. The devices and techniques should also group pigtails and connectors in a manner that allows them to be associated with a particular splitter module.

SUMMARY

In accordance with an implementation, a fiber distribution device includes a swing frame chassis pivotally mounted to a support structure. At least a first optical splitter module is mounted to the swing frame chassis. Pigtails having connectorized ends are carried by the swing frame chassis and have portions that are routed generally vertically on the swing frame chassis. An optical termination field includes fiber optic adapters carried by the swing frame chassis. The fiber optic adapters are configured to receive the connectorized ends of the pigtails.

In accordance with another implementation, a fiber distribution device includes a swing frame chassis pivotally mounted to a support structure; at least a first optical splitter module mounted to the swing frame chassis; pigtails having connectorized ends that are carried by the swing frame chassis; and an optical termination field. The pigtails are accessible when the swing frame chassis is arranged in the closed position.

In accordance with still another implementation, a method for configuring an enclosure in an optical communications network is provided.

BRIEF DESCRIPTION OF THE DRAWINGS

FIGS. 5A and 5B schematically illustrate the installation of the optical splitter module pigtails and the service connection configuration of the optical splitter module, respectively, in a network having modules adjacent to each other in accordance with a preferred embodiment of the present invention;

FIGS. 6B-6H illustrate exemplary splitter module arrangements in accordance with an aspect of the invention;

FIGS. 11H and 11I illustrate an exemplary method for using an FDH enclosure having a split housing;

DETAILED DESCRIPTION

As generally described herein, an optical splitter module that is equipped with adapters for storing connectorized optical splitter pigtail ends is disclosed. Adapters are administratively located on the optical splitter module bulkhead, for example, but not limited to, in octal count arrangements ideally suited to identify splitter ports having sixteen or thirty-two output ports. The adapters in accordance with preferred embodiments are used to store or stage the connectorized ends of the optical splitter for rapid location, identification, easy access and removal of pigtail output ends. In accordance with preferred embodiments, the optical splitter outputs extending from the bulkhead on the module are wrapped back and secured to adapters on the splitter bulkhead. The preferred embodiments also include methods for installing optical splitter modules and associated fixed length output pigtails, storing the connectorized ends of the pigtails in a position ready for deployment and then individually connecting the splitter outputs as required to connect service to subscriber terminations.

Figure 1:
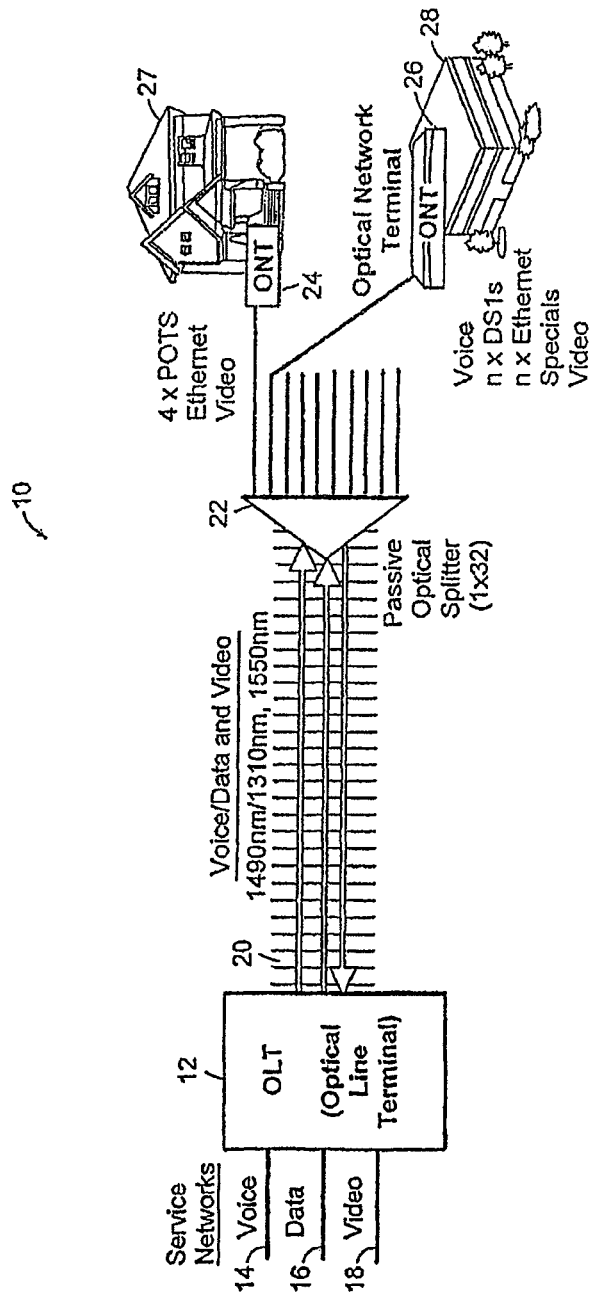
FIG. 1 illustrates schematically a broadband access network, for example, a fiber-to-the-premises (FTTP) network using passive optical network (PON) components in accordance with a preferred embodiment of the present invention.

FIG. 1 illustrates, schematically, a broadband access network 10, which for example, can be a Fiber-to-the-Premises (FTTP) network using passive optical network (PON) components in accordance with a preferred embodiment of the present invention.

FIG. 1 includes an optical line terminal (OLT) 12, a voice input 14 from a service network, a data input 16 from a service network, a video input 18 from a service network, a wavelength division multiplexed fiber 20, a passive optical splitter 22, an optical network terminal (ONT) 24 and 26, a residence and an office building 28.

Network 10 employs OLT 12 which receives input data streams from service networks. By way of example, OLT 12 may receive voice input 14, data input 16 and video input 18. OLT 12 may then output a multiplexed data stream over one or more optical fibers 20. In an embodiment, OLT 12 may output voice at a wavelength on the order of 1490 nm, data at a wavelength on the order of 1310 nm and video at a wavelength on the order of 1550 nm. Optical fiber 20 may convey data using, for example, wavelength division multiplexing (WDM) to a passive optical splitter (POS) 22. POS 22 may receive data by way of a single fiber (the input fiber)

and split the data across a plurality of output fibers. For example, POS 22 may split incoming data across 8, 16, 32, or more output fibers. In a preferred embodiment, each output fiber is associated with a respective end user such as a residential end user 27 or a commercial end user in office building 28. End user locations may employ optical network terminals (ONTs) 24, 26 for accepting multiplexed data and making it available to the end user. For example, ONT 24 may act as a demultiplexer by accepting a multiplexed data stream containing voice, video and data and demultiplexing the data stream to provide a separate voice channel to a user's telephone, a separate video channel to a television set and a separate data channel to a computer.

The architecture described in conjunction with FIG. 1 can be a point to multi-point PON construction, which utilizes, for example, 1:32 splitters at a fiber hub enclosure within a distribution area. The architecture can be fiber rich 1:1 distribution between the fiber hub and a customer's premise or the architecture can be diluted 1:X where X is an integer larger than 1. The broadband services capability of network 10 for distributing source information may include, for example, data signals (622 Mbps×155 Mbps (shared)), and video signals (860 MHz, ~600 analog and digital channels, high definition television (HDTV), and video on demand (VOD)). Source information may consist of data, such as, for example, voice or video that originates at a source such as a telecommunications service provider, hereinafter service provider. Signaling may be accomplished using wavelength division multiplexing (WDM) and fiber sharing. Network 10 can include optical network terminals 26 that are scalable, provide high bandwidth, multi-service applications that serve residences and small to medium sized businesses. Network 10 includes passive components that are located outside the plant, i.e. outside the service provider's building, and require minimal maintenance, since active components such as amplifiers are not required.

The broadband access network 10 includes digital subscriber plug-in line cards that have a broadband terminal adapter configured for receiving a digitally multiplexed broadband data stream and outputting a plurality of demultiplexed broadband data streams for the respective subscriber loops.

Figure 2:
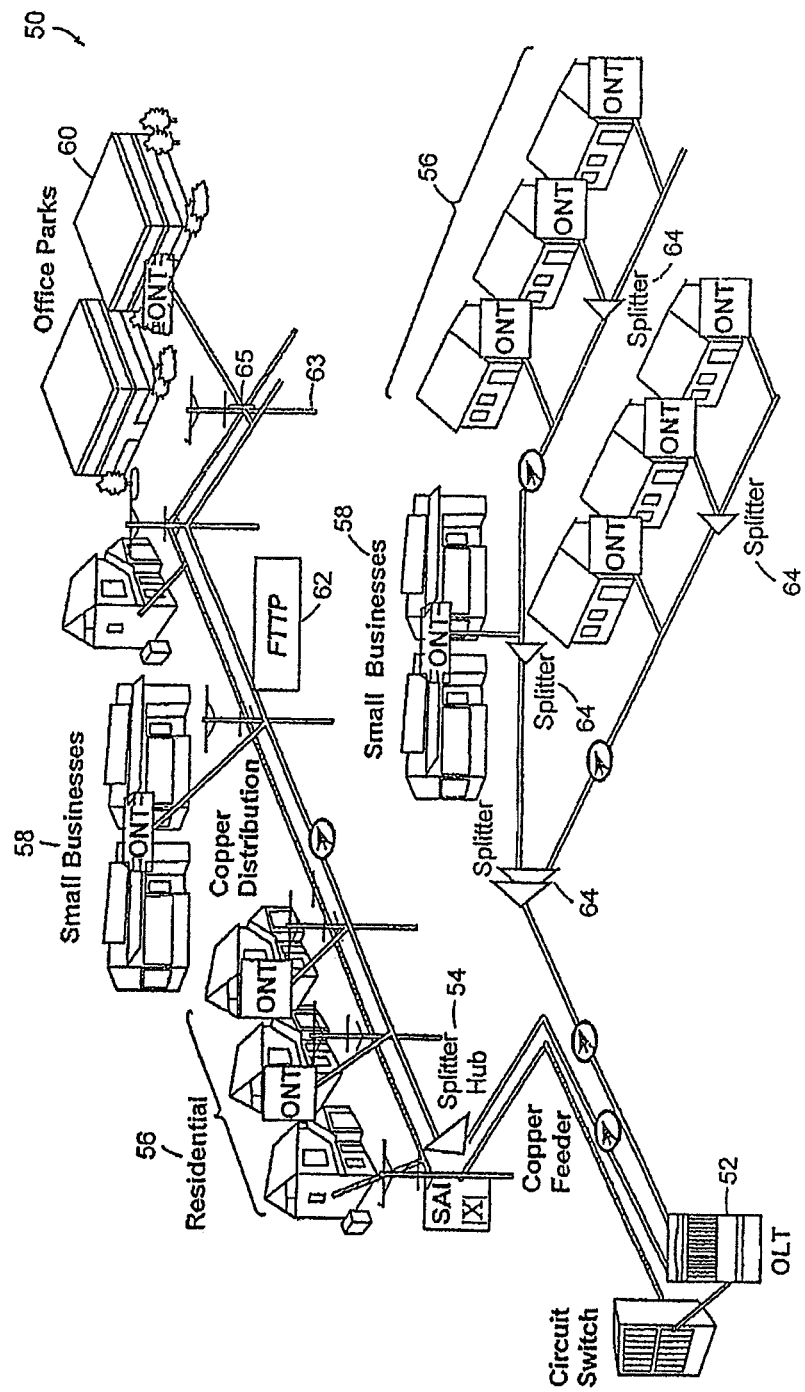
FIG. 2 illustrates schematically further details of an FTTP network in accordance with a preferred embodiment of the present invention.

FIG. 2 illustrates an alternative implementation of an optical broadband access network 50. Network 50 may include a circuit switch/OLT 52, an SAI, a splitter hub 54, residential ONTs 56, small business ONT 58, office park ONT 60, splitter 64, and fiber-to-the-premises (FTTP) 62. In Fiber-to-the-Premises broadband network applications optical splitters 64 are used to split the optical signals at various points in the network. In FTTP network 50 optical splitters are typically located in both indoor and outdoor environments including a Central Office/Head End, environmentally secure cabinets, enclosures or fiber drop terminals. In some outdoor applications, optical splitters have been deployed in tightly sealed environmental enclosures that are not easily re-enterable. Preferred embodiments include optical splitters incorporated in fiber distribution hubs 54 which are re-enterable outdoor enclosures. These enclosures allow easy re-entry by linesmen or other service personnel for access to optical splitters 64 allowing splitter ports to be utilized effectively and for additional splitter ports to be added on an incremental basis.

Preferred embodiments of the present invention may receive data from optical splitters that are provided prepackaged in optical splitter module housings that are mounted in a fiber patch panel to facilitate routing of jumpers interconnected from fibers in adjacent subscriber ports to the splitter outputs. This optical splitter module, or cassette, provides protective packaging and thus easy handling for otherwise fragile splitter components. The optical splitter modules can be added incrementally to the patch panel.

FTTP broadband networks are designed to achieve low optical insertion loss in order to achieve maximum network reach from electronics having fixed power output. Each optical component and subsystem utilized in the network is optimized to provide minimum insertion loss. The optical loss budget in a preferred embodiment is approximately 23 to 25 dB with 1:32 passive splitting. The components and factors contributing to the optical loss include splitters (1:32, single or cascaded), WDMs, connectors (optical line terminal (OLT), FDF, splitters, drop, ONT), fiber attenuation (at least three wavelengths: 1310 nm, 1490 nm, 1550 nm), and splicing.

Splitter hub 54 may serve on the order of 128 splitter ports/premises. It includes multiple distribution cables, connectorized or fusion spliced between splitter and distribution hub 54. The splitter hubs used in conjunction with preferred embodiments are pole or ground mountable. The drop terminals can be with or without splitters and include various number of drops, both aerial and buried.

Splitters 64 may be deployed by way of splitter hub 54 or they may be deployed in smaller enclosures. A fiber drop terminal 65 is often used in conjunction with a utility pole 63 (FIG. 2). Utility pole 63 may be used to support conventional copper wire strands such as those used for plain old telephone service (POTS) and those used for cable television (CATV). For example, POTS strands may consist of a plurality of twisted pairs and CATV may consist of coaxial cables. Utility pole 63 may also support optical fiber bundles such as those used for delivering FTTP services. A fiber drop terminal 65 may be attached to utility pole 63 and communicatively coupled with one-or-more of the optical fibers contained in a strand. Fiber drop terminal 65 may be spliced to optical fibers using techniques known in the art. For example, fiber drop terminal 65 may be spliced to an optical fiber at a manufacturing or assembly plant at a predetermined location on a strand, or fiber drop terminal 65 may be spliced to an optical fiber in the field by a linesman, or other crafts person, at a determined location.

Fiber drop terminals are used to interface between distribution cables and drop cables in a Passive Optic Network (PON) application. The fiber drop terminal 65 typically is installed by splicing a multi-fiber cable at a branch point in a large fiber count distribution cable. Fiber drop terminals may typically consist of 2, 4, 6, 8 or 12 fibers and in some instances even more fibers. A single cable may be used as the input to the terminal containing the fibers with the aforementioned counts. By way of example, a feed cable may have a central tube housing a plurality of individual optical fibers. Inside fiber drop terminal 65 the multi-fiber feed cable is separated into individual fibers and then terminated on individual rugged outdoor connector/adapters located on the exterior surface of the enclosure. Fiber drop terminal 65 is thus used to stage the PON cabling system near premises locations, such as a residence or office building, so that when a subscriber requests service a simple connectorized drop cable can be quickly connected between the fiber drop terminal and the Optical Network Terminal (ONT) at the home.

In some embodiments, optical connectors are used in the network to provide the desired flexibility however they are restricted to those points in the network where flexibility is absolutely required. Optical connectors are required to provide flexible access to optical splitter outputs. The preferred embodiments of the present invention provide connector flexibility and yet minimize optical loss using the optical splitter module with connectorized pigtails. The pigtails may have standard SC or LC type connectors on the ends.

Figure 3A:
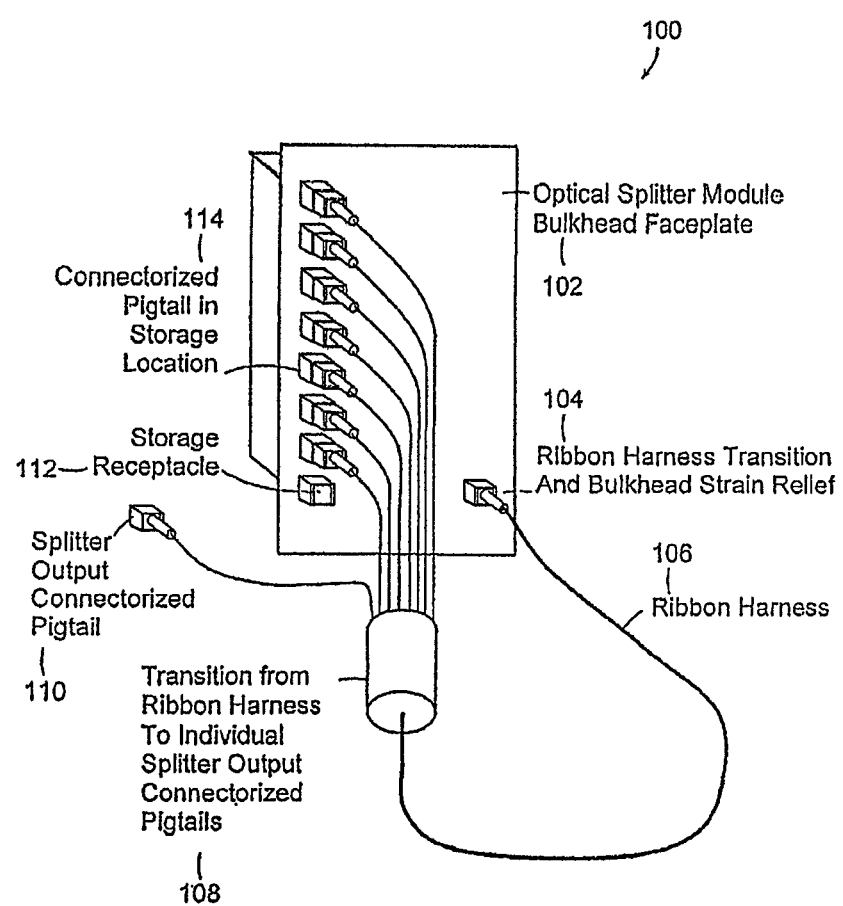
FIG. 3A illustrates an optical splitter module in a fiber distribution network having connectorized pigtails in accordance with a preferred embodiment of the present invention.

FIG. 3A illustrates an optical splitter module 100 in a fiber distribution network having connectorized pigtails in accordance with an exemplary embodiment. Module 100 may include essentially any number of output pigtails; however, typical deployments will utilize either 16 or 32 outputs per splitter module. The module 100 includes a bulkhead faceplate 102 having storage receptacles 112. In one embodiment, the optical splitter module 100 provides for a high density ribbon cabling harness 106 to protect the splitter outputs extending from module 100. The optical splitter module ribbon harness 106 is secured to module 100 with a strain relief mechanism 104 to provide high pull strength and bend radius control. The compact nature of the ribbon harness 106 allows for higher packing density and better space utilization in the cabling trough. The module harness is converted to individual pigtails with connectors to allow splitter outputs to be administered and rearranged individually.

Module 100 may be equipped with either half non-functional adapters or full functioning adapters as a means for storing pigtail ends. In preferred embodiment, the half non-functional adapters are used in applications not requiring fiber optic terminators other than for storage functionality. The full functional adapters are used in applications requiring connection of fiber optic terminators to the optical splitter output port. Access to the pigtail ferrule tip may be required for attaching fiber optic terminators to eliminate undesirable reflections caused by unterminated connectors. The module provides a home position from which optical splitter output pigtails can be deployed from when placed into service and where the splitter output pigtails can be returned to once taken out of service. This administrative use of adapters provides protection for the connectorized pigtails ends, maintains cleanliness of the connector ends, and enables rapid service connection and deployment.

The embodiments of the present invention address configuring a fiber distribution hub with optical splitter modules having fixed length connectorized pigtails. One aspect determines where to position the optical splitter modules relative to other fiber terminations needing access to the optical splitter ports. The embodiments also provide for installing pigtails in a configuration that requires minimal pigtail rearrangement and slack yet allows for enough slack to reach any of the fiber terminations that require access to splitter ports. The methods of installing optical splitter module pigtails include determining how to route the pigtails in order to provide an optimal routing scheme that does not become congested and wherein slack can be controlled within set limits of the enclosure. The methods may include making all pigtails the same length for ease of manufacturing and ordering by the customer. Splitter modules all having the same pigtail length also allow ease of flexibility for allowing a splitter module to be installed in any available slot within the patch panel without regard to sequential order. While fixed length pigtails are preferred for many applications, embodiments are not limited thereto. If desired, variable length pigtails may also be used.

One embodiment for installing the splitter module pigtails also provides for fiber management in the enclosure so that rearrangement and churn does not interfere with management of the pigtails. To accomplish this, the slack and any chance of blocking access because of fiber entanglement is minimized. Some embodiments allow for churn over time including initial pigtail storage, service connection, service disconnection and repeat storage to provide ready access to pigtails for future use. The method can be non-blocking and non-congesting for jumpers routed into cable pathways and fiber patch panels. The method can be fully contained within the confines of the enclosure.

Figure 3B:
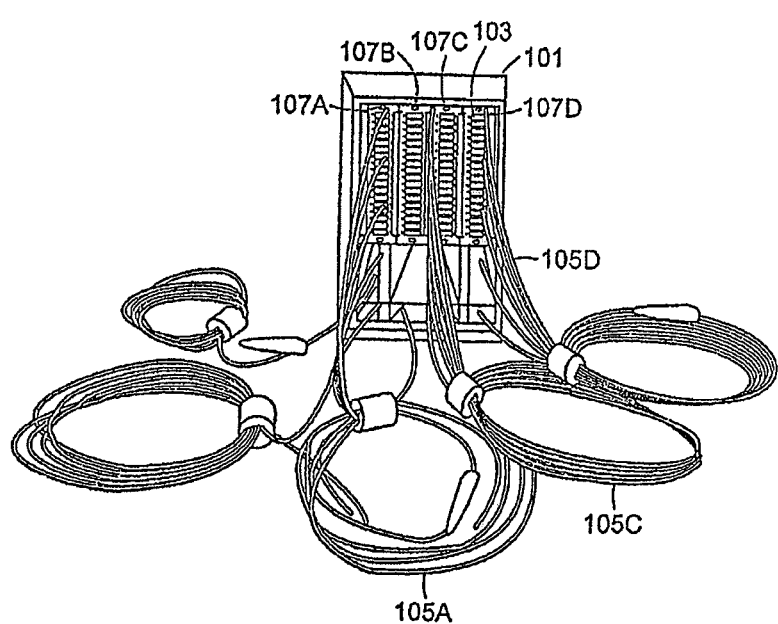
FIG. 3B illustrates an exemplary embodiment of an optical component module in accordance with a preferred embodiment of the invention.

FIG. 3B illustrates a view of the optical component modules (OCM) 107A-D in module chassis frame 101 a fiber distribution hub enclosure in accordance with an embodiment of the present invention. The FDH configuration provides for fiber management hardware on one side of the cabinet. This allows fiber jumpers to be routed between the termination shelf and the splitter shelf. Excess slack can be managed on the side of the cabinet using slack loops.

In accordance with one embodiment, OCM modules 107 A-D can also be equipped with pigtails 105 to reduce the number of connections in the network. The modules shown in FIG. 3B may each contain a 1×32 splitter with pigtails provided on the input and 32 outputs. The connectorized ends of the pigtails are stored on bulkhead adapters 103 on the front of the module. These storage adapters provide a familiar locating scheme for spare pigtails so that connector ends can be quickly identified and connected to distribution fibers. The spacing on the adapters is the same as on standard connector panels.

In some embodiments, OCM modules can also be equipped with standard terminators. Modules terminated with bulkhead adapters may be equipped with terminators on the front of the module. Modules connected via pigtails and equipped with storage adapters are equipped with terminators on the rear of the panel.

Figure 4A:
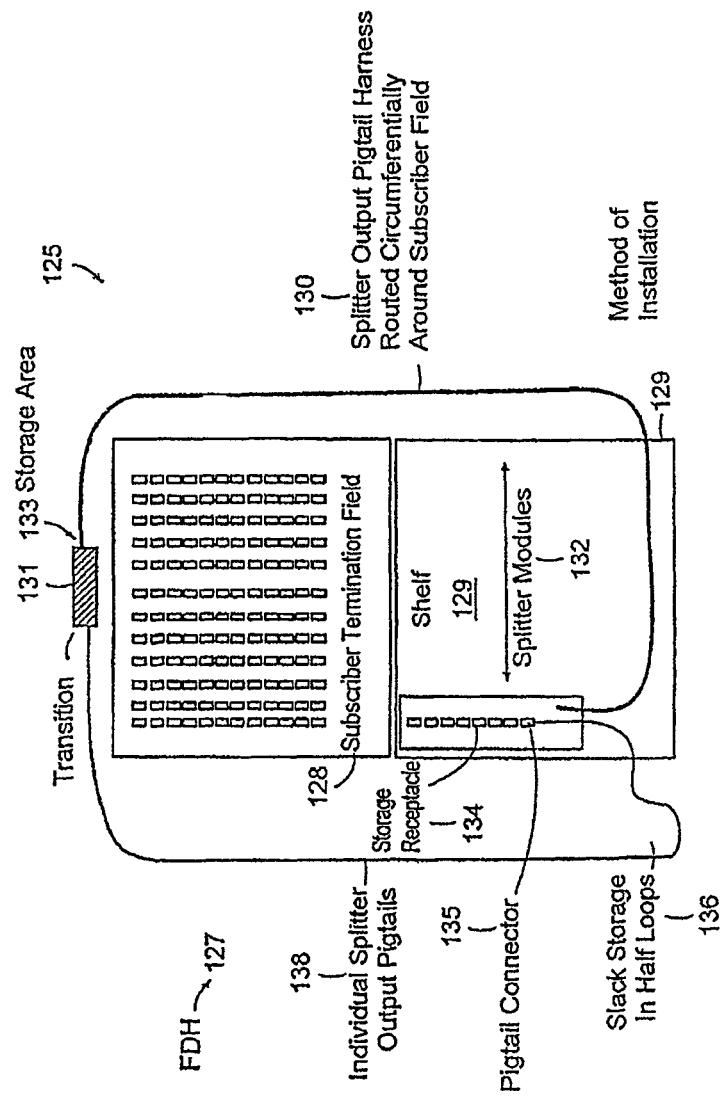
FIG. 4A schematically illustrates the installation of the optical splitter module pigtails in accordance with a preferred embodiment of the present invention.

FIG. 4A schematically illustrates the installation of the optical splitter module pigtails 138 in accordance with an embodiment of the present invention. An embodiment of the present invention includes a cabling installation layout 125 for FDH 127 including splitter modules 132 incrementally installed on a shelf 129 adjacent to a subscriber termination field 128. The connectorized pigtails 138 from the splitter modules 132 having fixed identical length are routed in a circumferential path 130 surrounding the subscriber termination field 128. The connectorized ends of the pigtails 138 are stored at a position on the front of the splitter module 132 using storage receptacles 134. The layout in accordance with a preferred embodiment employs a fan through placement so that the splitter module pigtails can be installed without disturbing installed pigtails already connected to subscriber termination field 128. This installation layout in accordance with a preferred method of the present invention also ensures that the splitter module 132 can be preconfigured with the pigtail connectors 135 in the storage position and left in the storage position throughout the pigtail installation process.

Figure 4B:
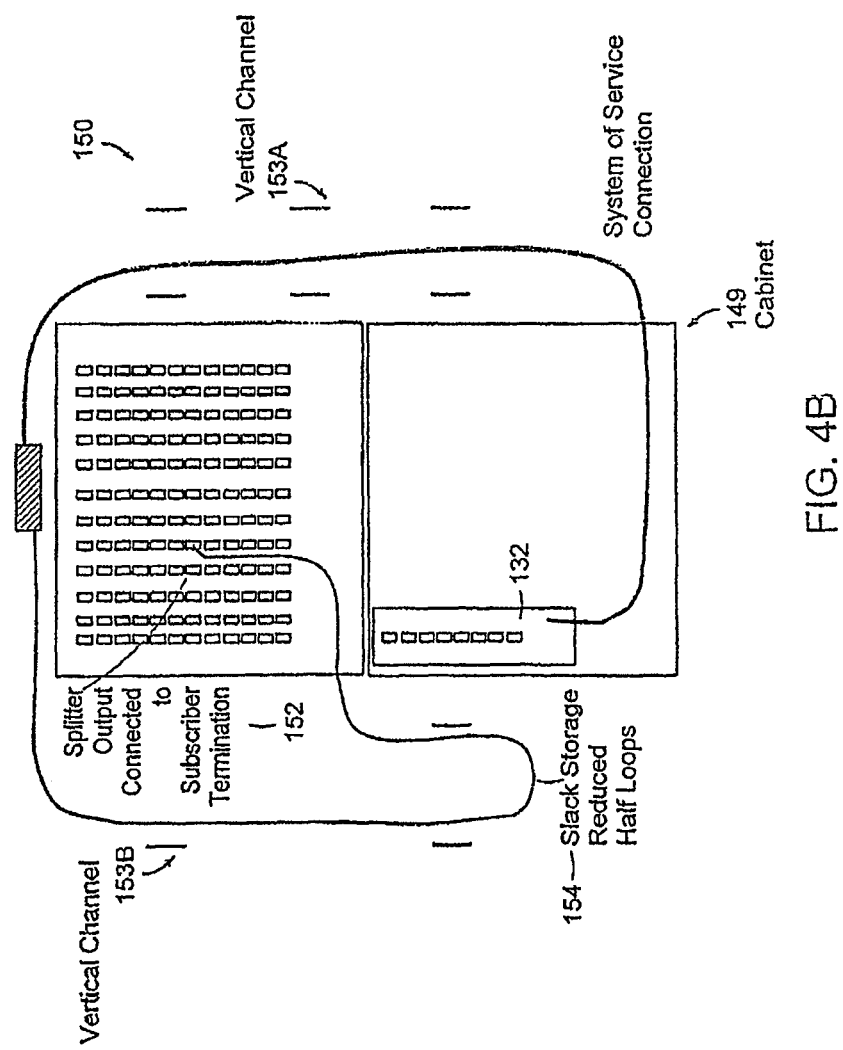
FIG. 4B schematically illustrates the service connection configuration of the optical splitter module in accordance with a preferred embodiment of the present invention.

FIG. 4B schematically illustrates the service connection configuration 150 of the optical splitter module in accordance with an embodiment of the present invention shown in FIG. 4A. The embodiments of the present invention include a service connection method to connect a subscriber into service by first disconnecting an individual splitter output pigtail 138 from the storage position in splitter module 132 and then routing the pigtail to the desired subscriber port 152. Since the pigtail harness has been preconfigured and routed circumferentially around the subscriber termination, the pigtail 138 inherently reaches any of the desired subscriber ports within the target population by simply reducing the circumferential path distance. By reducing the circumferential path the pigtail slack exhibits additional slack. The additional slack may be taken up using slack-half loops in the vertical channel 153A, B, or pigtail channel, where the pigtails are routed. The random nature of connecting splitter output pigtails to subscriber ports 152 may result in a group of various size half-loops 154 that are managed in the vertical channel 153A and 153B within the confines of cabinet 149.

Figure 5B:
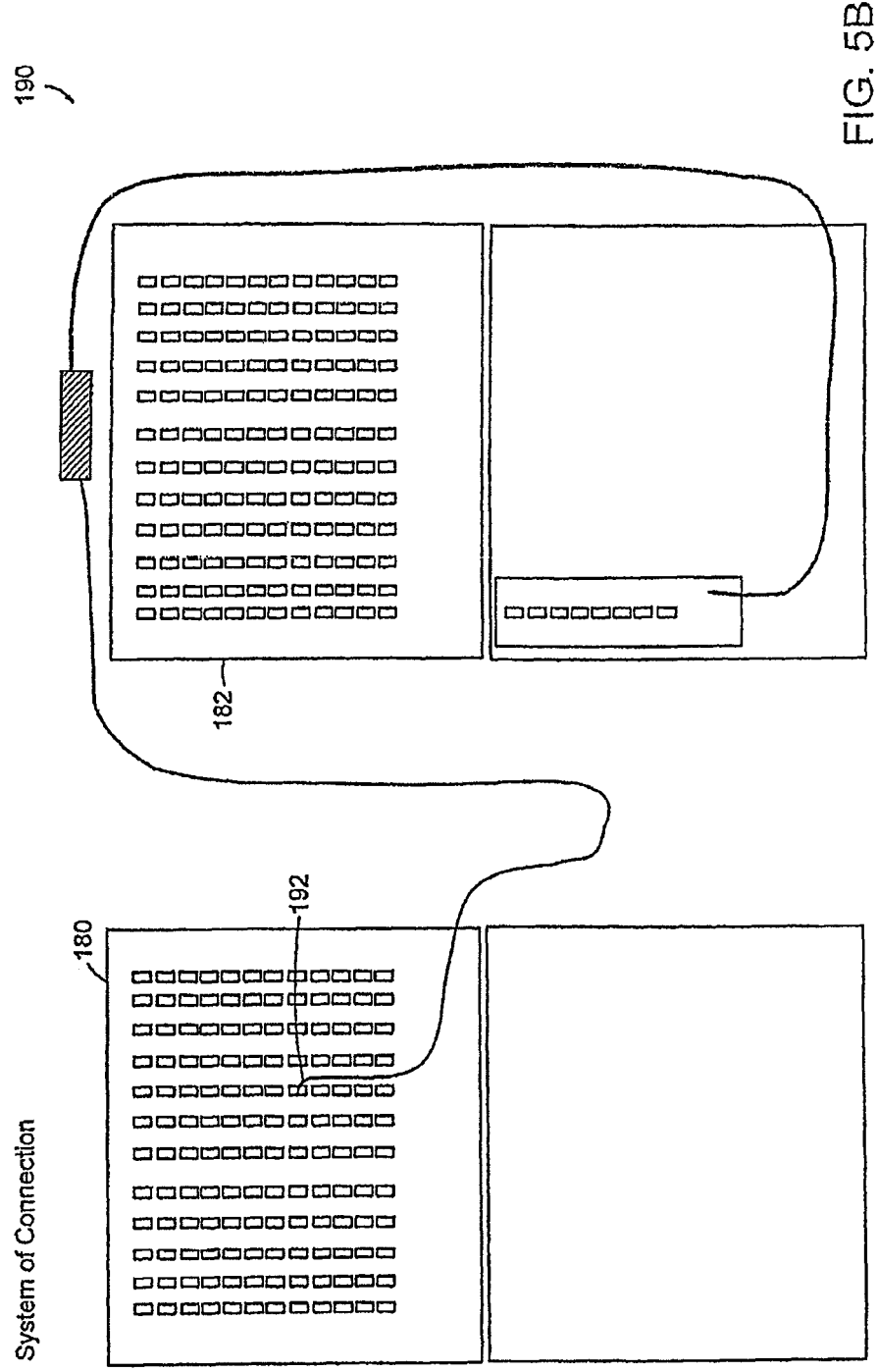

FIGS. 5A and 5B schematically illustrate the installation of the optical splitter module 132 pigtails and the service connection configuration of the optical splitter module 132, respectively, in a network having modules adjacent to each other in accordance with an embodiment of the present invention. An embodiment of the present invention includes a method to connect subscriber ports that are in an adjacent field but not initially contained within the circumference of the splitter pigtail harness 178. In this extension the splitter output pigtail is routed to the adjacent field 180 which by virtue of a juxtaposed position has a path at the same distance to the subscriber port within the circumference. The subscriber ports 192 (FIG. 5B) in the adjacent field also are assigned randomly therefore the resultant slack is managed using a group of various size half-loops in the vertical channel 176.

Figure 5C:
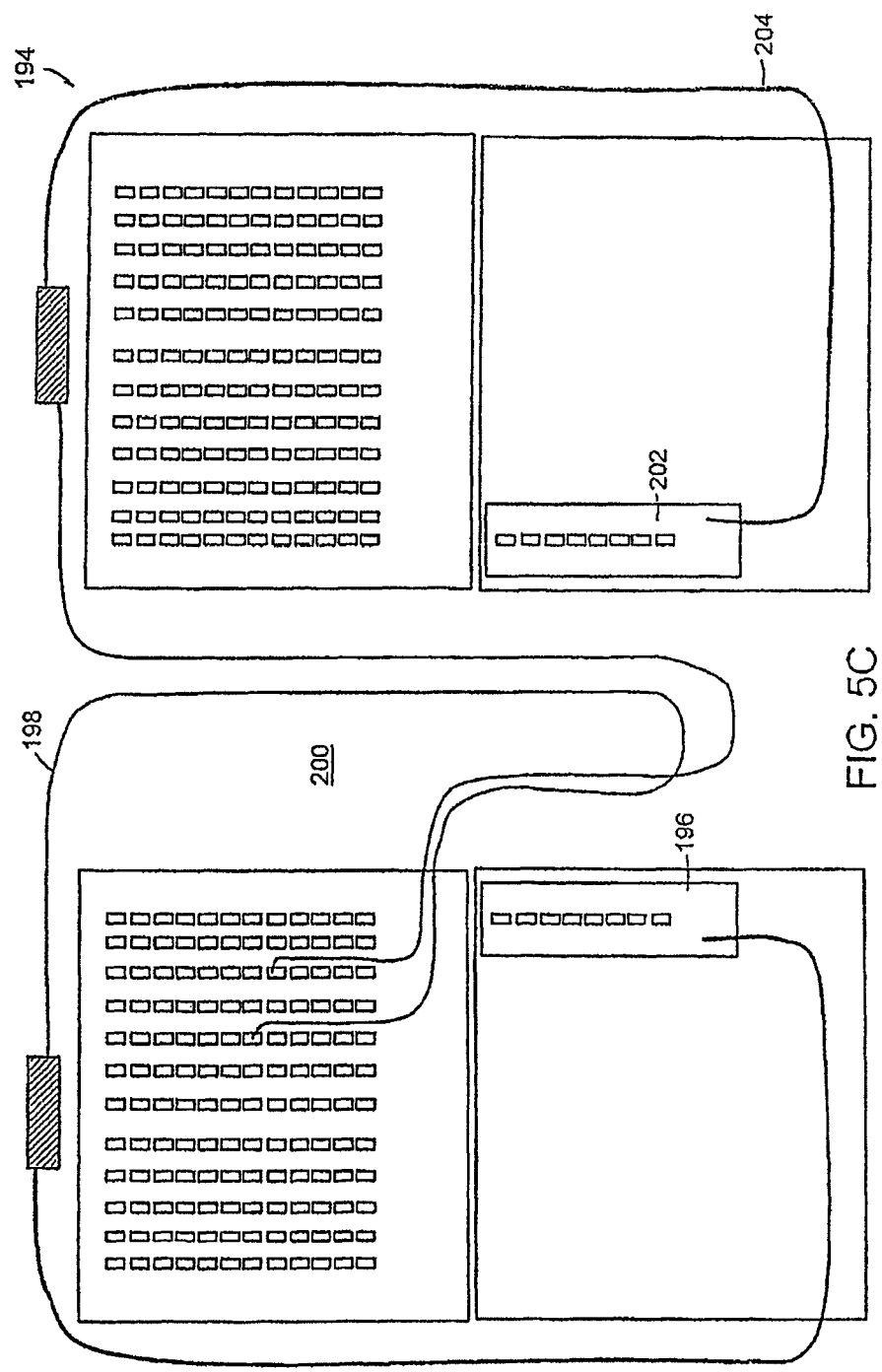
FIGS. 5C and 5D schematically illustrate the service connection configurations between adjacent fiber distribution hubs in accordance with alternate preferred embodiments of the present invention.
Figure 5D:
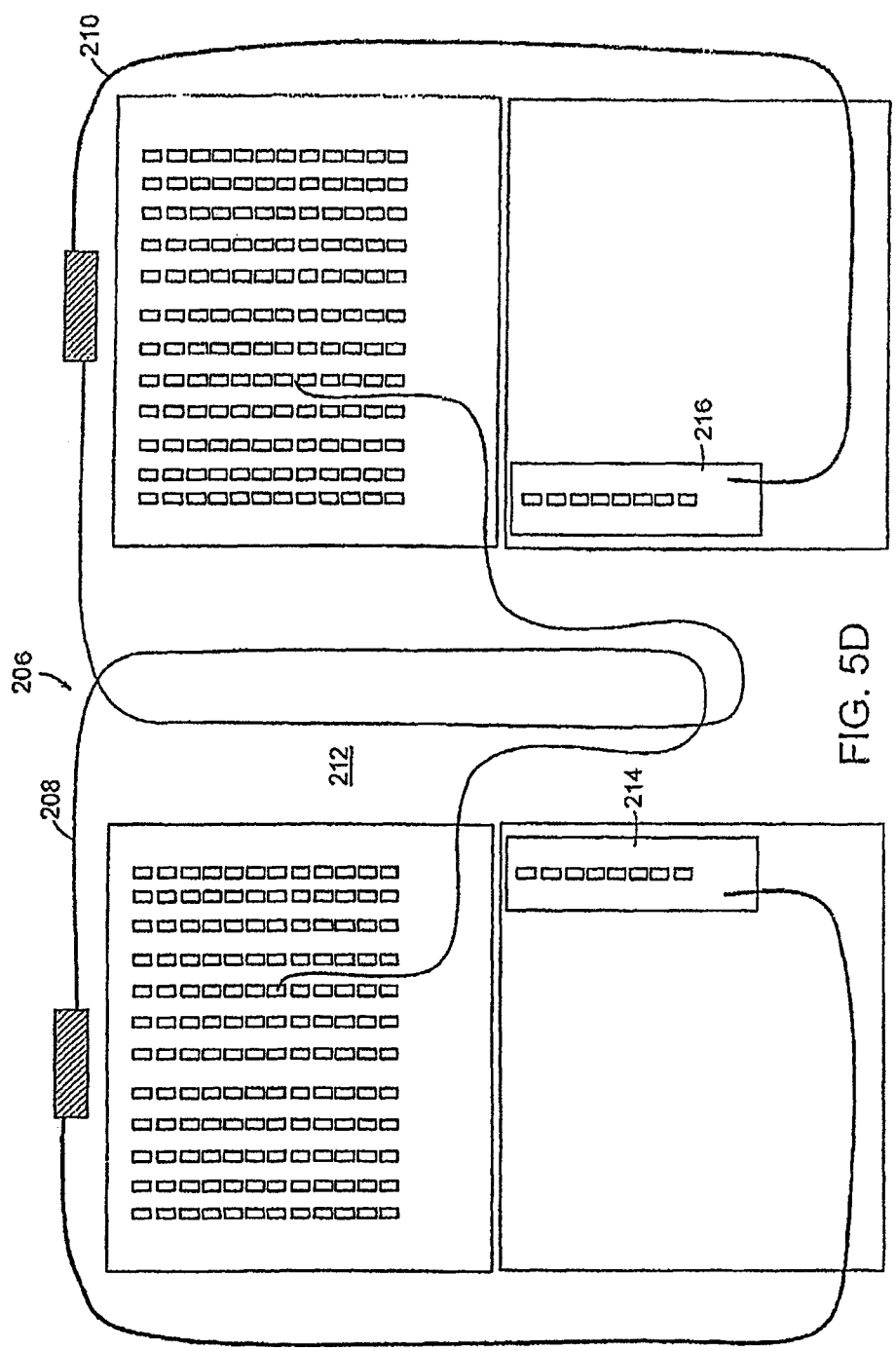

FIGS. 5C and 5D schematically illustrate the service connection configurations 194, 206 of the termination and splitter fields in adjacent fiber distribution hubs in accordance with a preferred embodiment of the present invention. The pigtails 198, 208 of the left module 196, 214 are routed circumferentially clockwise while the right pigtails 204, 210 of the module 202, 216 are routed circumferentially counterclockwise in a preferred embodiment. The fiber distribution hubs in this embodiment are located adjacent to one another, each having a splitter shelf with splitter modules and a termination shelf. The counter rotating feed provides for routing of the splitter module output pigtails circumferentially around the subscriber termination fields. The pigtail slack is stored in the vertical channels 200, 212.

An embodiment includes a method of removing a splitter pigtail from a subscriber port 192 and either redeploying that output pigtail to a new subscriber port or storing the pigtail back to the original storage position at the splitter module 132. The method is non-blocking and non-congesting due to the planned slack management.

Most embodiments of optical splitter modules 132 used in FDH 127 may have 16 output ports or 32 output ports depending on a particular network configuration which may include considerations for an optical budget associated with the optical splitters and associated network reach.

Figure 6A:
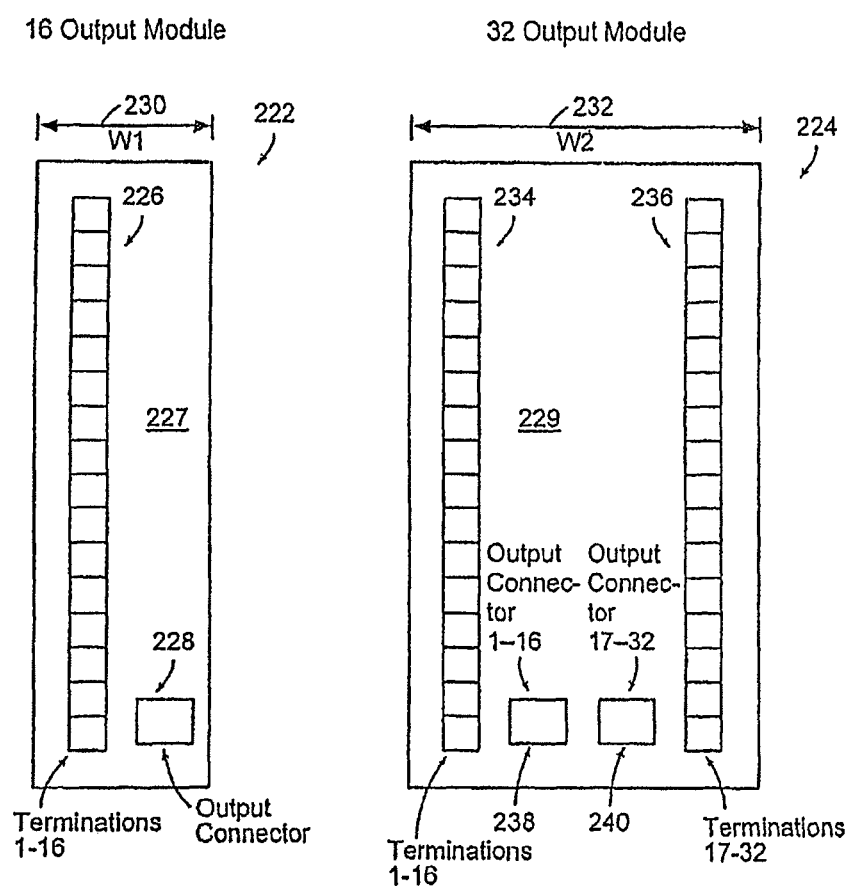
FIG. 6A illustrates an embodiment of a single width splitter module along with an embodiment of a double width module in accordance with an aspect of the invention.
Figure 6C:
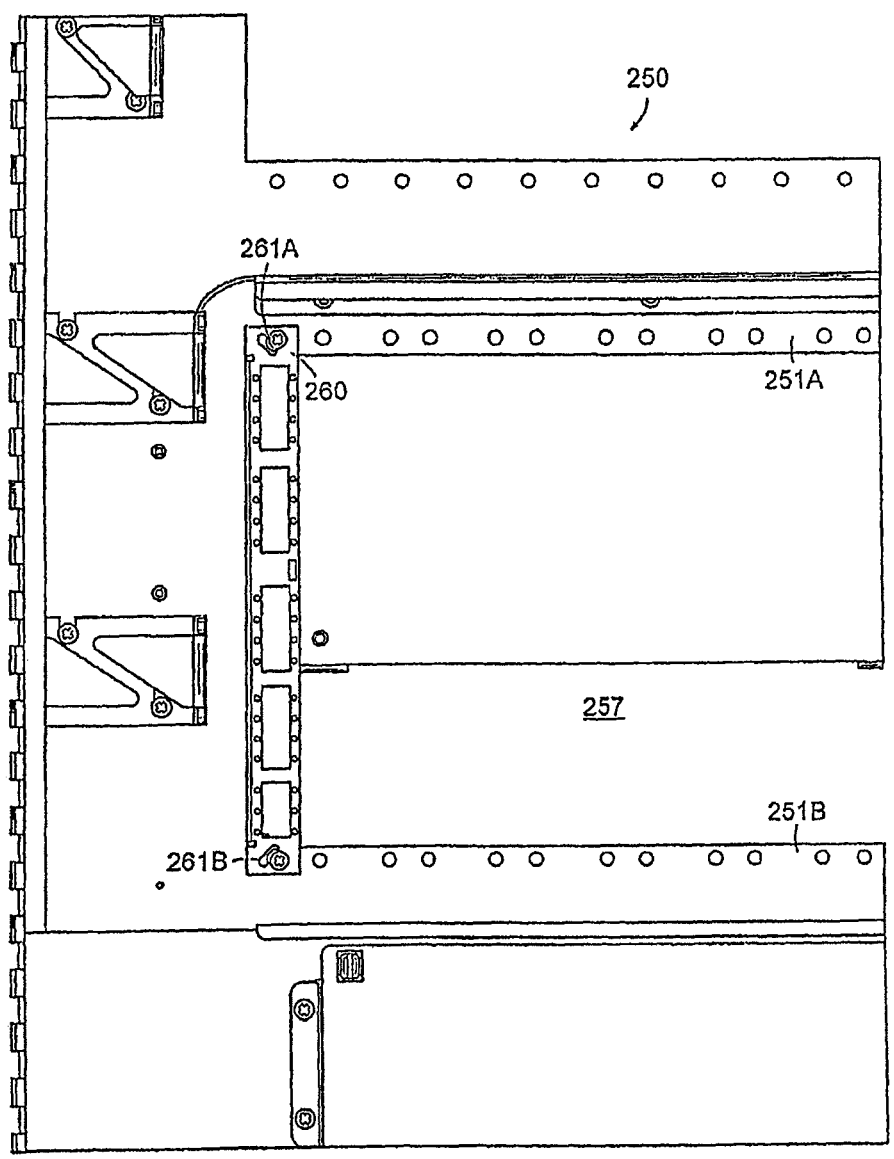
Figure 6D:
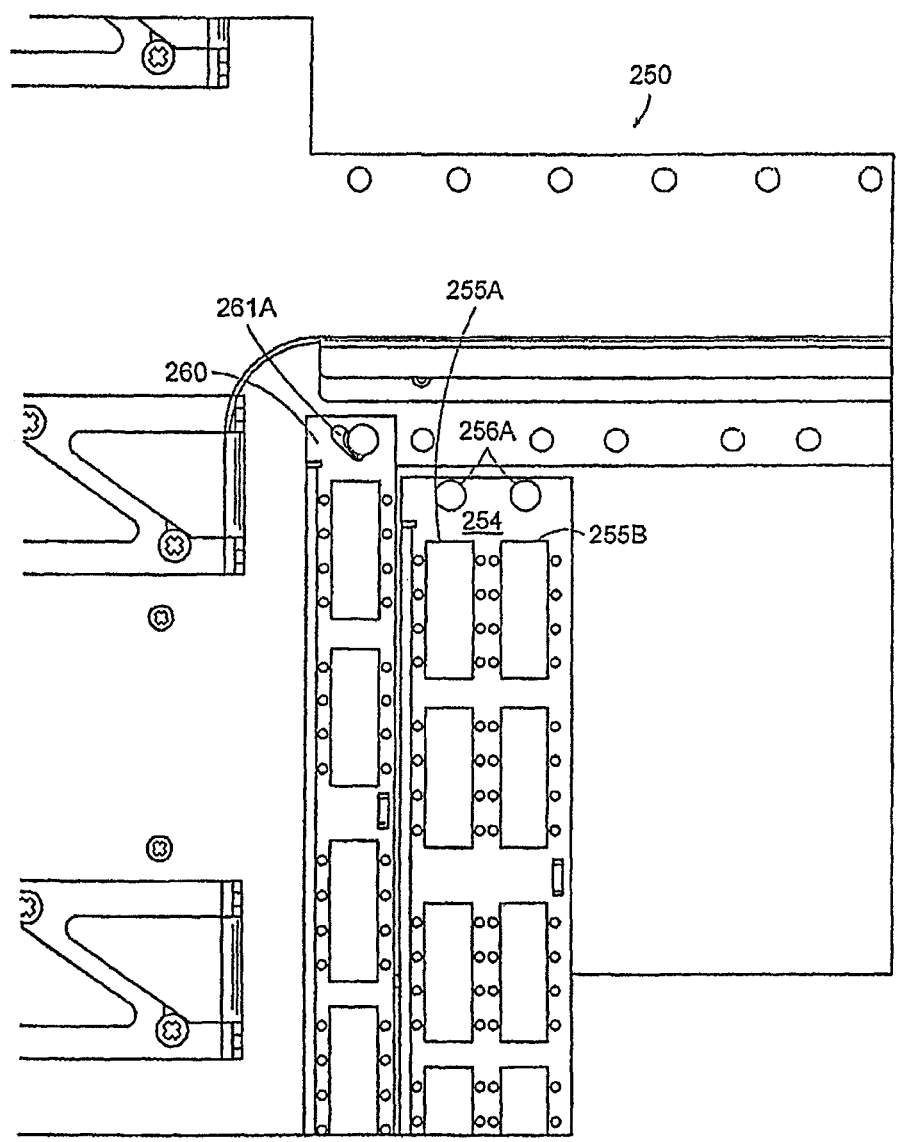
Figure 6E:
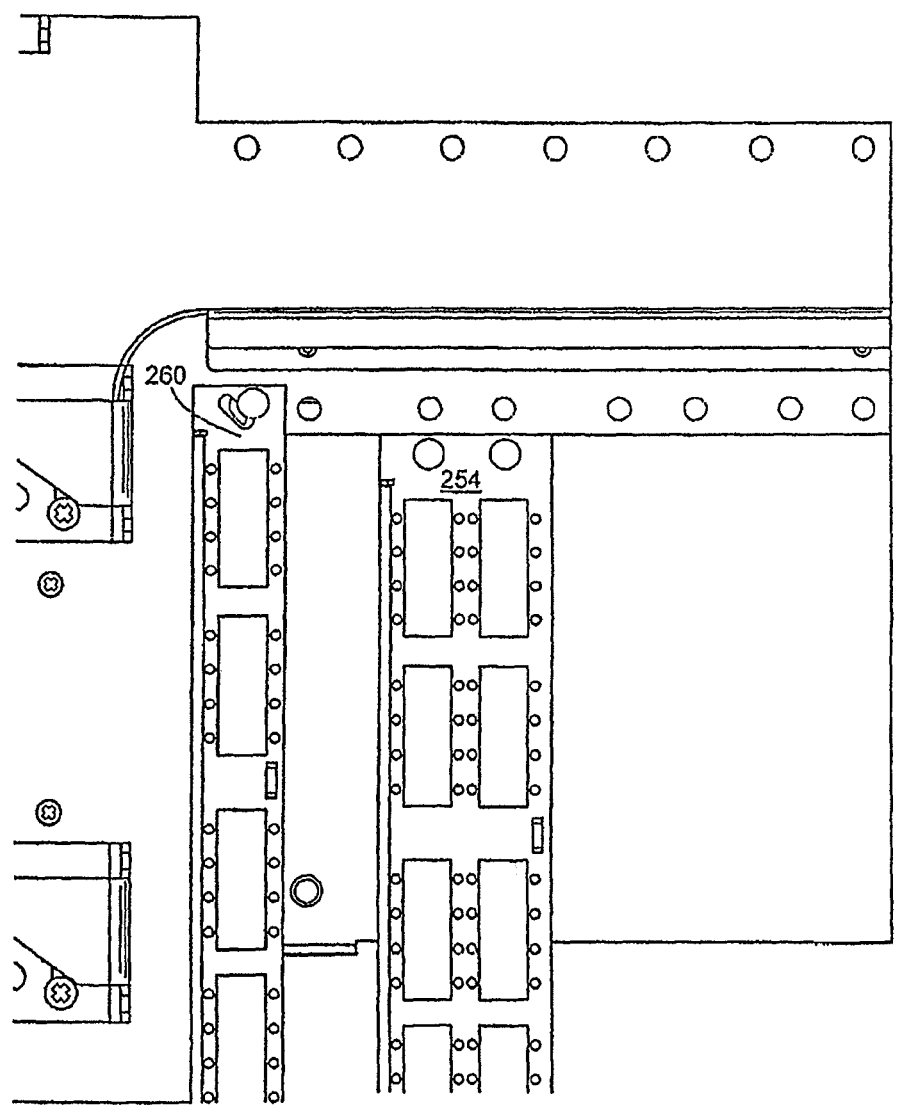
Figure 6F:
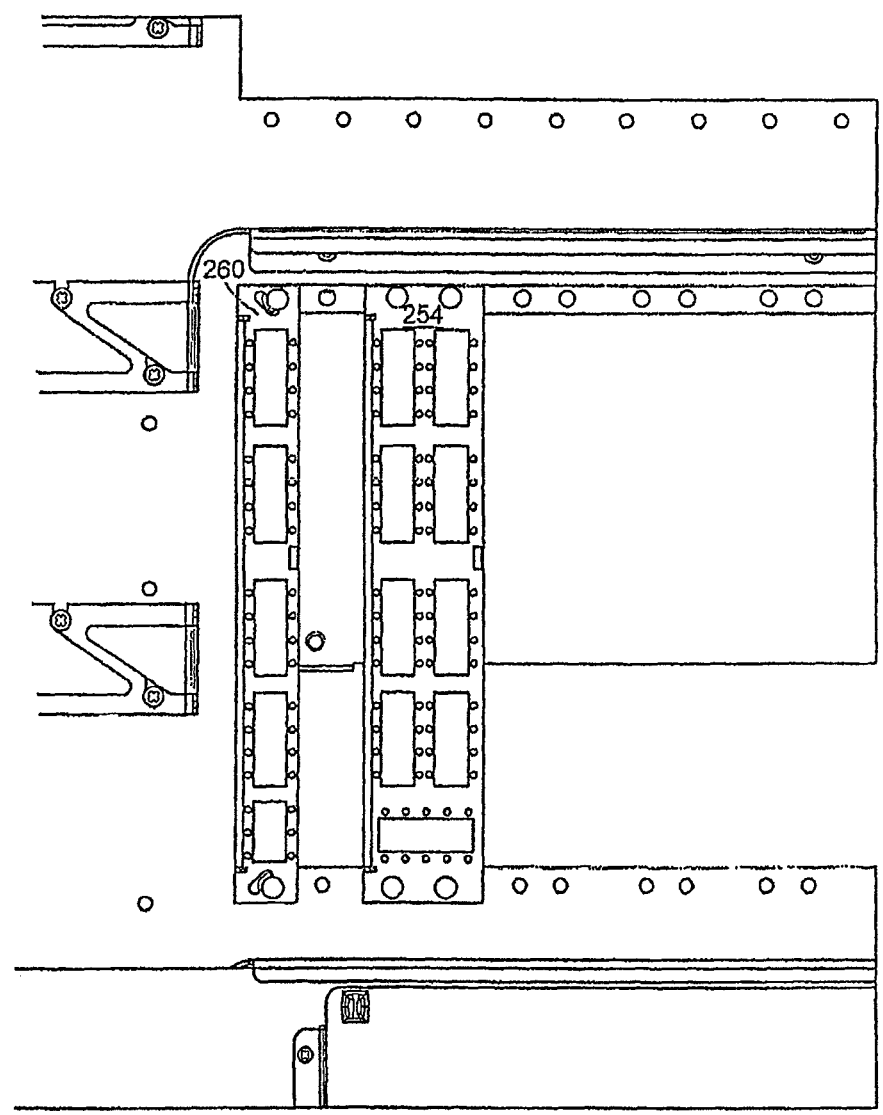
Figure 6G:
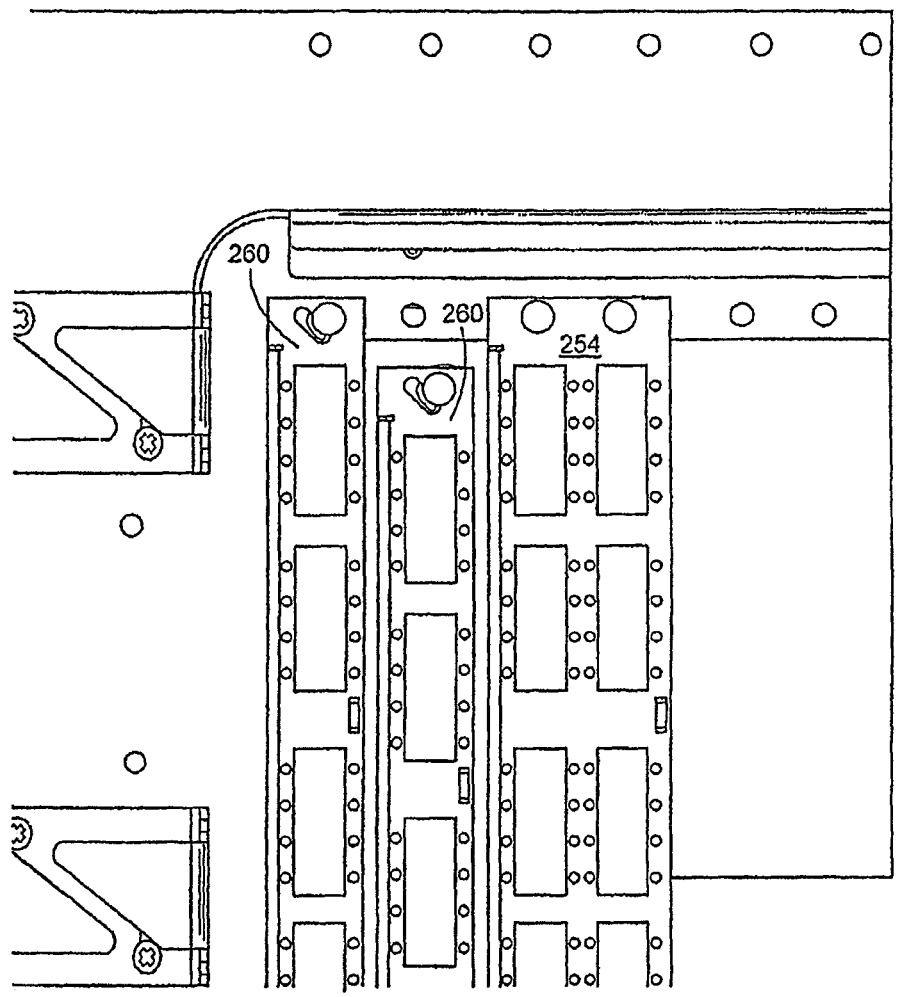
Figure 6H:
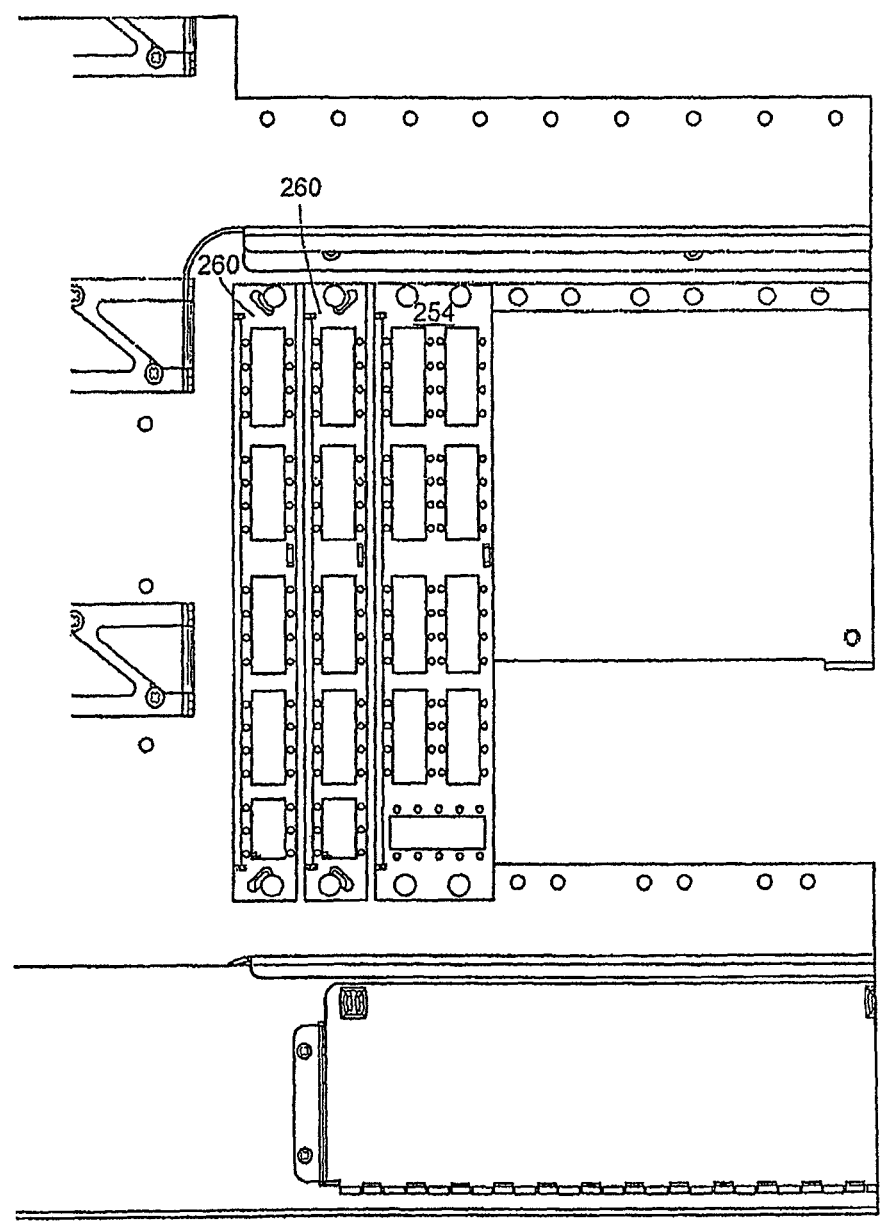

FIG. 6A illustrates a single width module 222 having a width (W1) 230 along with a double width module 224 having a width (W2) 232 that is on the order of twice that of W1 224. Optical splitter modules 222, 224 may have a physical configuration where output ports are terminated on the bulkhead faceplate 227, 229 using connectors and/or receptacles 228, 238, 240, or alternatively, with output ports in the form of pigtails 138 extending from the bulkhead faceplate and wrapped back and staged on storage ports 226, 234, 236 located on the faceplate as shown in, for example, FIG. 4A. In at least one design implementation, a 16 port module 222 may be deployed as a single width module W1 230 having output ports or storage ports arranged in a single column on the faceplate 227. And, according to the same design implementation, a 32 port module 224 is a double width W2 232 module having output ports 234 or storage ports arranged in two columns of sixteen each on the faceplate 229.

When used with pigtails and storage ports, the multi-fiber pigtail harness and associated breakout to individual pigtails may consume space in the enclosure to store the protective breakout device that converts from multi-fiber cables to individual fiber pigtails. The space for storing the breakout device, or transition, 131 (FIG. 4A) is designed to allow either breakouts from two sixteen output port modules 222 or one thirty-two output port module 224 to be used. Furthermore the space for storing the transition 131 may be located at a fixed distance along a circumferentially routed splitter output harness. Therefore the space in the chassis allocated for mounting splitter modules that corresponds to the fixed storage space for the transition 131 should allow only two sixteen output port splitter modules 222 or one thirty-two output port splitter module 224 to be installed.

In certain situations, it may be desirable to employ a configuration utilizing an installation sequence wherein a 16 port module 222 is installed interstitially between two 32 port modules 224 with no space between adjacent modules. Such a configuration can pose problems if inadequate space is provided for accommodating the transition 131. Examples of problems that occur may include blocking and congestion. A pair-wise installation of a single width module 222 (e.g. a 16 output port module) in a double width slot can be utilized to preserve correspondence of equal length cabling harness transitions 131 which are stored and secured remotely from a splitter module in a designated storage area 133 of enclosure 127.

Embodiments of the invention make use of structures and methods that alone, or in combination, dissuade a user from installing a 32 port double width module 224 immediately adjacent to a 16 port single width module 222 in situations where single width 16 port modules have not been installed in pairs, i.e. two 16 port modules installed immediately side-by-side. Techniques utilized in preferred embodiments, employ an automatically indexed latch to substantially preserve pair-wise installation of single width 16 port modules in the same position as a dual width 32 port modules.

FIG. 6B illustrates an embodiment utilizing a unique chassis bulkhead mounting configuration for splitter modules in combination with a unique latch configuration associated with the splitter module to ensure that two single-width sixteen port splitter modules 260 are installed in a pair wise arrangement into the same space that would otherwise accept a single width thirty-two port splitter module 254. FIG. 6B includes a bulkhead 250 having an upper mounting rail 251A and a lower rail 251B defining an opening 257 for receiving double width splitter modules 254 and single width splitter modules 260. Double width modules 254 include upper mounting hole pair 256A, lower mounting hole pair 256B on a faceplate along with a first bank of receptacles 255A and a second bank of receptacles 255B. Single width modules 260 include an upper mounting hole 261A and a lower mounting hole 261B and a single bank of receptacles 263. In addition, single width modules 260, and/or double width mounting modules 254 may include mounting latches.

An FDH chassis is supplied with a bulkhead 250 that provides an opening 257 for receiving splitter modules 254, 260 in combination with mounting holes that receive splitter module latches immediately above and below the opening in the bulkhead. The pattern for the module mounting holes on the bulkhead of the FDH chassis consists of four holes per double wide module 254 which is divided into two holes on top 256A and two holes on the bottom 256B of the opening. The configuration is uniquely arranged such that each set of holes is offset toward the center so that they are not spaced evenly in the center where normally they would be expected when mounting single-width 16 port modules 260 into the same space. This unique bulkhead mounting arrangement ensures that a double width module 254 cannot be installed immediately adjacent to a single width module 260 unless two single width modules 260 have been installed in a pair wise arrangement. By ensuring a pair wise installation this in turn forces the proper utilization of the storage area for splitter output pigtail breakout devices on the FDH chassis which are located remotely from the splitter modules at a fixed distance from the splitter module along the circumferential length.

To ensure proper mounting, a 16 port single-width module 260 is equipped with a uniquely shaped indexing latch feature at the top and bottom of the module so that the single width module 260 can be installed into the bulkhead opening while allowing the latch to be slightly offset to the left or to the right. The unique latching feature is a physically shaped bilobar hole 261A, 261B that allows the latch of single width module to be shifted to the left or to the right upon installation to align with the off center holes.

Additionally, the slotted hole on the single-width module 260 is uniquely shaped to allow a standard fastener typically used for this type of module to be fixed in place either to the left or to the right. This slotted hole is configured in a unique heart or bilobar shape so as to latch the fastener grommet either to the right of center when the single-width module is mounted in the left position or to the left of center when the single-width module is mounted to the right position. The heart shaped slot essentially indexes the latch to the left or to the right while retaining adequate strength to seat the grommet and to locate and secure the module firmly in place without subsequent shifting within the bulkhead opening.

FIGS. 6C-6H illustrate aspects of the keying mechanism used for aligning 16 and 32 output splitter modules in a desired pattern.

FIGS. 7A-7E illustrate views of a fiber distribution hub in accordance with an embodiment of the present invention. The FDH in accordance with an embodiment administers connections between fiber optic cables and passive optical splitters in the Outside Plant (OSP) environment. These enclosures are used to connect feeder and/or distribution cables via optical splitters to provide distributed service in a FTTP network application. The preferred embodiment FDH provides a cross-connect/interconnect interface for optical transmission signals at a location in the network where fiber hubbing, operational access and reconfiguration are important requirements. In addition the FDH is designed to accommodate a range of sizes and fiber counts and support factory installation of pigtails, fanouts and splitters.

Figure 7A:
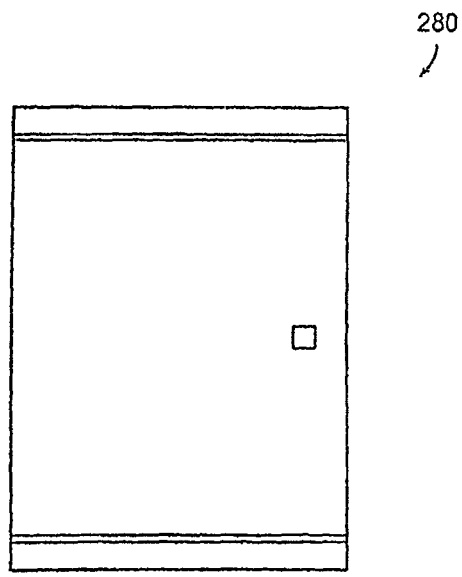
FIGS. 7A-7E illustrate views of the fiber distribution hub in accordance with preferred embodiments of the present invention.
Figure 7B:
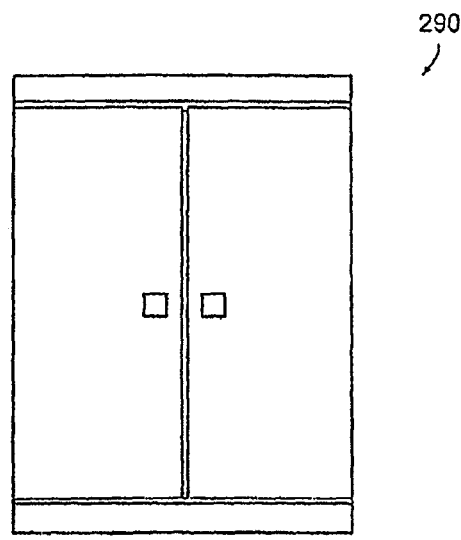
Figure 7C:
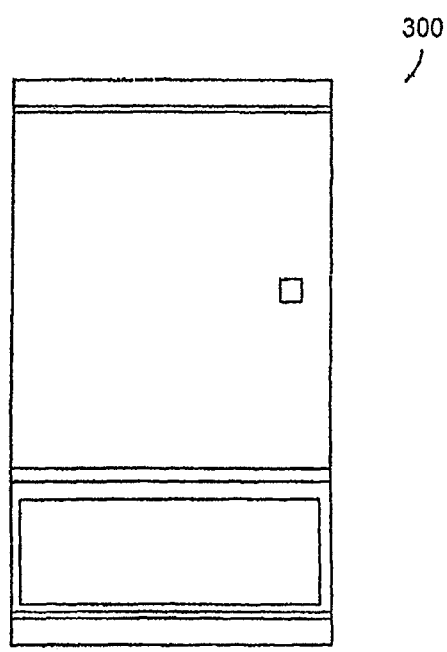
Figure 7D:
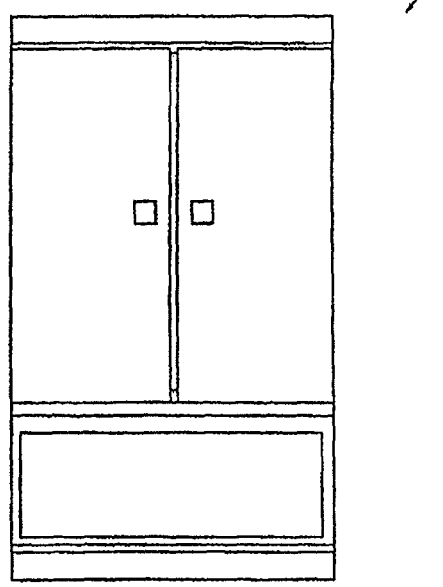
Figure 7E:
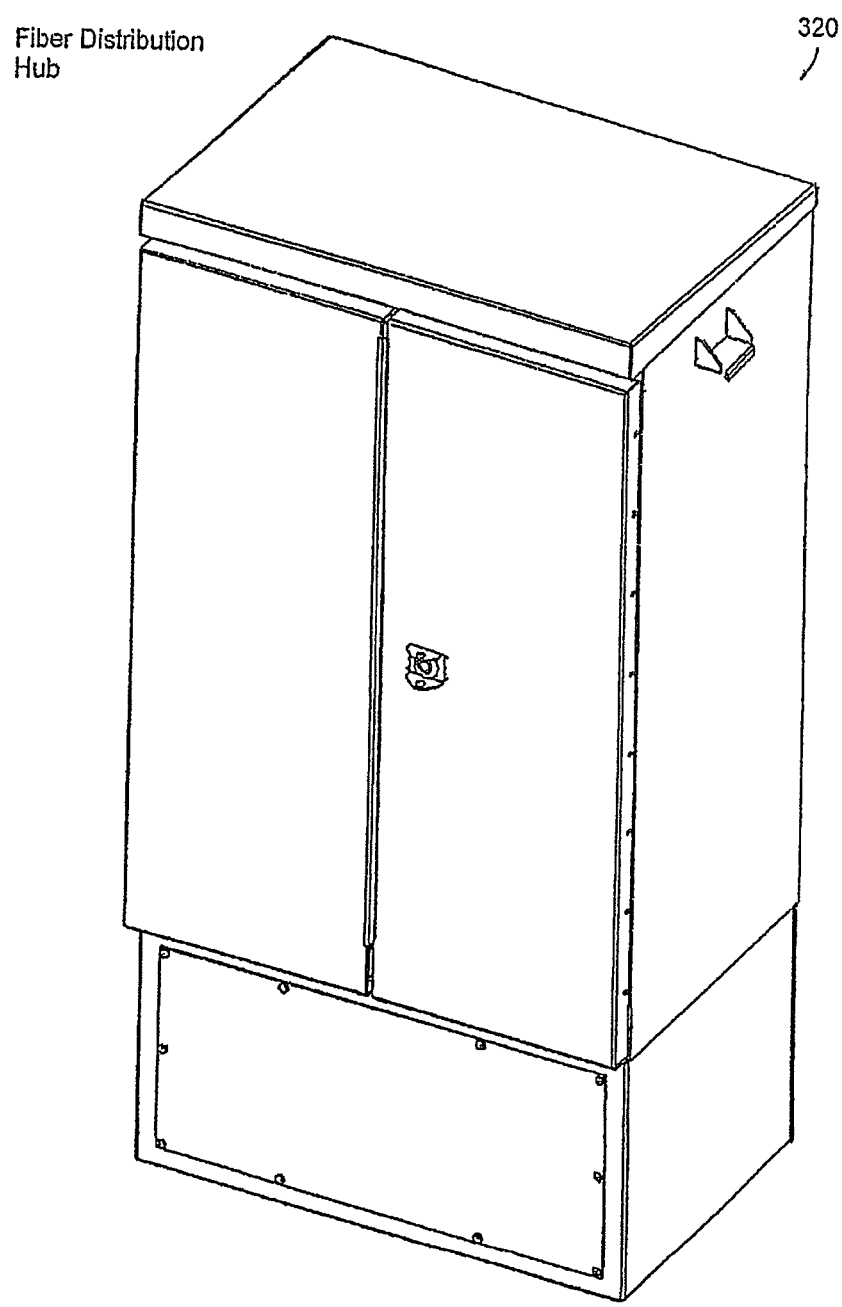

In accordance with preferred embodiments, the FDH is provided in pole mount or pedestal mount configurations. The same cabinet and working space is available in both pole mount (FIGS. 7A and 7B) and pedestal mount units (FIGS. 7C, 7D and 7E). Three sizes of FDHs are typically available, for example, to correspond to three different feeder counts, for example, 144, 216 and/or 432; however, additional sizes of FDHs can be used without limitation.

Embodiments of 280, 290, 300, 310, 320 FDH provide termination, splicing, interconnection and splitting in one compartment. The enclosures accommodate either metallic or dielectric asp cables via sealed grommet entry. Cables are secured with standard grip clamps or other means known in the art. The FDH may also provide grounding for metallic members and for the cabinet.

Enclosures 280, 290, 300, 310, 320 provide environmental and mechanical protection for cables, splices, connectors and passive optical splitters. These enclosures are typically manufactured from heavy gauge aluminum and are NEMA-3R rated and provide the necessary protection against rain, wind, dust, rodents and other environmental contaminants. At the same time, these enclosures remain lightweight for easy installation, and breathable to prevent accumulation of moisture in the unit. An aluminum construction with a heavy powder coat finish also provides for corrosion resistance. These enclosures are accessible through secure doors that are locked with standard tool or pad-lock.

Figure 8:
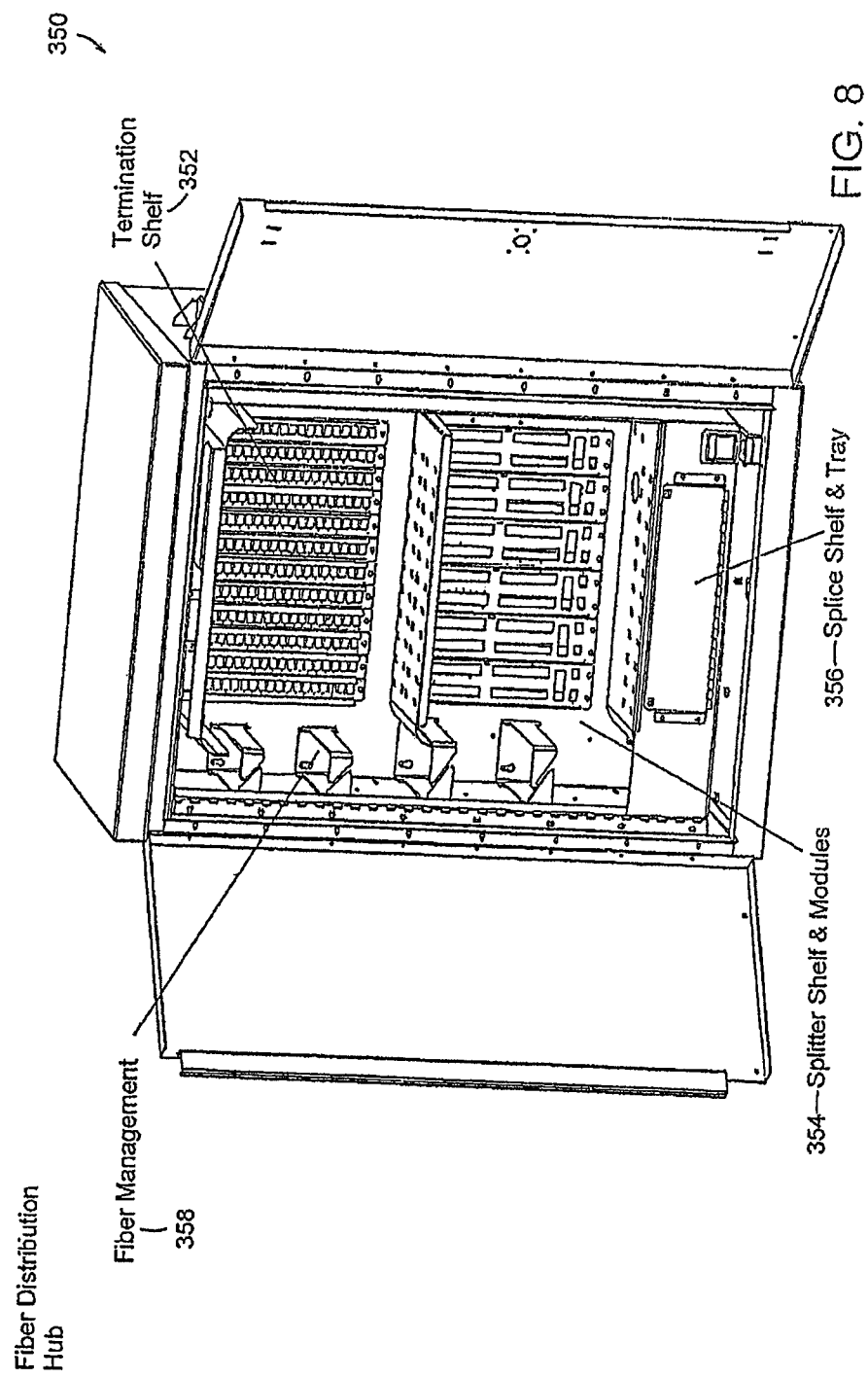
FIG. 8 illustrates a view of the internal components of a fiber distribution hub enclosure in accordance with a preferred embodiment of the present invention.

FIG. 8 illustrates a view of the internal components of a fiber distribution hub enclosure 350 in accordance with an embodiment of the present invention. FDH enclosure 350 can be configured in a number of different ways to support fiber cable termination and interconnection to passive optical splitters. The configuration illustrated in FIG. 8 provides for a termination shelf 352, a splitter shelf and optical component modules 354, a splice shelf 356, and a channel for fiber management 358.

Termination shelf 352 can be based on the standard main distribution center (MDC) enclosure line that provides complete management for fiber terminations in accordance with an embodiment of the present invention. The termination shelf may be preterminated in the factory with a stub cable containing, for example, 72, 144, 216, 288 or 432-fibers. This stub cable is used to connect services to distribution cables routed to residences. The distribution fibers are terminated on certified connectors. The termination shelf may use standard 12-pack or 18-pack adapter panels, for example, that have been ergonomically designed to provide easy access to fiber terminations in the field. These panels can be mounted on a hinged bulkhead to allow easy access to the rear for maintenance. The fiber jumpers are organized and protected as they transition into the fiber management section 358 of the enclosure.

The splitter shelf 354 can be based on a standard fiber patch panel that accepts standard optical component modules (OCM) holding optical splitters in accordance with a preferred embodiment of the present invention. In a preferred embodiment, the splitter modules, or cassettes, are designed to simply snap into the shelf and therefore can be added incrementally as needed. The splitter shelf 354 serves to protect and organize the input and output fibers connected to the cassettes. Splitter shelves 354 are available in various sizes and the shelf size can be optimized for different OCM module configurations.

Figure 9:
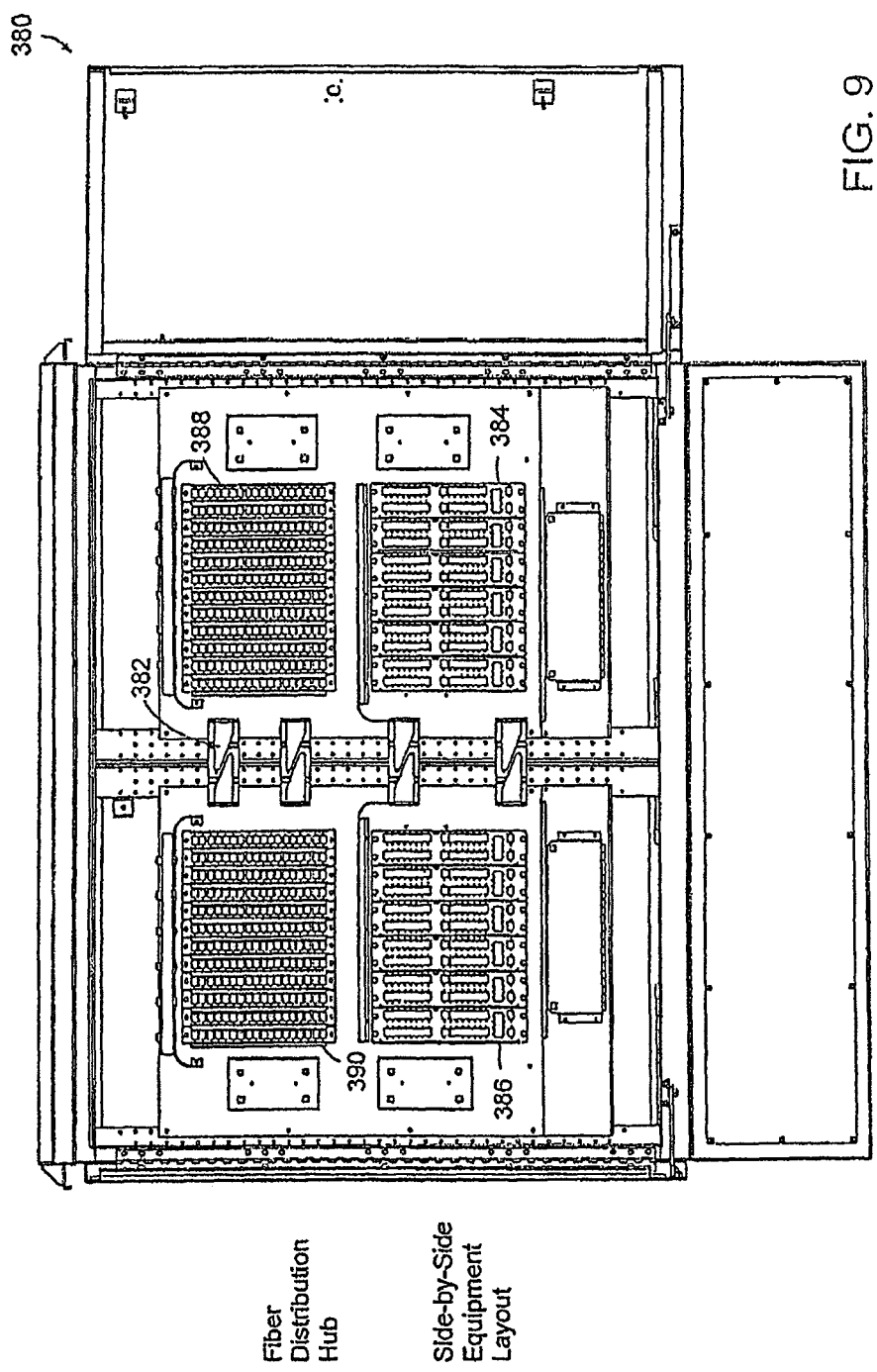
FIG. 9 illustrates a schematic view of a fiber distribution hub enclosure having a side-by-side equipment configuration in accordance with a preferred embodiment of the present invention.

FIG. 9 illustrates a schematic view of a fiber distribution hub enclosure 380 having a side-by-side equipment configuration in accordance with an embodiment of the present invention. There are two adjacent termination shelves 388, 390 and two adjacent splitter shelves 384, 386, separated by a central fiber management channel 382 in accordance with an embodiment of the present invention.

FDHs may be installed on utility poles or in pedestal arrangements that require the rear of the enclosure to remain fixed. In these situations, it is not possible to access cables or fiber terminations through the rear of the cabinet. Normal administration of an FDH may require that a linesman access the rear of the termination bulkhead to perform maintenance operations on the rear connectors. One such operation is cleaning a connector to remove dirt and/or contamination that might impair the performance of components therein. In addition, the rear of an FDH enclosure may have to be accessed for trouble shooting fibers such as may occur with fiber breakage or crushing of a fiber. Furthermore, it may be necessary to access the rear of the enclosure for adding cables as in a maintenance upgrade or as is the case when performing a branch splice to route designated fibers to alternate locations using an FDH as a point of origin. In circumstances such as those identified immediately above, access to the rear of the enclosure may be difficult if a rear door or access panel is not provided. Gaining access to the rear of such an enclosure may require disassembly of the equipment chassis and/or cabling apparatus to provide access to the fiber connectors or cables.

Arrangements for providing access behind the chassis must be carefully planned so as to minimize the movement of working fibers. For instance, an arrangement may be devised to move the terminations and not the splitter pigtails. Such an arrangement may place undue stress on the terminations and/or pigtails because one section of the apparatus is moved, while another remains stationary. Apparatus that include partial movement to access connectors may not be suitable for adding additional capacity to and maintenance of, the cabling system. Sliding apparatus trays or tilting bulkhead panel apparatus may tend to create stress points in fiber cables and block certain other areas of the chassis for maintenance access, and therefore may not be a desirable alternative to enclosures having removable back panels.

Figure 10:
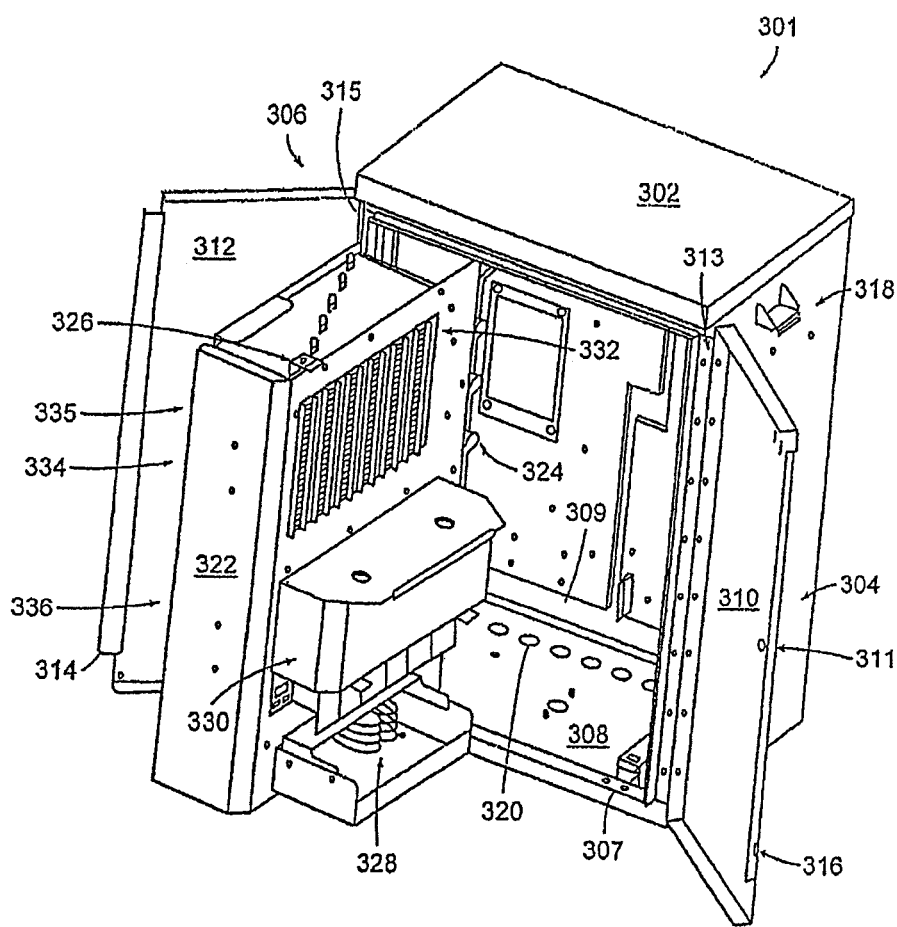
FIG. 10 illustrates an embodiment of an FDH employing a hinged chassis in accordance with an aspect of the invention.

FIG. 10 illustrates a preferred embodiment of an FDH enclosure 301 that is designed with a unique swing frame chassis 322 that swings the entire chassis including optical connectors, splitters and splices open 90 degrees or more to allow access to all optical components for cleaning and testing and to cables for maintenance or additions. The swing frame design provides the necessary provisions to add additional cables into the unit for future use which may require complete access to the back of the cabinet. For example, access to rear penetrator punch-outs 320 is possible with the swing chassis in the opened position. Weather proof feed-throughs can be installed when the punch-outs are removed and multi-fiber cables can then be passed through the feed-throughs and into the enclosure.

An embodiment of FDH cabinet 301 may be equipped with a single point swing frame release latch 326 that provides easy access to the rear and securely locks the chassis into place when closed. Release latch 326 may be positioned as shown in FIG. 10 and/or release latch 326 may be positioned in a lower portion of the enclosure. In addition, locks can be provided to hold the chassis open at various angular increments to reduce the chances of injury to a linesman when working on components located behind the bulkhead 335. Chassis 322, when equipped with locks for holding it open, is referred to as a self-locking chassis. In the embodiment of FIG. 10, the entire chassis is hinged providing a single point of flex for a fiber cable routed to the chassis. This hinge point is constructed in the factory to control the fiber bend; and, therefore the fiber bend at the hinge point is not subjected to craft handling in the field. In particular, chassis hinge 324 and cable routing hardware are designed to ensure that manufacture recommended bend radii are not violated when the chassis is opened or closed. For example, chassis 322 may have pigtail channels 153A, B attached thereto so that the slack associated with the pigtails remains fixed as chassis 322 is moved throughout its range of motion.

In addition, transitions 131 and transition storage area 133 can be located on chassis 322. In this configuration, transitions 131 may be accessed from above when chassis 322 is in an open position. In order to ensure that input fibers and pigtails are not disturbed or distorted in an impermissible manner, enclosure 300 may be configured at a factory, or plant, so as to have cable bundles dressed around hinge 324. Preconfiguring enclosure 300 reduces the chance that cabling will be done incorrectly.

In particular, a preferred embodiment of enclosure 301 includes, among other things, a top panel 302, a first side panel 304, a second side panel 306, a bottom panel 308, a back panel 309, a first door 310 and a second door 312 which collectively make up the exterior dimensions and structure of the enclosure 301. In addition, enclosure 301 may include one or more carry handles 318 for facilitating deployment of enclosure 301 at a desired location. First and second doors 310 and 312 may each be pivotally mounted by way of a hinged edge 313, 315 to facilitate access to components mounted within enclosure 301. In addition, first and second doors 310, 312 may employ a lip 316 and channel 314 assembly to facilitate tamper resistance and weatherproofing. Channel 314 may operate in conjunction with elastomeric gasket material to further facilitate a weatherproof seal. Enclosure 301 may further include ledge 307 running along an interior portion of top surface 302, first side surface 304, second side surface 306 and bottom surface 308 to additionally facilitate a weatherproof seal when first and second doors 312, 314 are closed. A lock 311 can be installed in a door to discourage unauthorized access to the interior volume of enclosure 301.

Enclosure 301 includes a swinging frame 322 that is hinged along a side using hinge 324. Hinge 324 allows frame 322 to be pivoted so as to cause the side opposing hinge 324 to move away from the interior volume of enclosure 301. When frame 322 is in the open position, as shown in FIG. 10, rear feed throughs 320 are accessible along with cable management tray 328, splitter chassis rear cover 330 and rear termination connections 332.

In contrast, when swing frame 322 is in the closed position, only components on front bulkhead 335 are readily accessible. For example, termination field bulkhead 334 and splitter chassis bulkhead 336 are accessible when swing frame 322 is in the closed position.

The trend to higher capacity fiber distribution hubs may create additional concerns regarding rear access to optical components and cables. Along with other dimensions of the enclosure the width of the chassis may have to be increased to accommodate increased termination capacity that includes an increased number of connectors, splitter modules, splices and/or fiber jumpers. In addition to the issues described in conjunction with the swing frame chassis of FIG. 10, additional issues may arise as the width of a swing frame FDH chassis 322 is increased.

As the width of the swing frame chassis 322 is increased the width of the cabinet must be increased proportionately to accommodate clearance between a swing frame chassis and the side wall of the enclosure as the chassis swings open. At a certain point the width of the entire cabinet grows beyond conventionally acceptable widths, especially for utility pole installations, when the swing frame chassis is utilized therein. While the chassis width needs to be increased to accommodate, say for example, a larger termination field, proportionally increasing the size of the swing frame chassis may not be acceptable due to the addition of even more width to the enclosure to accommodate a swinging frame.

Figure 11A:
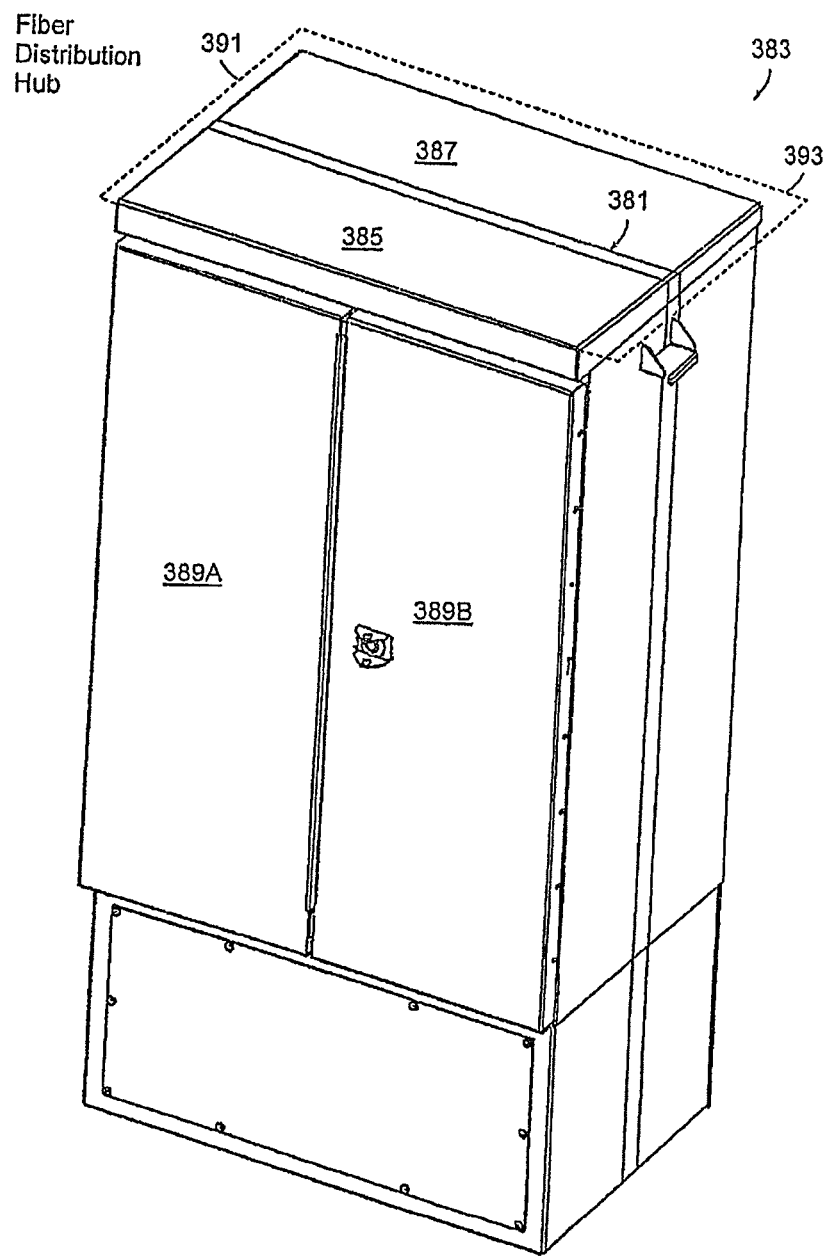
FIG. 11A illustrates an embodiment of an FDH utilizing a split enclosure.

FIG. 11A illustrates an embodiment of a fiber distribution hub 383 capable of accommodating large termination fields and large swinging frames associated therewith while minimizing the additional enclosure width necessary to accommodate swing frame chassis 322. Hub 383 may be an enclosure and may include, among other things, a rear enclosure portion 387, a front enclosure portion 385, a seam 381 and one or more access door panels 389A, 389B. Hub 383, as illustrated, includes a first access door 389A and a second access door 389B. Hub 383 includes a split enclosure designed with a seam 381 running along substantially the entire side wall, top wall, and bottom wall. Seam 381 facilitates separation of front section 385 from rear section 387. Seam 381 substantially splits the entire enclosure and thus provides a reduction in the overall enclosure width needed to accommodate implementations of swing frame chasses 322. Implementations of enclosures that do not employ seam 381 may require additional width to allow clearance between the swing frame chassis and the side of the enclosure. The split enclosure implementation of FIG. 11A is accomplished using a strengthened back section 387 that operates as a fixed structural member of the enclosure. Seam 381 splits the enclosure at a position along the depth to provide enough side wall stiffness to the back section 387 so as to ensure structural integrity for the entire chassis via back section 387 and a strengthened hinge 391.

Since an FDH is typically an environmental enclosure, seam 381 in the enclosure must be sealed to protect against water and other environmental factors. Thus the rear enclosure portion 387, the front enclosure section 385, and the chassis are joined with a compression seal via seam 381 that serves as an environmental barrier. To accomplish environmental sealing, hinge 391 is located outside seam 381 so that a continuous seal may be routed around the enclosure. In addition the entire back section 387 of the enclosure may be covered by rain shield 393 that operates as a roof for the enclosure including the split section. Hinge 391 is designed and configured so as to manage the bend radii of fibers in an acceptable manner.

Furthermore front enclosure portion 385 and rear enclosure portion 387 are joined by two quick release latches located within the enclosure and accessed only through the front doors. These latches actuate a release that allows separation of the chassis section away from the rear enclosure portion 378 to provide access to the enclosure. The latches draw the enclosure back together and provide compression against seam 381 to provide an environmental seal. FDH 383 may further be equipped with angled cable entry channels for carrying moisture away from the cable seals. The angled entry way, if employed, is associated with a rear section of the enclosure.

Rear enclosure portion 387 may provides a unique cable management scheme to provide rear and/or side entry. Rear entry is provided in much the same way as conventional enclosures via an angled fixture to carry moisture away from the cable seals. The back section of the split enclosure is designed so that the side sections are large enough to accept the same fixtures thus allowing side cable entry into the enclosure as well.

Figure 11B:
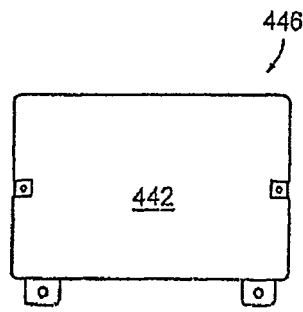
FIGS. 11B-11G illustrate various aspects and embodiments of an FDH having a split enclosure.
Figure 11C:
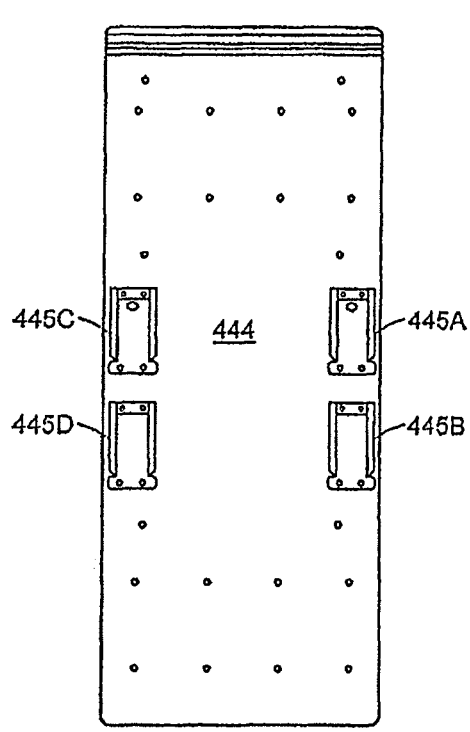
Figure 11D:
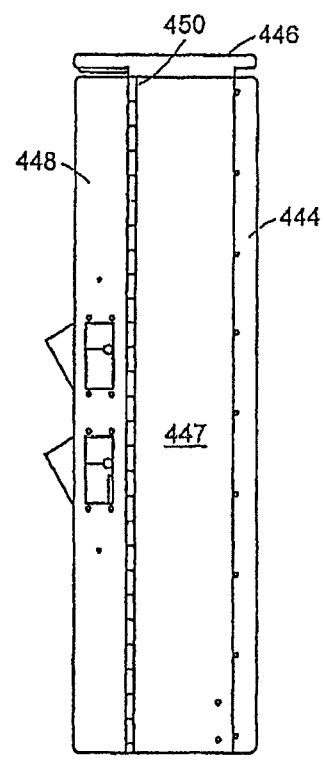
Figure 11E:
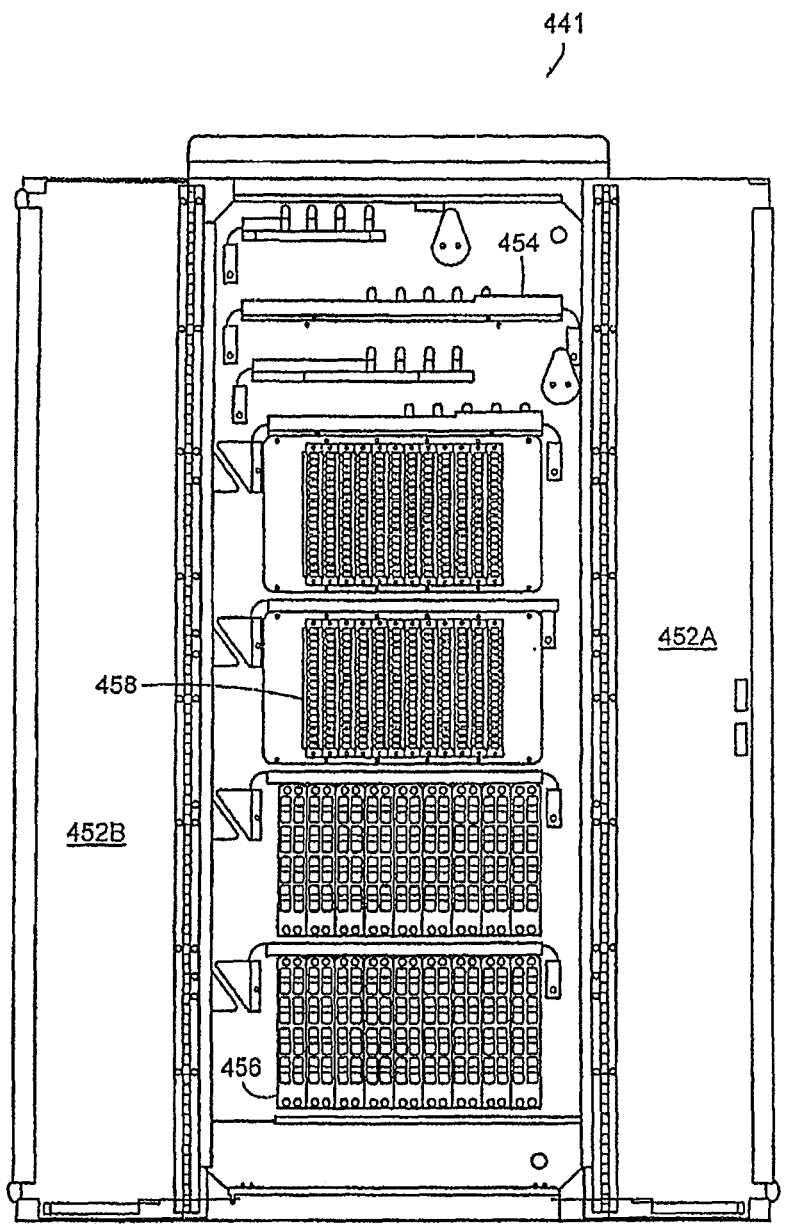
Figure 11F:
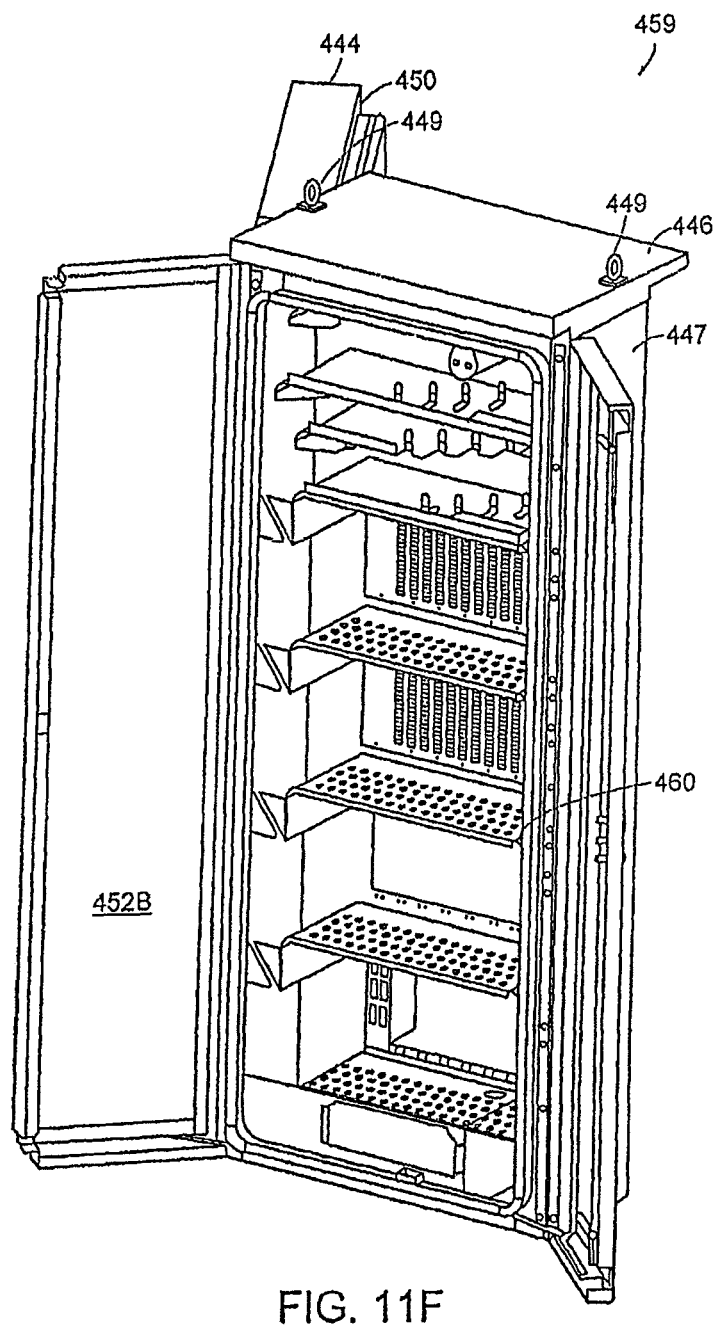
Figure 11G:
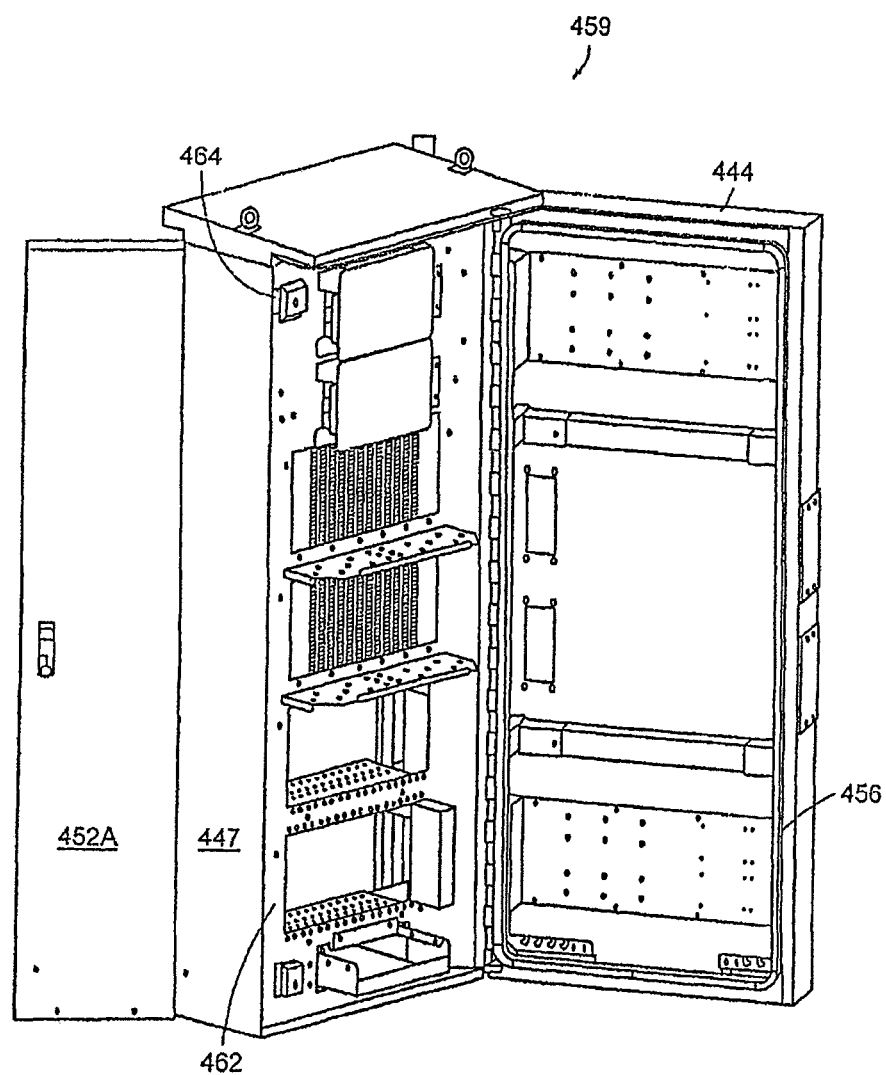

FIGS. 11B-11G further illustrate embodiments of split enclosures. FIG. 11B illustrates a top view of an enclosure 440 showing top surface 442 consisting of a rain shield 446. FIG. 11C illustrates a view showing rear surface 444 and utility pole mounting brackets 445A-D. FIG. 11D illustrates a side view of an enclosure showing rain shield 446, front portion 448, central portion 447 and rear portion 444. In the embodiment of FIG. 11D, rear portion 444 remains fixed by way of being supported on, for example, a utility pole. Central portion 447 is pivotally attached to rear portion using a hinge and front portion 448 is pivotally attached to central portion 447 using hinge 450. FIG. 11E illustrates a front view of an enclosure 441 showing, among other things, an optical splitter mounting area 456, a subscriber termination field 458, a cable raceway 454 and a first door 452A and a second door 452B. FIG. 11F illustrates an enclosure 459 having rear portion 444 and gasket 450 pivotally attached to central portion 447. Central portion 447 is in an open position and is disengaged from rear portion along, for example, three edges. Enclosure 459 may further include shelves 460, optical splitter module mounting areas, subscriber termination fields, etc. FIG. 11G illustrates a perspective view showing the rear portion of enclosure 459. Latches 464 retain central portion 447 in a closed position.

Figure 11H:
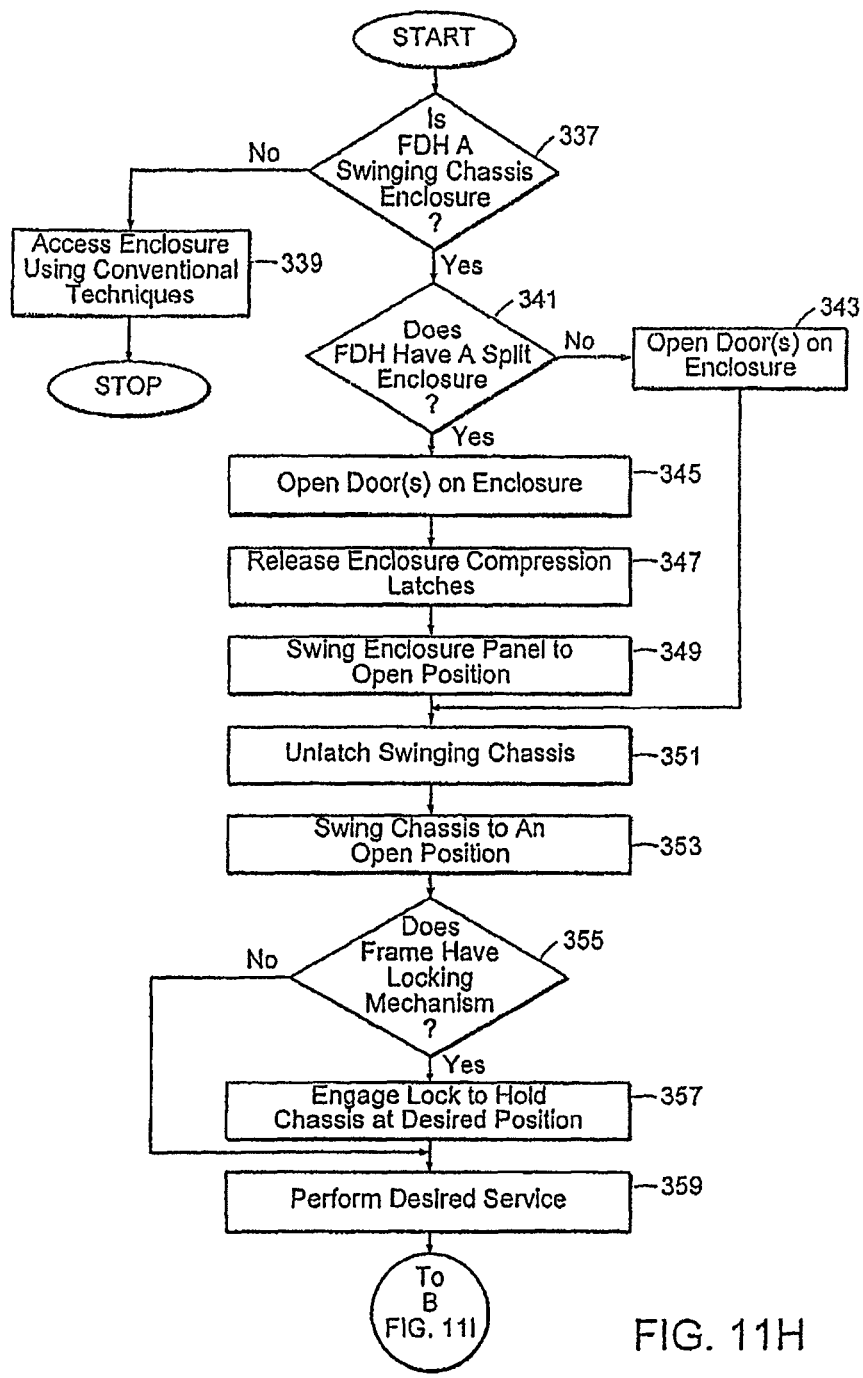

FIGS. 11H and 11I, together, illustrate an exemplary method for using embodiments of FDH enclosures employing one or more swinging chasses. First, a determination is made as to whether the enclosure utilizes a swinging chassis 322 (step 337). If no swinging chassis is used, the enclosure is accessed using conventional techniques known in the art (step 339). If a swinging chassis 322 is identified in step 337, a determination is made as to whether the enclosure is a split enclosure (step 341). If the enclosure is not a split enclosure, the enclosure doors are opened (step 343) and the method flow goes to the input of step 351. In contrast, if a split enclosure is identified in step 341, the enclosure doors are opened (step 345) and then one-or-more compression latches are released (step 347).

Compression latches are used to keep the gasket of the enclosure in compression to facilitate weatherproofing. After the compression latches are released, the moveable portion of the enclosure is moved to its opened position (step 349). For example, a first section 448 and/or a central section 447 may be pivoted in an open position. After step 349, the method flow from the No path of step 341 rejoins the main method flow. The swinging chassis 322 is unlatched (step 351) and the chassis is pivoted to an open position (step 353).

After the chassis is in the open position, a determination is made as to whether the chassis frame is equipped with a locking mechanism to keep the frame at a desired angle with respect to the enclosure (step 355).

If no locking mechanism is present, the method flow goes to the input of step 359. In contrast, if a locking mechanism is present, the lock is engaged to hold the open chassis at a determined position (step 357). Next, a desired service is performed (step 359). By way of example, a desired service may include repairing damaged or worn components within the enclosure, inspecting components within the enclosure, connecting a subscriber, disconnecting a subscriber, adding additional components, such as optical splitter modules to the enclosure, and/or removing components from the enclosure.

Now referring to FIG. 11I, after service is performed, a determination is made as to whether the chassis frame is locked in an open position (step 361). If the chassis is not locked in the open position, method flow goes to the input of step 365. In contrast, if the frame is locked open, the lock is released (step 363). The chassis is then closed (step 365) and latched in the closed position (step 367).

A determination is then made as to whether a split enclosure is in the position (step 369). If a split enclosure was not used, method flow goes to the input of step 375. In contrast, if a split enclosure was used and is open, the appropriate enclosure section is closed (step 371) and the compression latches are engaged (step 373). The doors to the enclosure are then closed (step 375) and locked if needed.

FDH enclosures are commonly mounted to utility poles at an elevation that cannot be accessed by a linesman standing on the ground; and therefore, the linesman typically accesses the enclosure by climbing to the elevation of the enclosure. Often, enclosures are installed in conjunction with a utility platform or balcony that is a substantially permanent fixture attached to the pole below the enclosure that allows the linesman to stand in front of the enclosure while making circuit connections. A linesman may climb a ladder or steps to the elevation of the balcony and then transfer to the balcony to conduct operations. Standard safety procedures used in the art require that the linesman latch into appropriate safety mechanisms in conjunction with a safety harness to break a fall should a fall occur while climbing the ladder, transferring to the balcony, or while working on the platform. Provisions for safety latching and access are typically provided along with enclosure installations such as FDH installations.

Enclosures fabricated for use in copper plant installations (such as plain old telephone system, or POTS installations) were typically fabricated from heavy gauge steel and thus provided adequate strength for latching safety harnesses directly to the enclosure. However, new enclosures are constructed from aluminum or other lightweight, corrosion-resistant materials to provide easier installation and to provide added protection against long term exposure to the elements. These lightweight enclosures do not provide adequate structural strength to reliably break a fall if a safety line is attached thereto.

In typical field operations, a linesman may transfer from a ladder to the platform, or balcony, to begin work on an elevated enclosure. Safety procedures dictate that the linesman first attaches a safety line to an appropriate structure, herein a latching point, on the pole before making the transfer. In order to encourage attachment of the safety line to the latching point that is easily accessible, and optimally located with respect to the linesman while on the ladder. In addition, the latching point provides necessary mobility to the linesman as he/she transfers from the ladder to the platform and while he works on the enclosure. In addition, a structural handle may be provided. The structural handle may be configured to support the linesman's weight as the linesman transfers from the ladder to the platform. In addition, the handle can be configured to withstand loads associated with a fall. The latching point and handle are mounted on both sides of the pole and mounted enclosure since it cannot be determined ahead of time, with certainty, from which side of the pole the linesman will ascend to the platform.

Preferred embodiments of an elevated FDH include a latching point in conjunction with a structural member which can be installed as an option with a pole mounted FDH. Use of the optional member, allows installation of a latching point equipped FDH only in circumstances where it is desired. For those situations where a latching point is not needed, the FDH is provided with a standard mounting bracket. Still other embodiments of the elevated FDH provide for a standard mounting bracket that is capable of post installation augmentation by the addition of a structural member and latching point should it be desired after an initial installation of the FDH. Since the latching point and/or structural member may incur damage if they are used to break a fall and/or over the normal course of use, embodiments of the elevated FDH utilize field-replaceable latching points and/or structural members.

Figure 12A:
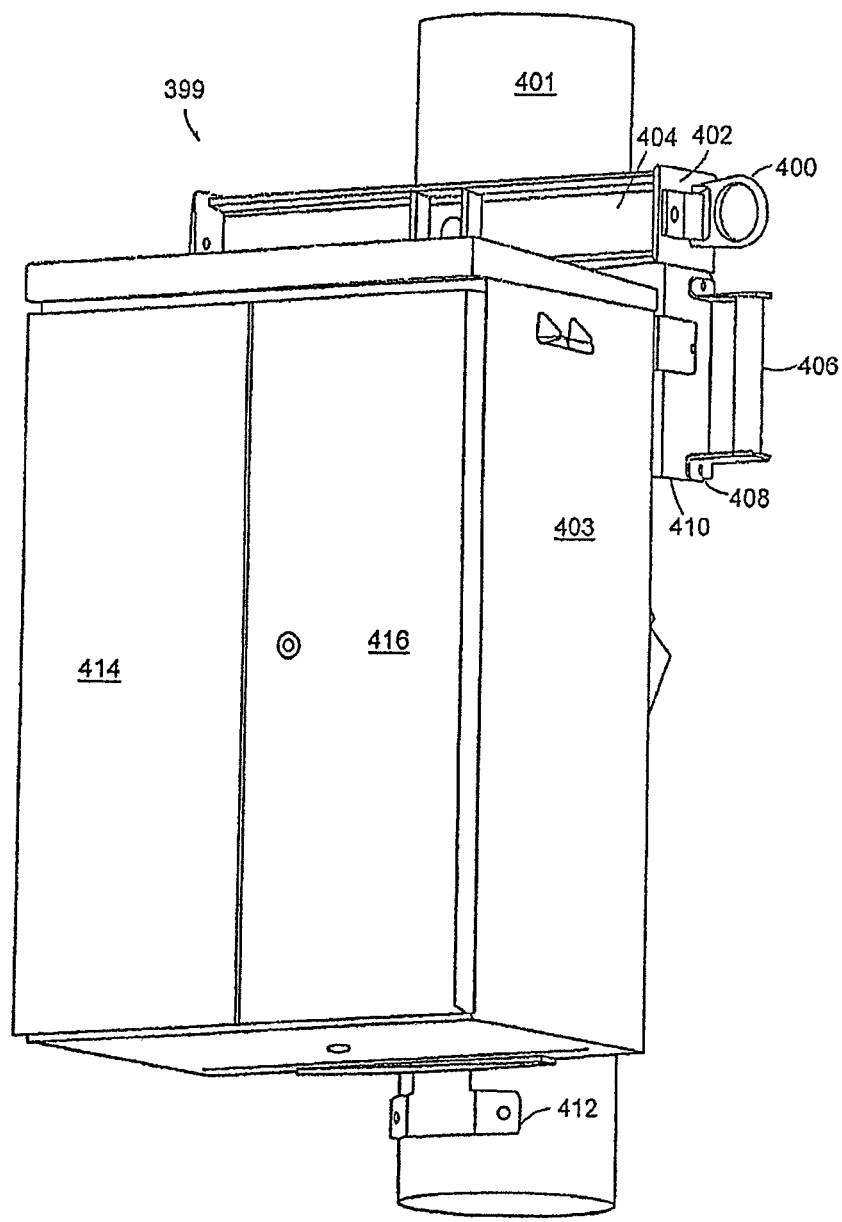
FIG. 12A illustrates an embodiment of a utility pole mounted FDH having fall restraint hardware integrated therewith.

FIG. 12A illustrates a preferred embodiment of an elevated FDH 399 mounted to a utility pole 401 using a structural member 404 having a latching point 400. FDH 399 may include an enclosure 403, structural member 404, mounting bracket 410 and lower mounting bracket 412. Structural member 404, may serve as stabilization member and/or mounting bracket that can optionally be equipped with a latching point 400 attached to structural member 404. In addition, a handle 406 can be releasably attached to the enclosure mounting bracket 410 using bolts 408. The structural member 404 may be constructed, for example, from a steel beam such as a welded beam and may provide adequate strength to transfer the load of an accidental fall directly to the utility pole 401 without relying on the strength of elevated FDH enclosure 403. In a preferred embodiment, structural member 404 may span substantially the entire width of the enclosure 403. In addition, latching points 400 are located so that a linesman can access them from the front, side, and/or back of FDH 399. Furthermore, latching points 400 are located so that a safety line can be draped over a door 414, 416 of FDH 399 while a linesman works inside enclosure 403. While steel is used in a preferred embodiment of the structural member 404, other materials such as aluminum, titanium and/or composite can be used for the beam if desired. Material cross sectional dimensions may be altered appropriately for the specific materials to achieve a determined load bearing capacity. Implementations of FDH 399 may employ structural member 404 having shapes other than that shown in FIG. 12A. Structural member 404 may be mounted directly to pole 401 or it may be mounted to an intervening structure which is in turn mounted to pole 401. Additionally, stabilizer bar 404 can be demounted as desired.

In the embodiment of FIG. 12A, the latching point consists of a safety ring 400 made from, for example, a structurally sound "D-Ring" loop that is sized to allow fastening of the standard linesman's safety harness thereto and further having sufficient strength to restrain a linesman under accidental fall conditions. Latching point 400 is replaceable and may be specified to be replaced after a single fall. As such, the latching point 400 is designed to be easily replaced using fasteners, such as bolts 401, in conjunction with bracket 402. A handle 406 is also provided in the illustrated embodiment. Handle 406 may fasten onto a side of the pole mount bracket to facilitate a linesman's transfer from a ladder to a platform. In particular, handle 406 may be mounted to a flange 410 on structural member 404 and is positioned to assist a linesman while transferring from the ladder to the pole 401. For example, a linesman climbing the pole 401 will latch the safety harness to the latching point 400, and then hold the handle 406 while transferring from the ladder to a secure position on the balcony in front of the elevated FDH enclosure.

A typical installation of the elevated FDH 399 will include a latching point 400 and a handle 406 mounted on either side of the FDH 399. To help ensure the safety of the linesman, handle 406 may be designed so that it will not accept the latch from the linesman's safety harness because handle 406 may not rated for an accidental fall load. This safety feature is achieved by increasing the diameter of handle 406 beyond a diameter that will function with the safety latch on the linesman's harness while still keeping the diameter of the handle within an acceptable range for a typical linesman to grasp. As a result, a linesman may be forced to connect the safety latch on the harness to only devices rated for a fall, such as latching point 400.

Figure 12B:
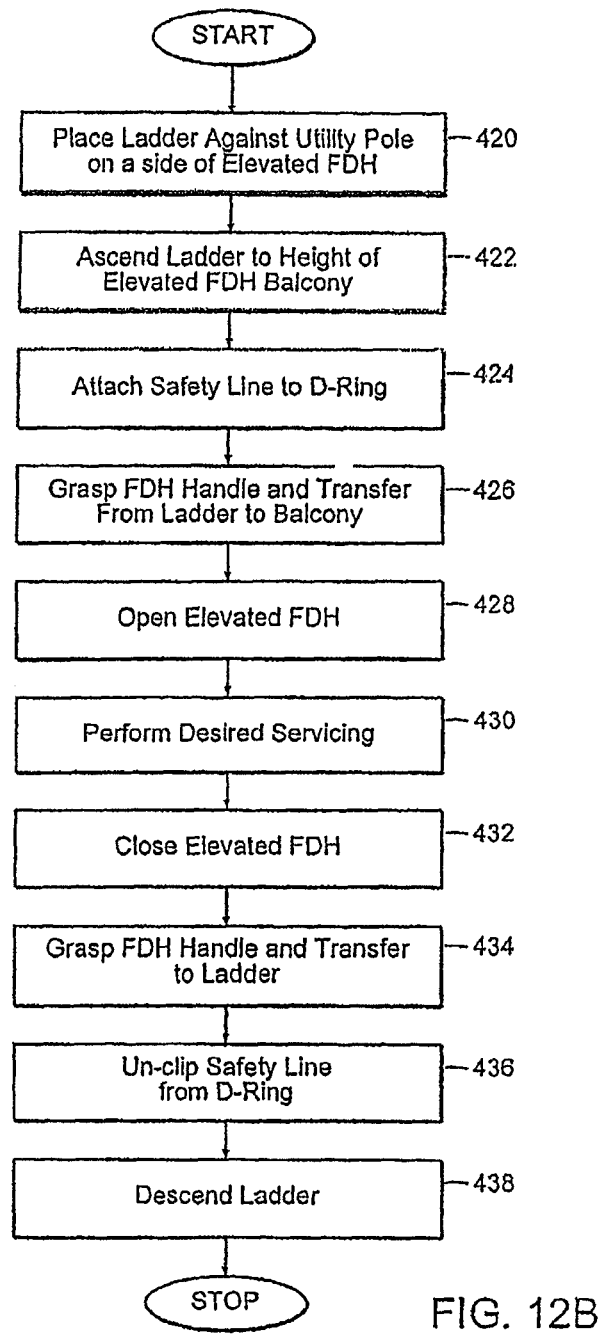
FIG. 12B illustrates a method for accessing and elevated FDH.

FIG. 12B illustrates an exemplary method for using an elevated FDH enclosure 399 equipped with a handle 406 and latching point 400. The method of FIG. 12B commences when a linesman places a ladder against a utility pole 401 having an elevated FDH 399 mounted thereto (step 420). The linesman climbs the pole to the height of a balcony associated with elevated FDH 399 (step 422). Then the linesman attaches a safety line, rated for stopping a fall, to latching point 400 (step 424). The linesman then grasps handle 406 and transfers from the ladder to the balcony (step 426).

Once on the balcony, the linesman opens doors 414 and 416 to gain access to components located within an interior volume of elevated FDH 399 (step 428). Any necessary servicing is performed (step 430) and then doors 414, 416 are closed (step 432). The linesman then grasps handle 406 and transfers to the ladder (step 434). The safety line is unclipped from the latching point 400 (step 436) and the linesman descends the ladder (step 438).

Figure 13:
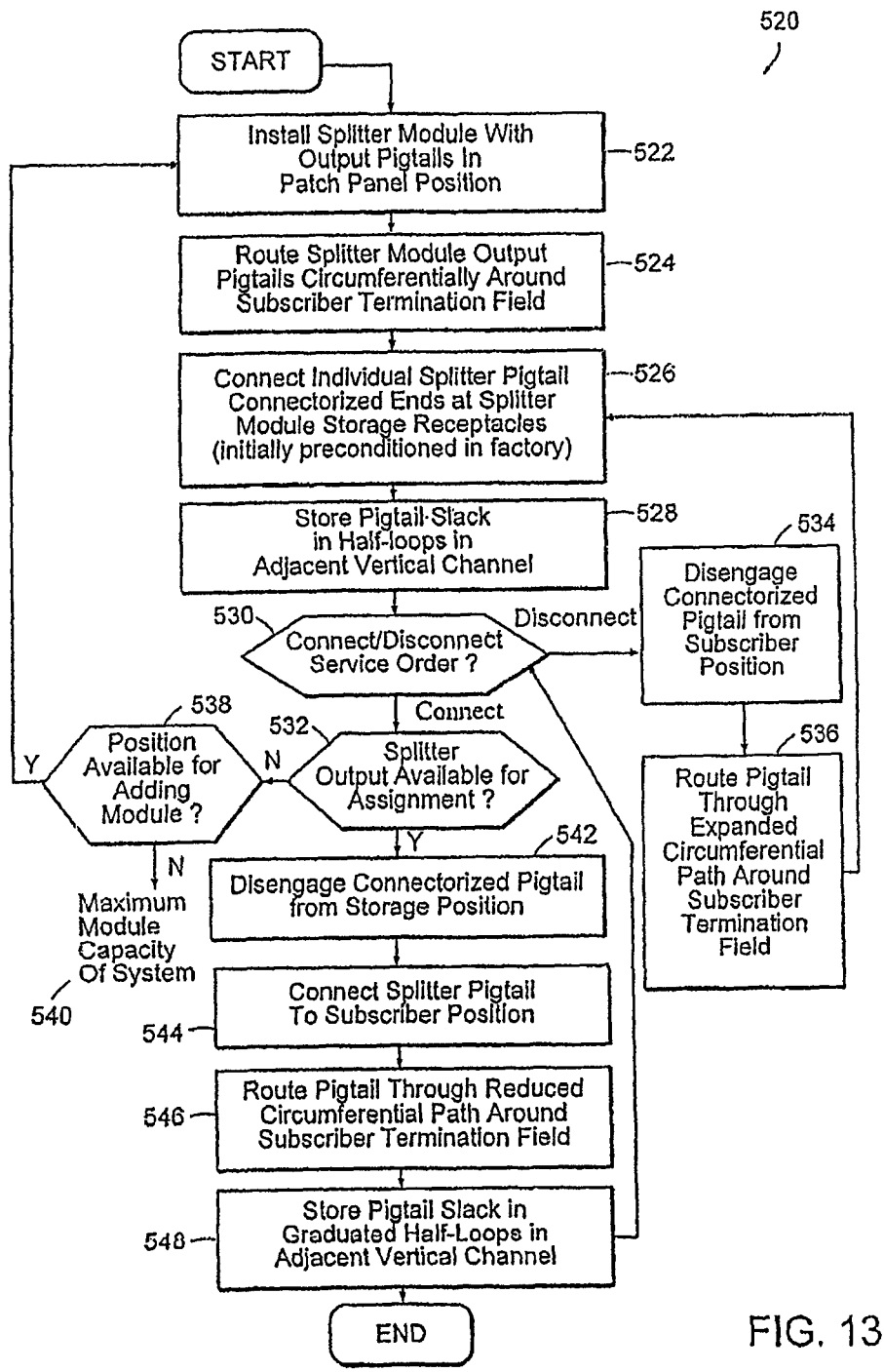
FIG. 13 is a flow chart illustrating a method for installing and connecting optical splitter module pigtails in accordance with a preferred embodiment of the present invention.

FIG. 13 is a flow chart illustrating a method for installing and connecting optical splitter module pigtails in accordance with a preferred embodiment of the present invention. The method includes the step 522 of installing a splitter module with output pigtails in a patch panel position. Further, the method includes the step 524 of routing the splitter module output pigtails circumferentially around a subscriber termination field. The method includes the step 526 of connecting an individual splitter pigtail connectorized ends at splitter module storage receptacles. These storage receptacles can initially be preconditioned in the factory. The method includes a next step 528 of storing the pigtail slack in half-loops in an adjacent vertical channel. Further, the method includes the step 530 of deciding whether to connect or disconnect the service order. If a service order needs to be connected, the method includes the decision in step 532 of determining if a splitter output is available for assignment. If it is determined that the splitter output is available for assignment then the method progresses to step 542 of disengaging connectorized pigtail from the storage position. If it is determined that the splitter output is not available per step 538 then it is determined if a position is available for adding a module. If Yes, then the method steps are reiterated starting back from step 522. If, however, it is determined that there is no position available then the maximum module capacity of the system has been reached.

The method also includes the option of disconnecting the service order per step 530. The step 534 includes disengaging the connectorized pigtail from the subscriber position and per step 536 routing the pigtail through an expanded circumferential path around the subscriber termination field 536.

The method further includes the step 544 of connecting the splitter pigtail to the subscriber position and the step 546 of routing the pigtail through a reduced circumferential path around the subscriber termination field. The method includes the step 548 of storing the pigtail slack in graduated half-loops in an adjacent vertical channel.

Figure 14A:
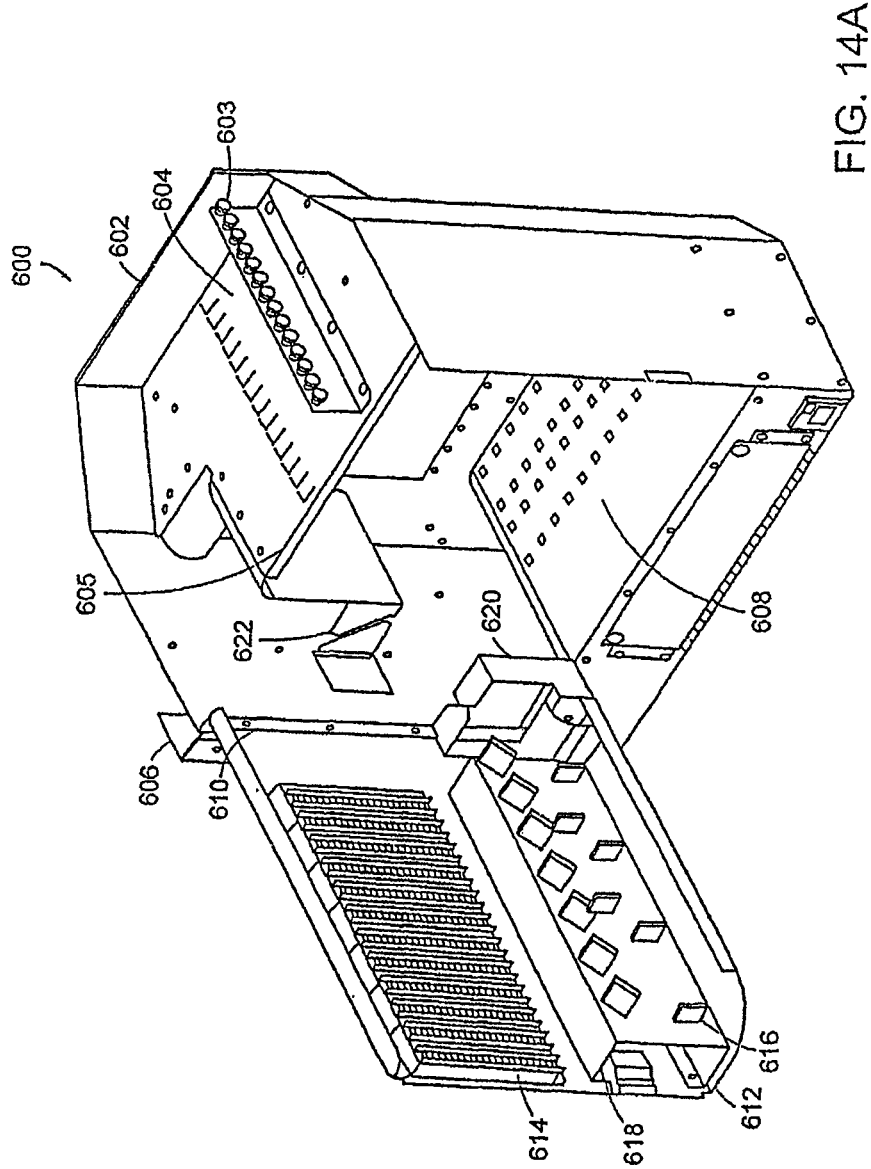
FIG. 14A illustrates a preferred embodiment of a single hinged parking panel for use in fiber distribution hubs.

Alternative embodiments for interior components of FDHs may be practiced in accordance with teachings herein. By way of example, hinged parking panels may be employed for storing unused pigtails. FIG. 14A illustrates a chassis 600 utilizing hinged parking. The embodiment of FIG. 14A may include, among other things, a chassis frame 602, module retainers 603, a splitter module mounting area 604, an upper splitter module shelf 605, a mounting bracket 606 for pivotally mounting chassis frame 602 and storage/parking panel 612 to an interior surface of an enclosure, an inner volume 608, a storage panel hinge 610, storage parking panel 612, a parking portion having a plurality of receptacles 614, fiber pigtail guides 616, a fiber pigtail guide panel 618, a storage panel primary guide 620, and a chassis fiber guide 622.

Chassis frame 602 has an inner volume 608 for accepting a subscriber termination field. Chassis 602 also includes a splitter module shelf 605 for supporting splitter modules above a subscriber termination field. Splitter modules are retained in place using retainers 603. Retainer 603 may be, for example, thumb screws. Fiber pigtails having connectorized ends, are routed through chassis cable guide 622, panel primary guide 620, and one-or-more panel mounted fiber pigtail guides 616 before being stored in parking receptacle field 614 via a connector on a pigtail.

Hinged storage/parking panel 612 may provide greater fiber connector density than embodiments utilizing splitter modules having storage receptacles thereon, such as on an optical splitter face plate. Hinged storage/parking panel 612 may also provide greater fiber connector density than embodiments utilizing splitter modules located below a subscriber termination field. In addition, storage receptacles 614 can be organized in columns of 16 or 32 receptacles so as to correspond to a splitter module having 16 or 32 pigtails. As pigtail connectors are removed from storage receptacles 614 and deployed onto the subscriber termination field, columns of receptacles can be removed from hinged panel 612 and re-used in FDHs at other locations. Furthermore, once all pigtails are deployed on the subscriber termination field, the entire hinged panel 612 can be removed thus providing unencumbered access to the subscriber termination field. In addition, hinged panel 612 can be sized to serve as a protective cover for the subscriber termination field. If gasketing, or other releasable sealing means, is provided, then hinged panel 612 can operate to prevent dust and debris from accumulating on the subscriber termination field.

Figure 14B:
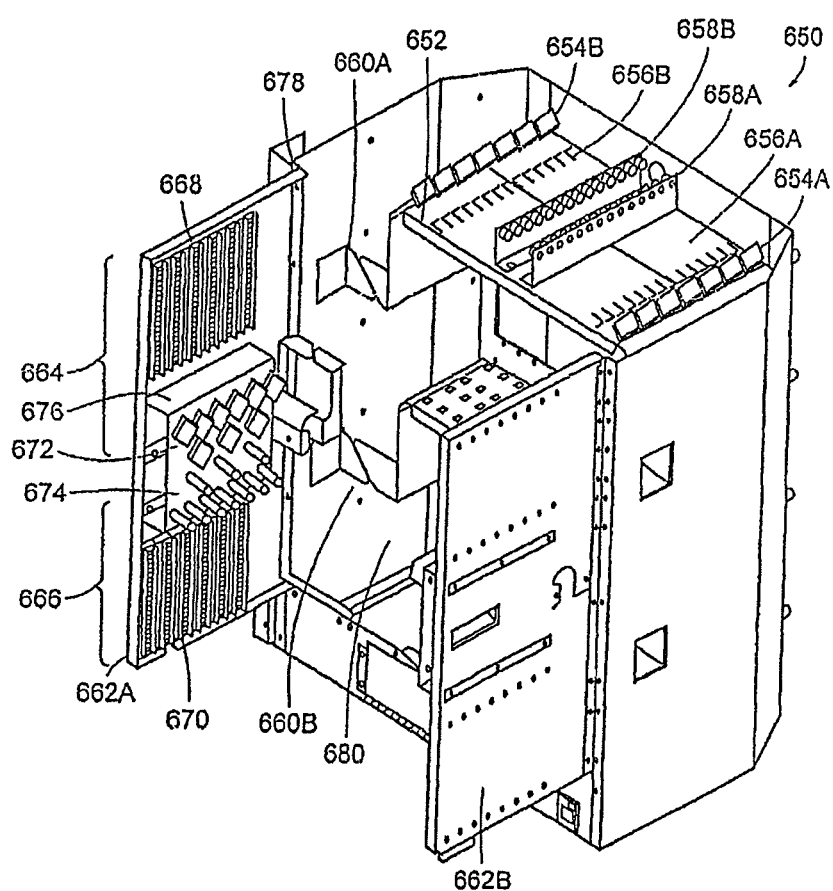
FIG. 14B illustrates a preferred embodiment of a dual hinged parking panel for use in fiber distribution hubs.

FIG. 14B illustrates an embodiment of a chassis having two doors containing connector parking. Embodiment 650 may include, among other things, a chassis 651, an upper splitter module shelf 652 having a first module area 656A, a second module area 656B, a first set of module guides 654A, a second set of module guides 654B, a first set of module retainers 658A, a second set of module retainers 658B, an upper chassis fiber guide 660A, a lower chassis fiber guide 660B, a first door panel 662A having a lower parking management area 666, an upper parking management area 664, an upper and lower parking field 668, 670, panel upper fiber guides 672, panel lower fiber guides 674, an inner volume 680 and a second door panel 662B having substantially the same configuration as the first door panel 662A. The embodiment of FIG. 14B operates in substantially the same manner as the embodiment of FIG. 14A except that the receptacles for parking splitter module outputs are contained on two hinged door panels 662A, 662B. The chassis embodiments of FIGS. 14A and 14B may be used with enclosures mounted on grade as well as enclosures supported on utility poles.

Figure 15:
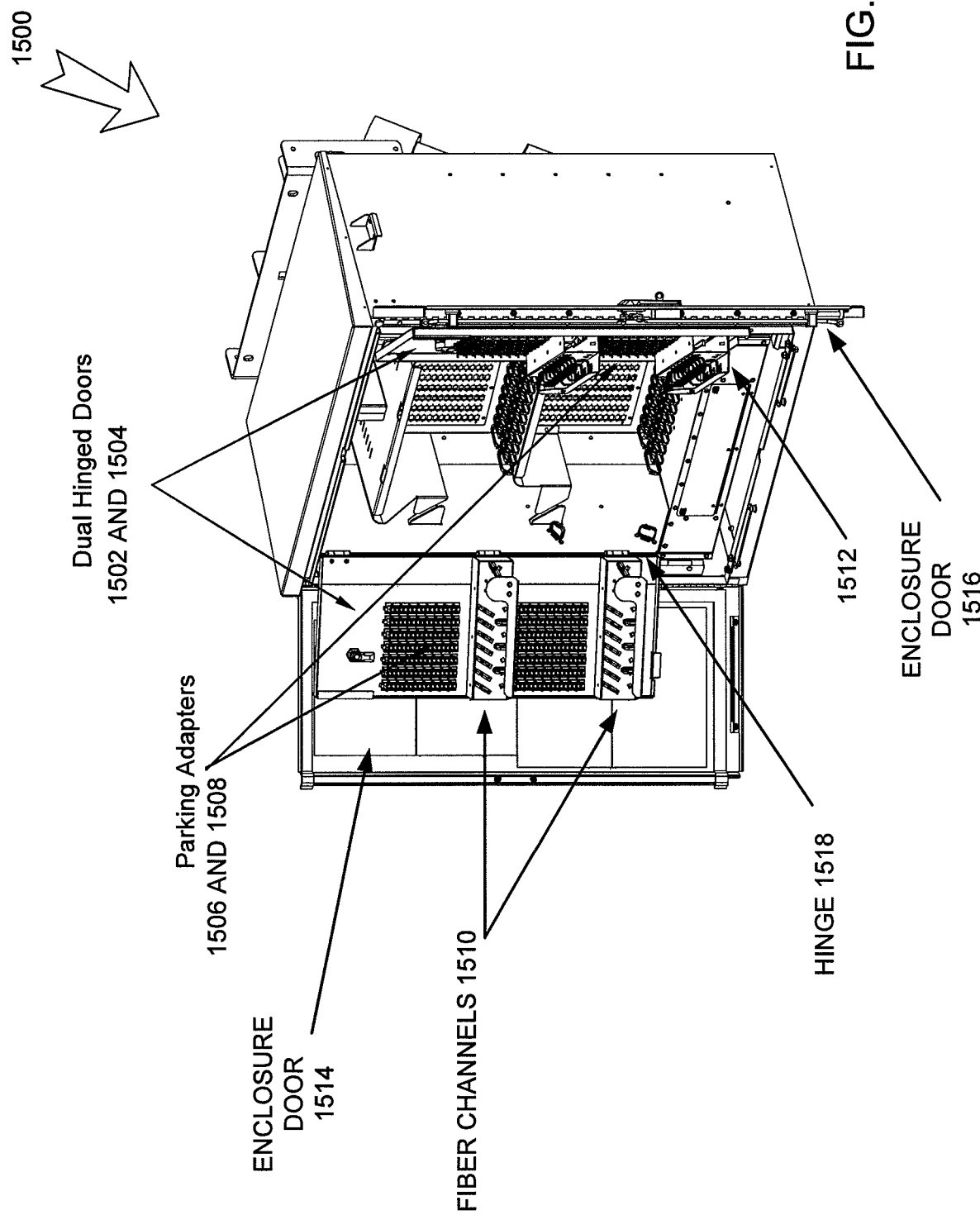
FIG. 15 illustrates an exemplary implementation of an equipment enclosure employing hinged parking.

FIG. 15 illustrates an exemplary implementation of an equipment enclosure employing hinged parking. Enclosure 1500 may include a first hinged door 1502, a second hinged door 1504, a first set of parking adapters 1506, a second set of parking adapters 1508, a first set of fiber channels 1510, a second set of fiber channels 1512, a first enclosure door 1514, a second enclosure door 1516, and a first hinge 1518.

Enclosure 1500 may include a fiber distribution hub as previously described herein. Enclosure 1500 may be mounted on a utility pole at ground level or near the top of the utility pole. In addition, enclosure 1500 may be mounted on the ground and/or in a below grade vault. First and second enclosure doors 1514 and 1516 may serve as the primary access to the interior of enclosure 1500. While the implementation of FIG. 15 illustrates an enclosure having two enclosure doors, other implementations may include a single enclosure door.

Enclosure 1500 may include a first hinged door 1502 and a second hinged door 1504 configured and adapted to hold one or more parking adapters. First and second hinged doors 1502, 1504 may be substantially flat and may include cutouts, or panel openings, for accepting parking adapters 1506, 1508. First and second hinged doors 1502, 1504 may also include fiber channels 1510, 1512 for routing optical fibers associated with connectors that may be plugged into parking adapters 1506, 1508. First and second hinged door 1502, 1504 may be pivotally supported on enclosure 1500 and/or enclosure doors 1514, 1516 using one or more pivoting devices, such as hinges 1518 and 1520 (not shown).

Figure 16:
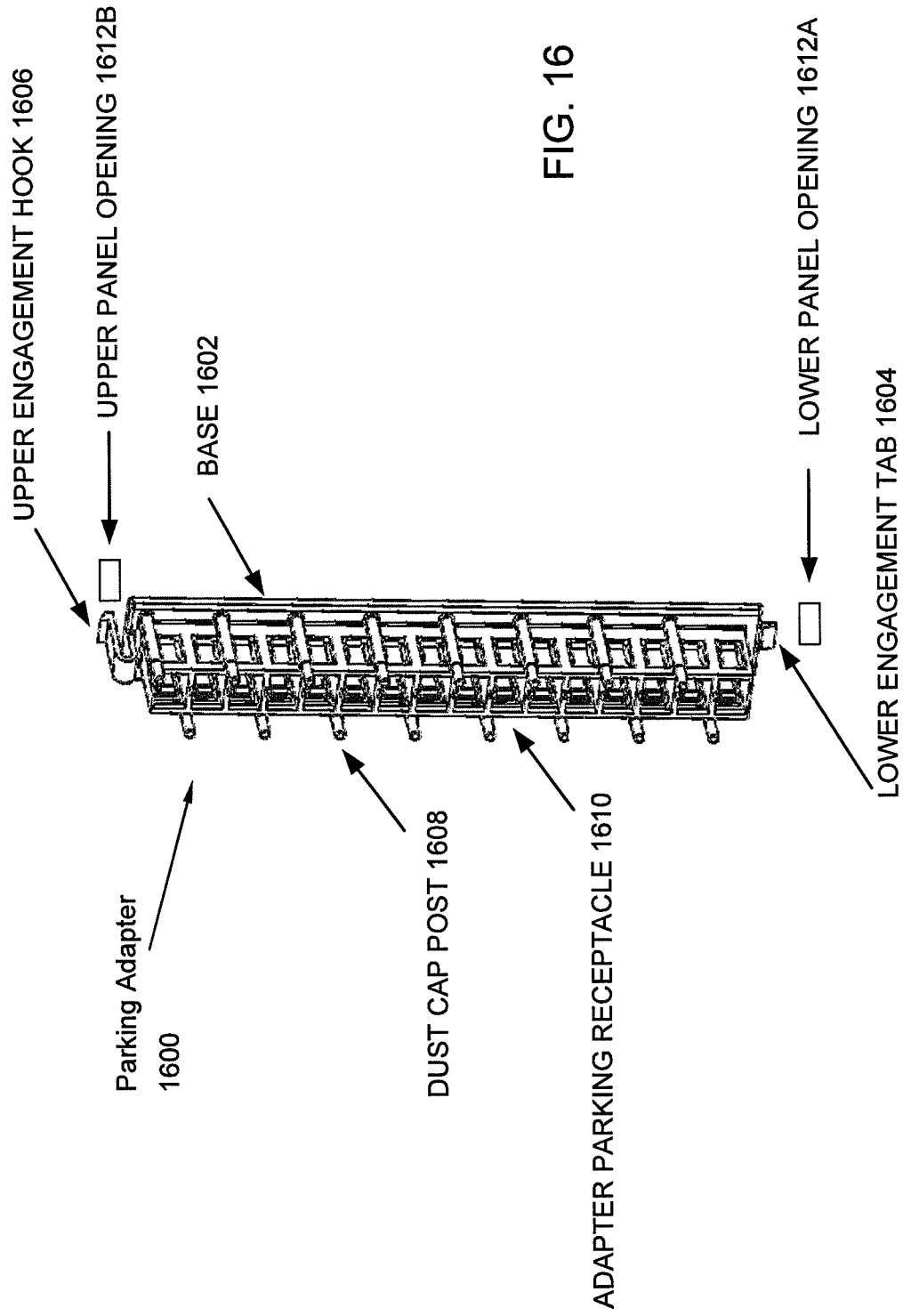
FIG. 16 illustrates an exemplary implementation of a parking adapter that may be used in conjunction with first hinged door and/or second hinged door.

FIG. 16 illustrates an exemplary implementation of a parking adapter 1600 that may be used in conjunction with first hinged door 1502 and/or second hinged door 1504 consistent with the principles of the invention. Parking adapter 1600 may include any device capable of receiving a connector associated with a fiber optic cable and/or an adapter dust cap. For example, parking adapter 1600 may be configured and adapted to receive SC connectors LC connectors, and/or other connectors known in the art. Parking adapter 1600 may also be configured and adapted to receive SC and/or LC dust caps and/or SC or LC adapter dust caps. Implementations of parking adapter 1600 may include 16 adapters arranged in a row and/or column; however, other implementations may include fewer adapters, more adapters, and/or adapters arranged in multiple rows and/or columns. Parking adapter 1600 may be installed in a vertical and/or a horizontal orientation within an enclosure, such as enclosure 1500. Parking adapters 1600 may be configured and adapted to mount without tools and/or fasteners, and/or parking adapters 1600 may be configured to mount via fasteners, such as screws, rivets, tie wraps, adhesive bonding techniques, etc. Parking adapter 1600 may be made from plastic, metal and/or composite, via injection molding and/or machining operations.

Parking adapter 1600 may include a base 1602, a lower engagement tab 1604, an upper engagement hook 1606, a dust cap post 1608, an adapter parking receptacle 1610. Parking adapter 1600 may be adapted to operate with a surface, such as a panel associated with first hinged door 1502 and/or second hinged door 1504. Parking adapter 1600 may be supported on a panel via a lower panel opening 1612A and/or an upper panel opening 1612B. Base 1602 may include a substantially flat surface that is adapted to rest against a panel, such as a door panel associated with hinged door 1502 and/or 1504 when parking adapter 1600 in installed thereon. Lower engagement tab 1604 may be configured and adapted to engage lower panel opening 1612A to removeably support a lower portion of parking adapter 1600 when installed on hinged door 1502 and/or 1504.

Upper engagement hook 1606 may include any device capable of retaining an upper portion of parking adapter 1600 in a determined location. For example, in one implementation upper engagement hook 1606 may be configured and adapted as a tensioned hook that exerts an upward force on a portion of upper panel opening 1612B when operatively engaged therewith. Upper engagement hook 1606 may be disengaged from hinged door 1502 and/or 1504 by applying, for example, a downward pressure while pulling the upper portion of parking adapter 1600 away from hinged door 1502 and/or 1504. Substantially any number of parking adapters 1600 may be positioned alongside each other to accommodate substantially any number of parked connectors and/or adapter dust caps.

Parking adapter 1600 may include one or more dust cap posts 1608. Dust cap post 1608 may be configured and adapted to receive a connector dust cap that has been removed from a connector associated with an optical fiber. For example, dust cap post 1608 may be adapted to receive an SC dust cap and/or an LC dust cap. Dust cap post 1608 may provide a convenient location for retaining dust caps until they are needed to protect an optical fiber associated with a connector, such as when a connector is removed from a subscriber port. Implementations of dust cap post 1608 may be tapered and/or stepped to accommodate more than one type of dust cap.

Parking adapter 1600 may include one or more adapter parking receptacles 1610 that may be configured and adapted to receive a connector associated with an optical fiber, such as a fiber pigtail associated with an optical splitter. For example, implementations of parking adapter 1600 may be configured and adapted to receive an SC and/or LC connector. Adapter parking receptacle 1610 may be dimensioned to provide a relatively secure fit for connectors coupled thereto in order to prevent dirt and/or moisture from reaching internal portions of the connector and/or fiber housed therein. For example, adapter parking receptacle 1610 may be configured and dimensioned to be slightly larger that the dimensions of a connector associated with an optical fiber to as to discourage debris from passing through a gap between the receptacle surfaces and the connector surfaces.

Figure 17:
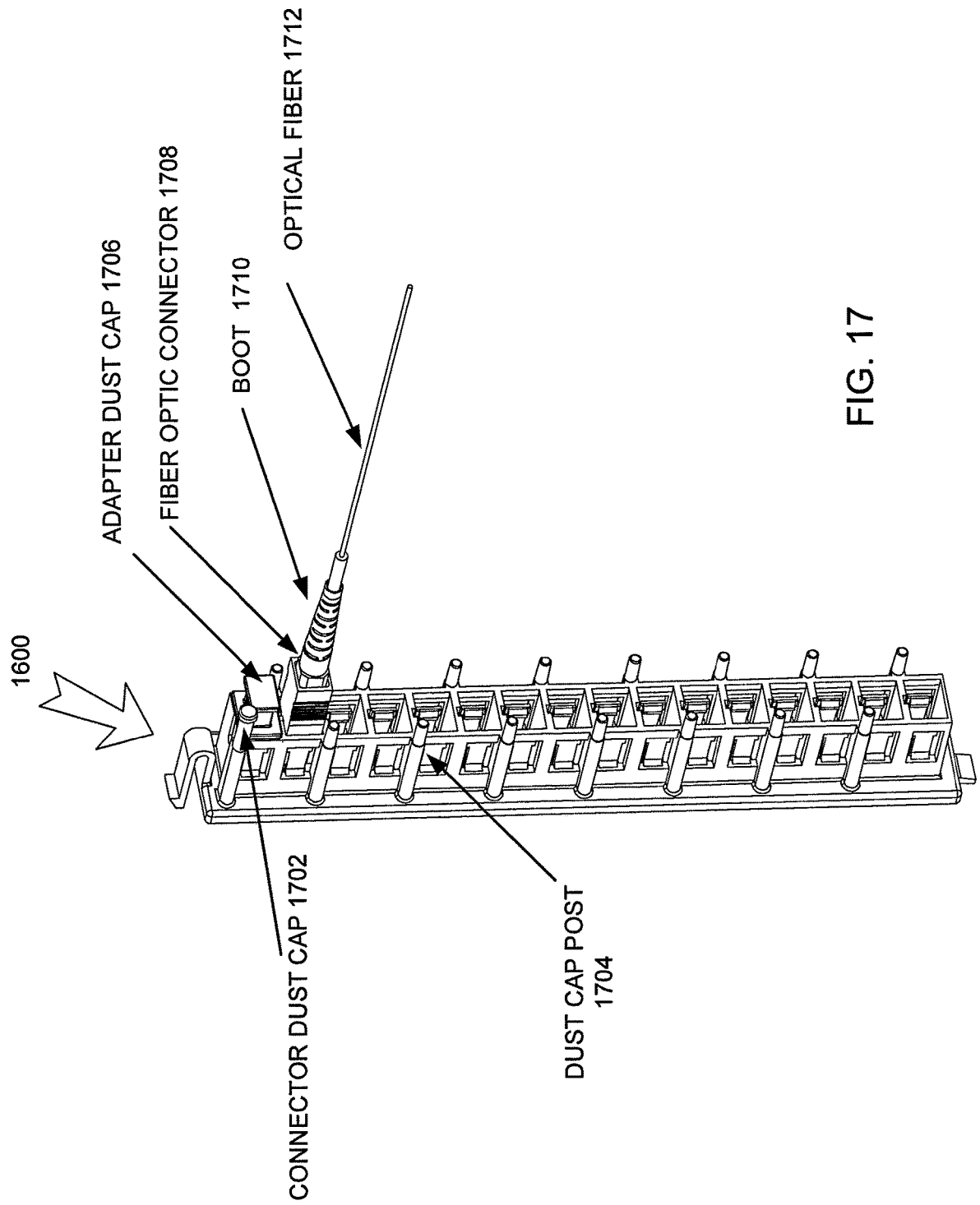
FIG. 17 illustrates an exemplary parking adapter including an adapter dust cap and connector dust cap along with a parked connector having an optical fiber associated therewith.

FIG. 17 illustrates an exemplary parking adapter including an adapter dust cap and connector dust cap along with a parked connector having an optical fiber associated therewith. Parking adapter 1600 may include a connector dust cap 1702 removeably supported on dust cap post 1608 when connector dust cap 1702 is not in use on a connector. Connector dust cap 1702 may include SC, LC and/or other types of connector dust caps that may be used in conjunction with optical fibers. Parking adapter 1600 may also operate with a fiber optic connector 1708 having a boot 1710, and an optical fiber 1712 associated therewith. Fiber optic connector 1708, boot 1710 and optical fiber 1712 may be associated with providing service to a subscriber in conjunction with, for example, a subscriber termination shelf or field, such as subscriber termination shelf 352 (FIG. 8).

Fiber optic connector 1708 may include any type of connector capable of coupling an optical signal from an optical fiber to a receptacle and/or another connector. Fiber optic connector 1708 may include an LC, SC and/or other types of suitable connectors. Boot 1710 may be located proximate to a transition from connector 1708 to fiber 1712 and may serve to join the connector and fiber and may also serve to manage a bend radius associated with optical fiber 1712.

Parking adapter 1600 may include adapter parking receptacles 1610 that are configured and adapted to receive adapter dust caps 1706 when they are removed from a subscriber termination field or panel. For example, an FDH may include a subscriber termination panel that is equipped with adapter dust caps 1706 until a subscriber is connected to a source via an operational optical connection, such as by way of a fiber pigtail having a connector and optical fiber associated therewith. When a subscriber is connected to a subscriber termination, an adapter dust cap 1706 that was protecting the termination may be removed and placed into adapter parking receptacle 1610. By way of example, a connector 1708 and fiber 1712 may be removed from adapter parking receptacle 1610 and connected to a subscriber termination. An adapter dust cap from that subscriber termination may be installed in the adapter parking receptacle that previously housed the connector associated with the recently connected subscriber.

Parking adapter 1600 may be removed from an enclosure when all connectors associated with the adapter are in use to convey optical signals to subscribers. When all parking adapters 1600 associated with a hinged door 1502, 1504 are no longer in use, hinged door 1502, 1504 may be removed and reused in another enclosure. Alternatively, hinged door 1502, 1504 may be augmented with flat, substantially nonporous panels to prevent dust, dirt and/or moisture from reaching an interior portion of an enclosure when parking adapters 1600 are removed therefrom. Alternatively, blank hinged panels may be installed to prevent dust, dirt and/or moisture from reaching an interior portion of an enclosure when parking adapters are removed therefrom.

Figure 18:
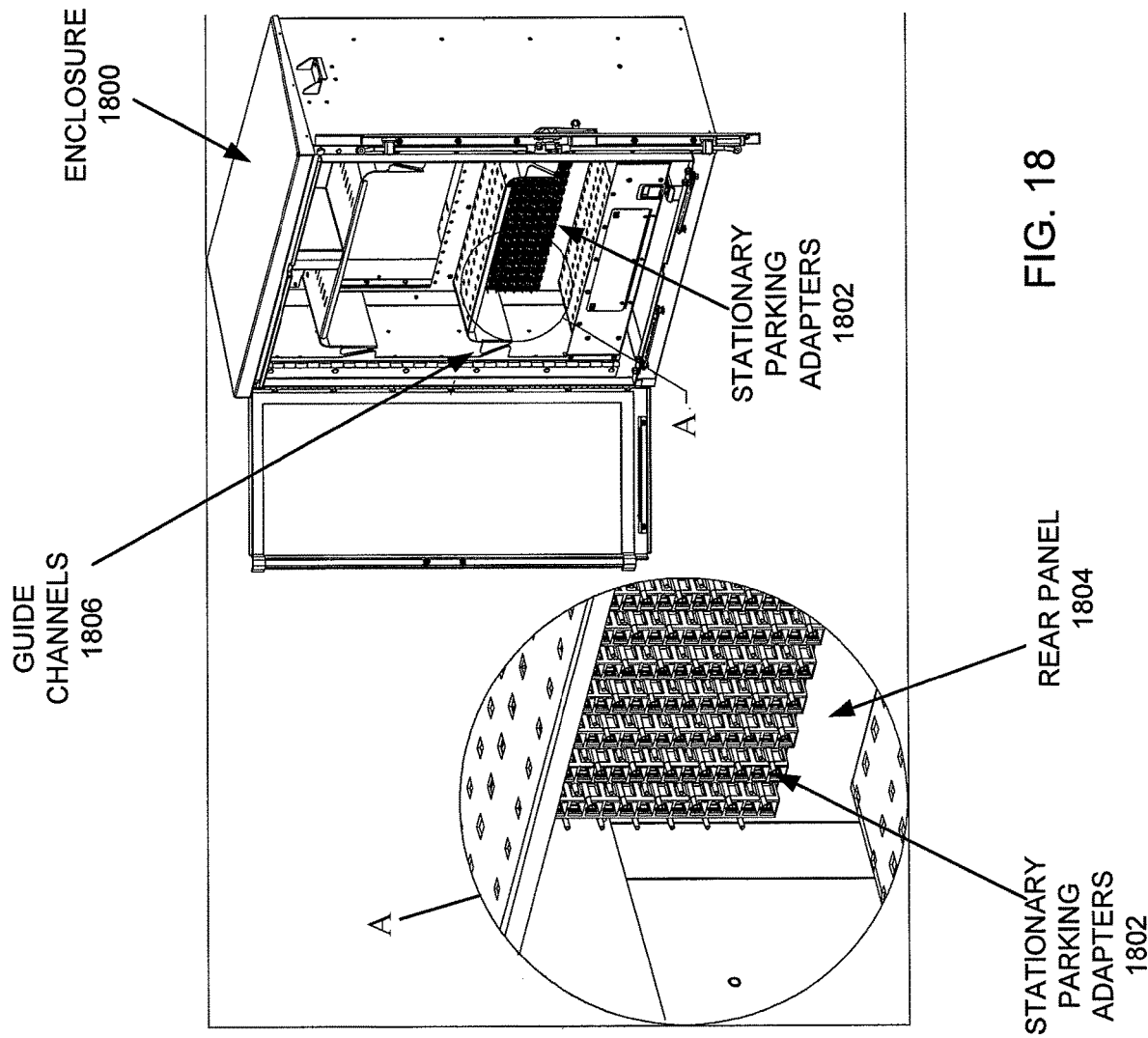
FIG. 18 illustrates an exemplary enclosure having stationary parking adapters.

FIG. 18 illustrates an exemplary enclosure having stationary parking adapters. Enclosure 1800 may include stationary adapters 1802 and a rear panel 1804, which are shown in an enlarged view in the inset A of FIG. 18. Stationary adapters 1802 may be configured and dimensioned substantially as parking adapter 1600 discussed in conjunction with FIGS. 16 and 17.

Rear panel 1804 may be substantially flat and may include an upper panel opening 1808 that may be used to support a subscriber termination field and/or a lower panel opening 1810 that may be used to support one or more stationary parking adapters 1802. Rear panel 1804 may operate as a rear panel for an optical splitter module shelf. When optical splitters are installed, connectors associated with the splitter modules may be parked on one or more banks of stationary parking adapters 1802. For example, connectors associated with output pigtails 110 (FIG. 3A) may be parked on stationary parking adapters 1802. As connectors are used to connect service to subscribers, stationary parking adapters 1802 may be removed when no longer needed for storing unused connectors. Removed stationary parking adapters 1802 may be reused in other enclosures.

Optical fibers associated with connectors coupled to stationary parking adapter 1802 may be run through guide channels 1806. Guide channels 1806 may manage slack associated with optical fibers in an organized manner as previously described herein.

Figure 19:
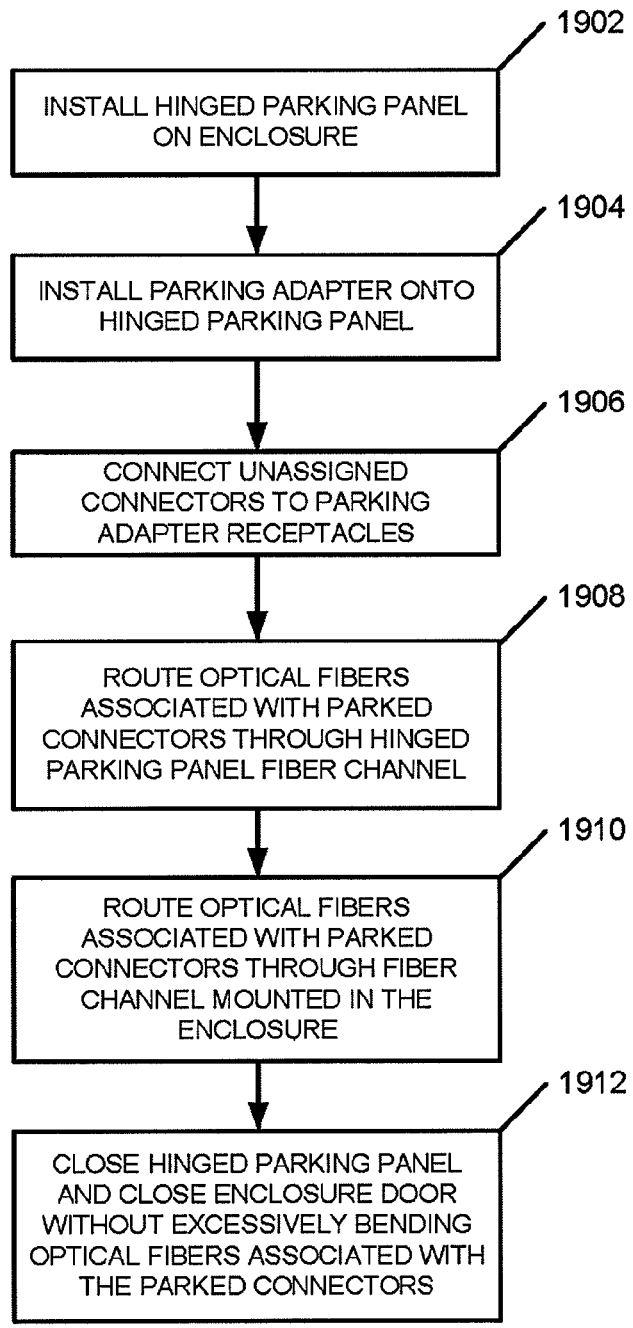
FIG. 19 illustrates an exemplary method for configuring an enclosure with hinged parking.

FIG. 19 illustrates an exemplary method for configuring an enclosure with hinged parking. One or more hinged parking panels, or doors, 1502, 1504 may be installed in an enclosure 1500 (act 1902). Hinged parking panels 1502, 1504 may be configured to open with enclosure doors 1514, 1516 or may be configured to open independently. One or more parking adapters 1600 may be installed on parking panel 1502, 1504 (act 1904). Parking adapter 1600 may have a number of adapter receptacles 1610 associated therewith.

Unassigned connectors 1708, having optical fibers 1712 associated therewith, may be engaged with adapter receptacles 1610 (act 1906). Connectors 1708 may be stored until needed to connect service to a subscriber. Optical fibers 1712 associated with the parked connectors 1708 may be routed through fiber channels 1510 to retain the fibers in an orderly arrangement (act 1908). Excess fiber 1712 associated with the parked connectors 1708 may be routed through fiber channels located elsewhere in the enclosure (act 1910). For example, fiber channels 1510 may be configured and arranged to maintain slack in conjunction with fiber channels located elsewhere in an enclosure, such as fiber management guide 358 (FIG. 8), to prevent excessive bending and/or pinching optical fibers when hinged parking panels 1502, 1504 and/or enclosure access doors 1514, 1516 are opened and/or closed. Fiber channels 1510 may also be configured and arranged to maintain slack in desired quantities, orientations and positions to facilitate maintaining an orderly fiber arrangement within an enclosure. Hinged parking panel 1502 may be closed after connectors 1708 are parked and excess optical fiber is placed in fiber channels 1510 (act 1912).

Figure 20:
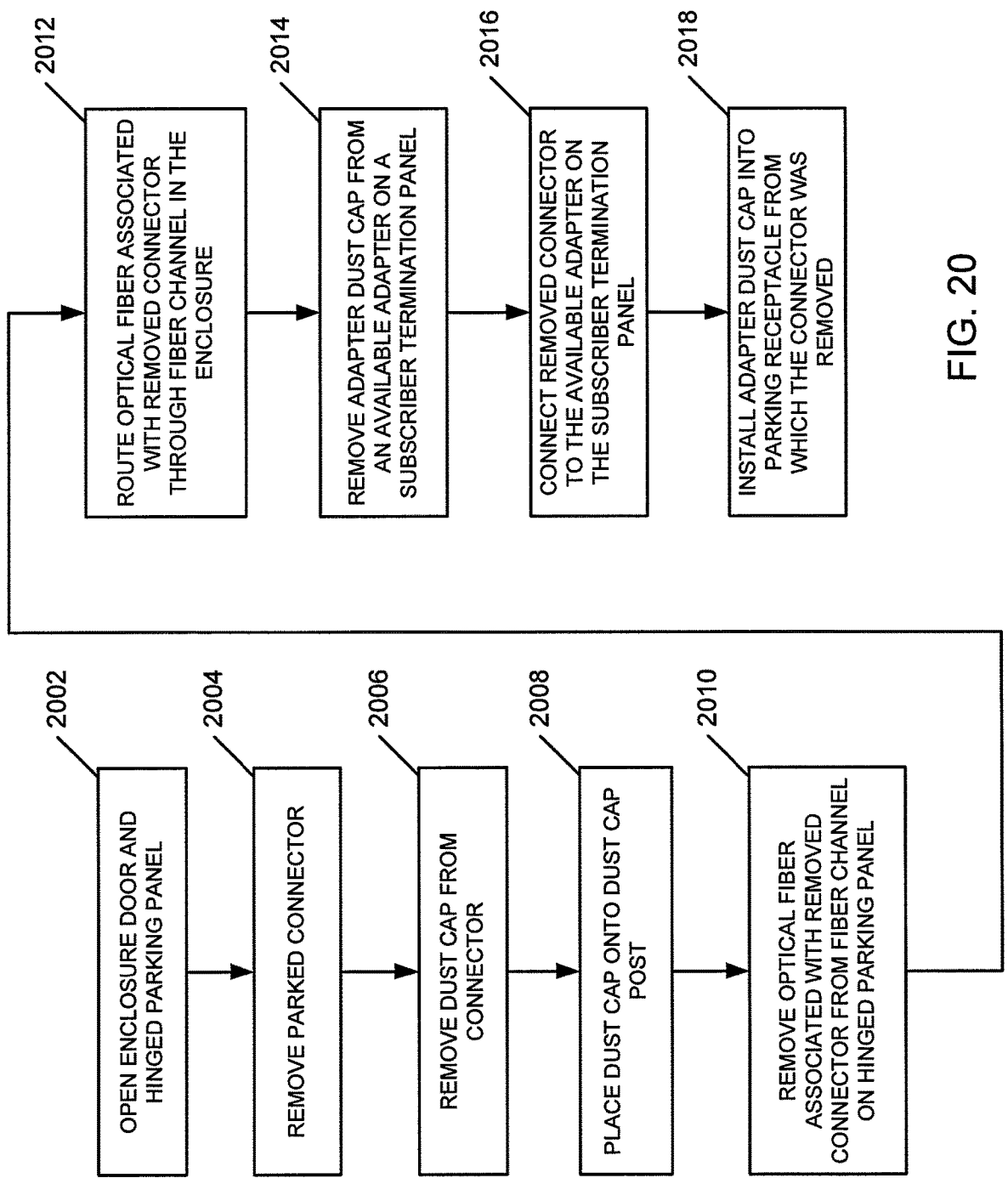
FIG. 20 illustrates an exemplary method for connecting a subscriber to an optical signal associated with an enclosure employing hinged parking.

FIG. 20 illustrates an exemplary method for connecting a subscriber to an optical signal associated with an enclosure employing hinged parking. The method may commence when the enclosure door 1514, 1516 and a hinged parking panel 1502, 1504 are opened (act 2002). A parked connector 1708 may be removed from parking adapter 1600 (act 2004). A connector dust cap 1702 may be removed from the connector (act 2006). Connector dust cap 1702 may be placed on dust cap post 1608 to retain the removed dust cap 1702 in a known location for future use (act 2008).

An optical fiber 1712 associated with the removed connector 1708 may be removed from fiber channel 1510 (act 2010). Optical fiber 1712 may be routed through one or more fiber channels 1510 in the enclosure to accommodate management of excess fiber (act 2012). Adapter dust cap 1706 may be removed from a subscriber termination in a subscriber termination field (act 2014). The connector 1708 that was removed from parking adapter 1600 may be connected to the subscriber termination from which the adapter dust cap 1706 was removed (act 2016). When connector 1708 is plugged into the subscriber termination, communication services may be available to a subscriber associated with the termination. The adapter dust cap 1706 that was removed from the subscriber termination in act 2014 may be inserted into the parking adapter 1600 from which the connector 1708 was removed in act 2004 (act 2018).

A connector and fiber may be removed from a stationary parking adapter and/or a parking adapter associated with a splitter faceplate and connected to a subscriber termination in a manner similar to that described in connection with FIG. 20.

Systems and methods consistent with the invention make possible the configuration of enclosures used in passive optical networks. For example, an enclosure may be configured to provide convenient parking of unused connectors and/or dust caps associated with the connectors and/or adapters.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts have been described with respect to FIGS. 19 and 20, the order of the acts may be varied in other implementations consistent with the invention. Moreover, non-dependent acts may be implemented in parallel.

For example, implementations consistent "with the principles of the invention can be implemented using connectors, receptacles, adapters and/or routing techniques other than those illustrated in the figures and described in the specification without departing from the spirit of the invention. In addition, the sequence of events associated with the methods described in conjunction with FIGS. 19 and 20 can be performed in orders other than those illustrated. Furthermore, additional events can be added, or removed, depending on specific deployments, applications, and the needs of users and/or service providers. Further, disclosed implementations may not be limited to any specific combination of hardware circuitry and/or software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents. The above specification, examples and data provide a complete description of the manufacture and use of the composition of the invention. Since many embodiments of the invention can be made without departing from the spirit and scope of the invention, the invention resides in the claims hereinafter appended.

We claim:

1. A fiber distribution device, comprising:
    an enclosure including:
        a main enclosure body; and
        a door pivotally connected to a main enclosure body by a first hinge defining a first vertically extending axis, the door configured to pivot about the first vertically extending axis from a closed position covering at least a portion of the access opening to an open position to access an interior of the enclosure, the enclosure having a height and a width;
    a frame mounted within the interior of the enclosure, the frame being rotationally moveable about a second vertically extending axis relative to the enclosure, the frame having a height extending along a majority of the height of the enclosure and having a width extending along a majority of the width of the enclosure;
    a splitter module mounting location provided on the frame;
    at least one optical splitter module including an optical splitter, the optical splitter module being mounted to the splitter module mounting location so that the optical splitter module is carried with the frame when the frame is moved relative to the enclosure about the second vertically extending axis;
    a plurality of splitter output pigtails for carrying signals split by the optical splitter, the splitter output pigtails each including an optical fiber and a connectorized end; and
    an optical termination field for optically connecting the splitter output pigtails to optical fibers corresponding to subscriber locations, the optical termination field being carried by the frame, the optical termination field including a plurality of fiber optic adapters defining a plurality of subscriber ports for receiving the connectorized ends of the splitter output pigtails.

2. The fiber distribution device of claim 1, wherein the main enclosure body defines a cable feed through that is accessible when the frame is pivoted about the second vertically extending axis to an open position of the frame, and wherein the cable feed through is not accessible when the frame is pivoted about the second vertically extending axis to a closed position of the frame.

3. The fiber distribution device of claim 1, further comprising a cable management tray mounted to the frame that is accessible when the frame is pivoted about the second vertically extending axis to an open position of the frame, and wherein the cable management tray is not accessible when the frame is pivoted about the second vertically extending axis to a closed position of the frame.

4. The fiber distribution device of claim 1,
    wherein the frame is configured to be pivoted about the second vertically extending axis between an open position of the frame and a closed position of the frame; and
    wherein in the closed position of the frame, a release latch latches the frame to the main enclosure body.

5. The fiber distribution device of claim 1, wherein the width of the enclosure extends from a first side of the main enclosure body to an opposite second side of the main enclosure body, and wherein the first and second vertically extending axes are closer to the first side than to the second side.

6. The fiber distribution device of claim 1, wherein the frame is rotatable about the second vertically extending axis by an angle of up to at least 90 degrees.

7. The fiber distribution device of claim 1, wherein the frame is mounted to the main closure body with a second hinge.

8. The fiber distribution device of claim 1, further comprising a pigtail channel carried by the frame, the pigtail channel receiving slack of the plurality of splitter output pigtails so that the plurality of splitter output pigtails remain fixed as the frame is rotationally moved about the second vertically extending axis.

9. A fiber distribution device comprising:
    an enclosure;
    a swing frame chassis pivotally mounted within the enclosure;
    at least a first optical splitter module mounted to the swing frame chassis, the first optical splitter module being configured to receive an incoming optical signal and to split the incoming optical signal into a plurality of output signals;
    a plurality of pigtails having connectorized ends, at least portions of the pigtails being carried by the swing frame chassis, each of the pigtails being configured to transmit one of the output signals split by the first optical splitter module;
    an optical termination field carried by the swing frame chassis, the optical termination field including a plurality of fiber optic adapters configured to receive the connectorized ends of the pigtails; and
    a connector storage location carried by the swing frame chassis, the connector storage location including connector holders for holding the connectorized ends of the pigtails when the connectorized ends of the pigtails are not received at the optical termination field, the connector holders not being functional fiber optic adapters.

10. The fiber distribution device of claim 9,
    wherein the swing frame chassis is pivotally mounted with a hinge defining a hinge axis; and
    wherein the enclosure defines a cable feed through that is accessible when the swing frame chassis is pivoted about the hinge axis to an open position of the swing frame chassis, and wherein the cable feed through is not accessible when the swing frame chassis is pivoted about the hinge axis to a closed position of the swing frame chassis.

11. The fiber distribution device of claim 9,
    wherein the swing frame chassis is pivotally mounted with a hinge defining a hinge axis; and
    further comprising a cable management tray mounted to the swing frame chassis that is accessible when the swing frame chassis is pivoted about the hinge axis to an open position of the swing frame chassis, and wherein the cable management tray is not accessible when the swing frame chassis is pivoted about the hinge axis to a closed position of the swing frame chassis.

12. The fiber distribution device of claim 9,
    wherein the swing frame chassis is pivotally mounted with a hinge defining a hinge axis between an open position of the swing frame chassis and a closed position of the swing frame chassis; and wherein in the closed position of the swing frame chassis, a release latch latches the swing frame chassis to the enclosure.

13. The fiber distribution device of claim 9, wherein the swing frame chassis is rotatable about the hinge axis by an angle of up to at least 90 degrees.

14. The fiber distribution device of claim 9, further comprising a pigtail channel carried by the swing frame chassis, the pigtail channel receiving slack of the plurality of pigtails so that the plurality of pigtails remain fixed as the swing frame chassis is rotationally moved about the hinge axis.

15. A fiber distribution device comprising:
a swing frame chassis pivotally mounted to a support structure, the swing frame chassis being configured to pivot relative to the support structure between an open position and a closed position;
at least a first optical splitter module mounted to the swing frame chassis, the first optical splitter module being configured to receive an incoming optical signal and to split the incoming optical signal into a plurality of output signals;
a plurality of pigtails having connectorized ends, the pigtails being carried by the swing frame chassis, the pigtails being accessible when the swing frame chassis is arranged in the closed position, each of the pigtails being configured to transmit one of the output signals split by the first optical splitter module, the pigtails having portions that are routed generally vertically on the swing frame chassis;
an optical termination field including a plurality of fiber optic adapters carried by the swing frame chassis, the fiber optic adapters being configured to receive the connectorized ends of the pigtails; and
a connector storage location carried by the swing frame chassis, the connector storage location including connector holders for holding the connectorized ends of the pigtails when the connectorized ends of the pigtails are not received at the optical termination field, the connector holders not being functional fiber optic adapters.

16. The fiber distribution device of claim 15,
wherein the swing frame chassis is pivotally mounted with a hinge defining a hinge axis; and
wherein the support structure defines a cable feed through that is accessible when the swing frame chassis is pivoted about the hinge axis to an open position of the swing frame chassis, and wherein the cable feed through is not accessible when the swing frame chassis is pivoted about the hinge axis to a closed position of the swing frame chassis.

17. The fiber distribution device of claim 15,
wherein the swing frame chassis is pivotally mounted with a hinge defining a hinge axis; and
further comprising a cable management tray mounted to the swing frame chassis that is accessible when the swing frame chassis is pivoted about the hinge axis to an open position of the swing frame chassis, and wherein the cable management tray is not accessible when the swing frame chassis is pivoted about the hinge axis to a closed position of the swing frame chassis.

18. The fiber distribution device of claim 15,
wherein the swing frame chassis is pivotally mounted with a hinge defining a hinge axis between an open position of the swing frame chassis and a closed position of the swing frame chassis; and wherein in the closed position of the swing frame chassis, a release latch latches the swing frame chassis to the support structure.

19. The fiber distribution device of claim 15, wherein the swing frame chassis is rotatable about the hinge axis by an angle of up to at least 90 degrees.

20. The fiber distribution device of claim 15, further comprising a pigtail channel carried by the swing frame chassis, the pigtail channel receiving slack of the plurality of pigtails so that the plurality of pigtails remain fixed as the swing frame chassis is rotationally moved about the hinge axis.

21. A fiber distribution device, comprising:
an enclosure defining an interior, the enclosure including a main enclosure body and a door pivotally connected to the main enclosure body, the main enclosure body defining an access opening for enabling access to the interior of the enclosure, the door being configured to pivot relative to the main enclosure body from a closed position covering at least a portion of the access opening to an open position;
a swing frame chassis pivotally mounted within the enclosure;
at least a first optical splitter module mounted to the swing frame chassis, the first optical splitter module being configured to receive an incoming optical signal and to split the incoming optical signal into a plurality of output signals;
a plurality of pigtails having connectorized ends, the pigtails being carried by the swing frame chassis, each of the pigtails being configured to transmit one of the output signals split by the first optical splitter module;
an optical termination field including a plurality of fiber optic adapters carried by the swing frame chassis, the fiber optic adapters being configured to receive the connectorized ends of the pigtails; and
at least one connector holder carried by the swing frame chassis, the connector holder being provided at a connector storage location at which the connectorized ends of the pigtails can be stored when not received within the fiber optic adapters of the optical termination field.

22. The fiber distribution device of claim 21,
wherein the swing frame chassis is pivotally mounted with a hinge defining a hinge axis; and
wherein the main enclosure body defines a cable feed through that is accessible when the swing frame chassis is pivoted about the hinge axis to an open position of the swing frame chassis, and wherein the cable feed through is not accessible when the swing frame chassis is pivoted about the hinge axis to a closed position of the swing frame chassis.

23. The fiber distribution device of claim 21,
wherein the swing frame chassis is pivotally mounted with a hinge defining a hinge axis; and
further comprising a cable management tray mounted to the swing frame chassis that is accessible when the swing frame chassis is pivoted about the hinge axis to an open position of the swing frame chassis, and wherein the cable management tray is not accessible when the swing frame chassis is pivoted about the hinge axis to a closed position of the swing frame chassis.

24. The fiber distribution device of claim 21,
wherein the swing frame chassis is pivotally mounted with a hinge defining a hinge axis between an open position of the swing frame chassis and a closed position of the swing frame chassis; and wherein in the closed position of the swing frame chassis, a release latch latches the swing frame chassis to the main enclosure body.

25. The fiber distribution device of claim 21, wherein the swing frame chassis is rotatable about the hinge axis by an angle of up to at least 90 degrees.

26. The fiber distribution device of claim 21, further comprising a pigtail channel carried by the swing frame chassis, the pigtail channel receiving slack of the plurality of pigtails so that the plurality of pigtails remain fixed as the swing frame chassis is rotationally moved about the hinge axis.

27. A fiber distribution device, comprising:

a support structure;

a swing frame chassis pivotally mounted to the support structure with a hinge defining a hinge axis, the swing frame chassis being configured to pivot relative to the support structure between an open position and a closed position, the support structure defining a cable feed through that is accessible when the swing frame chassis is pivoted about the hinge axis to an open position of the swing frame chassis, the cable feed through not being accessible when the swing frame chassis is pivoted about the hinge axis to a closed position of the swing frame chassis;

a cable management tray mounted to the swing frame chassis that is accessible when the swing frame chassis is pivoted about the hinge axis to the open position of the swing frame chassis, and wherein the cable management tray is not accessible when the swing frame chassis is pivoted about the hinge axis to the closed position of the swing frame chassis;

at least a first optical splitter module mounted to the swing frame chassis, the first optical splitter module being configured to receive an incoming optical signal and to split the incoming optical signal into a plurality of output signals;

a plurality of pigtails having connectorized ends, the pigtails being carried by the swing frame chassis, the pigtails being accessible when the swing frame chassis is arranged in the closed position, each of the pigtails being configured to transmit one of the output signals split by the first optical splitter module, the pigtails having portions that are routed generally vertically on the swing frame chassis;

an optical termination field including a plurality of fiber optic adapters carried by the swing frame chassis, the fiber optic adapters being configured to receive the connectorized ends of the pigtails;

a connector storage location carried by the swing frame chassis, the connector storage location including connector holders for holding the connectorized ends of the pigtails when the connectorized ends of the pigtails are not received at the optical termination field, the connector holders not being functional fiber optic adapters; and a pigtail channel carried by the swing frame chassis, the pigtail channel receiving slack of the plurality of pigtails so that the plurality of pigtails remain fixed as the swing frame chassis is rotationally moved about the hinge axis.

* * * * *